(12) United States Patent
Zhou et al.

(10) Patent No.: US 11,946,761 B2
(45) Date of Patent: Apr. 2, 2024

(54) SYSTEM AND METHOD ASSOCIATED WITH EXPEDIENT DETERMINATION OF LOCATION OF ONE OR MORE OBJECT(S) WITHIN A BOUNDED PERIMETER OF 3D SPACE BASED ON MAPPING AND NAVIGATION TO A PRECISE POI DESTINATION USING A SMART LASER POINTER DEVICE

(71) Applicant: The Research Foundation for the State University of New York, Albany, NY (US)

(72) Inventors: Bing Zhou, Centereach, NY (US); Fan Ye, East Setauket, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 264 days.

(21) Appl. No.: 17/055,876

(22) PCT Filed: Jun. 4, 2019

(86) PCT No.: PCT/US2019/035400
§ 371 (c)(1),
(2) Date: Nov. 16, 2020

(87) PCT Pub. No.: WO2019/236588
PCT Pub. Date: Dec. 12, 2019

(65) Prior Publication Data
US 2021/0207974 A1 Jul. 8, 2021

Related U.S. Application Data

(60) Provisional application No. 62/680,131, filed on Jun. 4, 2018.

(51) Int. Cl.
*G01C 21/36* (2006.01)
*G01C 21/00* (2006.01)
(Continued)

(52) U.S. Cl.
CPC ....... *G01C 21/3602* (2013.01); *G01C 21/206* (2013.01); *G01C 21/3811* (2020.08);
(Continued)

(58) Field of Classification Search
None
See application file for complete search history.

(56) References Cited

U.S. PATENT DOCUMENTS 7,038,661 B2  5/2006  Wilson et al.
7,135,992 B2  11/2006  Karlsson et al.
(Continued)

FOREIGN PATENT DOCUMENTS

DE  102010011528 A1  9/2011
DE  202010017899 U1  2/2013
(Continued)

OTHER PUBLICATIONS

Mendez, M. & T.J. Pingel. (2018). Labeling Systems for 3D Printed Maps for People with Visual Impairments. Poster presented at 2018 Northern Illinois University Undergraduate Research and Artistry Day, DeKalb, IL, Apr. 2018. 1 page.
(Continued)

*Primary Examiner* — Hongye Liang
(74) *Attorney, Agent, or Firm* — Hoffmann & Baron, LLP

(57) ABSTRACT

An object mapping system for determination of a point of interest (POI) in an environment, including: creating a map of the environment; performing object recognition to locate objects of interest based on characteristics of the environment; generating a map with tags of the objects and the characteristics; providing navigation to guide a device to an
(Continued)

object of interest selected from the objects based on a distance from a current location to a destination location of the device; determining angles from an initial position of a laser pointer to the object; generating signals to rotate servomotors based on the angles; processing the signals to rotate the servomotors such that the pointer is rotated from the initial position in coordinate-based directional angles to the object; generating a laser beam that targets the object for determination of the POI associated with the object that is associated with destination location of the computing device.

27 Claims, 36 Drawing Sheets

(51) Int. Cl.
  *G01C 21/20* (2006.01)
  *G06V 10/764* (2022.01)
  *G06V 20/10* (2022.01)
  *G06V 20/64* (2022.01)
  *G06V 40/16* (2022.01)

(52) U.S. Cl.
  CPC ....... *G01C 21/383* (2020.08); *G01C 21/3848* (2020.08); *G01C 21/3867* (2020.08); *G06V 10/764* (2022.01); *G06V 20/10* (2022.01); *G06V 20/64* (2022.01); *G06V 20/647* (2022.01); *G06V 40/172* (2022.01)

(56) References Cited

U.S. PATENT DOCUMENTS

| | | | |
|---|---|---|---|
| 7,729,515 B2 | 6/2010 | Mandella et al. | |
| 8,138,938 B2 | 3/2012 | Troy et al. | |
| 8,384,698 B2 | 2/2013 | Kong | |
| 9,007,197 B2 | 4/2015 | Breed | |
| 9,044,857 B2 | 6/2015 | Somerville | |
| 9,103,671 B1* | 8/2015 | Breed | G01S 13/865 |
| 9,619,104 B2 | 4/2017 | Xin et al. | |
| 9,733,764 B2 | 8/2017 | Gu et al. | |
| 9,823,782 B2 | 11/2017 | Gu et al. | |
| 10,546,419 B2 | 1/2020 | Zweigle et al. | |
| 10,556,356 B2 | 2/2020 | Rivers et al. | |
| 10,769,844 B1* | 9/2020 | Rezvani | G05D 1/0094 |
| 10,788,428 B2 | 9/2020 | Troy et al. | |
| 10,791,275 B2 | 9/2020 | Troy et al. | |
| 10,866,320 B2 | 12/2020 | Nagalla et al. | |
| 10,949,579 B2 | 3/2021 | Wodrich et al. | |
| 11,082,249 B2 | 8/2021 | Wang et al. | |
| 11,475,177 B2 | 10/2022 | Wodrich et al. | |
| 11,758,111 B2 | 9/2023 | Shen et al. | |
| 2002/0145607 A1 | 10/2002 | Dimsdale | |
| 2004/0123048 A1 | 6/2004 | Mullins et al. | |
| 2006/0259574 A1 | 11/2006 | Rosenberg | |
| 2009/0207135 A1 | 8/2009 | Wilson et al. | |
| 2012/0029817 A1* | 2/2012 | Khorashadi | G09B 29/106 701/451 |
| 2013/0162971 A1 | 6/2013 | Winter et al. | |
| 2014/0005933 A1 | 1/2014 | Fong et al. | |
| 2014/0053077 A1 | 2/2014 | Unnikrishnan et al. | |
| 2014/0129990 A1 | 5/2014 | Xin et al. | |
| 2014/0152558 A1 | 6/2014 | Salter et al. | |
| 2015/0029489 A1 | 1/2015 | Metzler et al. | |
| 2015/0212703 A1* | 7/2015 | Luckett, Jr. | G06T 19/006 345/158 |
| 2015/0339855 A1 | 11/2015 | Diaz et al. | |
| 2016/0078037 A1 | 3/2016 | Ziezold et al. | |
| 2018/0074508 A1* | 3/2018 | Kleiner | A47L 11/4011 |
| 2018/0180733 A1 | 6/2018 | Smits | |
| 2018/0231640 A1 | 8/2018 | Han et al. | |
| 2020/0005076 A1* | 1/2020 | Dill | A63J 5/02 |

FOREIGN PATENT DOCUMENTS

| | | |
|---|---|---|
| EP | 1168232 A1 | 1/2002 |
| EP | 1840507 A1 | 3/2007 |
| EP | 2607841 A2 | 6/2013 |
| EP | 3527939 A1 | 8/2019 |
| JP | 2000-509150 A | 7/2000 |
| JP | 2003-37840 A | 2/2003 |
| JP | 2018-132524 A | 8/2018 |
| JP | 2020-514713 A | 5/2020 |
| JP | 6830936 B2 | 1/2021 |
| JP | 7072628 B2 | 5/2022 |
| KR | 10-2015-0092165 A | 8/2015 |
| KR | 10-2100051 B1 | 4/2020 |
| WO | 2007038193 A2 | 4/2007 |
| WO | 2013/113758 A1 | 8/2013 |
| WO | 2014168851 A1 | 10/2014 |
| WO | 2018/035499 A2 | 2/2018 |
| WO | 2020/222871 A1 | 11/2020 |

OTHER PUBLICATIONS

Assam, Aieat, "Sensor-Enhanced Imaging," Doctoral Thesis, University of Birmingham, School of Electronic, Electrical and Computer Engineering, Dec. 2012, pp. 1-251.

Li, Yinggang, et al., "Scalable WIM: Effective Exploration in Large-Scale Astrophysical Environments," IEEE Transactions on Visualization and Computer Graphics, vol. 12, No. 5 pp. 1005-1012 (2006).

International Search Report and Written Opinion dated Aug. 8, 2019, issued in International Application No. PCT/US2019/035400.

Zhang, Z., et al., (Jun. 2012). "Swordfight: Enabling a New Class of Phone-to-Phone Action Games on Commodity Phones." In Proceedings of the 10th International Conference on Mobile Systems, Applications, and Services (pp. 1-14).

Alzantot, M., et al., (Sep. 2012). "CrowdInside: Automatic Construction of Indoor Floorplans." Proceedings of the 20th International Conference on Advances in Geographic Information Systems. 2012, pp. 1-11.

Chen, S., et al., (Nov. 2015). "Rise of the Indoor Crowd: Reconstruction of Building Interior View Via Mobile Crowdsourcing." In Proceedings of the 13th ACM Conference on Embedded Networked Sensor Systems, pp. 59-71.

Chen, S., et al., (Jun. 2015). "CrowdMap: Accurate Reconstruction of Indoor Floor Plans from Crowdsourced Sensor-Rich Videos." In 2015 IEEE 35th International Conference on Distributed Computing Systems, pp. 1-10, IEEE.

Dong, J., et al., (Nov. 2015). "iMoon: Using Smartphones for Image-Based Indoor Navigation." In Proceedings of the 13th ACM Conference on Embedded Networked Sensor Systems, pp. 85-97.

Dubbelman, G., et al., (Oct. 2010). "Efficient Trajectory Bending with Applications to Loop Closure." In 2010 IEEE/RSJ International Conference on Intelligent Robots and Systems, pp. 4836-4842, IEEE.

Elhamshary, M., et al., (Jun. 2016). "TransitLabel: A Crowd-Sensing System for Automatic Labeling of Transit Stations Semantics." In Proceedings of the 14th Annual International Conference on Mobile Systems, Applications, and Services, pp. 193-206.

Gao, R., et al., (Sep. 2014). "Jigsaw: Indoor Floor Plan Reconstruction Via Mobile Crowdsensing." In Proceedings of the 20th Annual International Conference on Mobile Computing and Networking, pp. 249-260.

Georgiev, P., et al., (Nov. 2014). "DSP.Ear: Leveraging Co-Processor Support for Continuous Audio Sensing on Smartphones." In Proceedings of the 12th ACM Conference on Embedded Network Sensor Systems, pp. 295-309.

Graham, D., et al., (2015). "A Software-Based Sonar Ranging Sensor for Smart Phones." IEEE Internet of Things Journal, 2(6), 479-489.

Hennecke, M.H., et al., (May 2011). "Towards Acoustic Self-Localization of Ad Hoc Smartphone Arrays." In 2011 Joint Workshop on Hands-free Speech Communication and Microphone Arrays, pp. 127-132, IEEE.

(56) References Cited

OTHER PUBLICATIONS

Huang, D., et al., (Nov. 2014). "Feasibility and Limits of Wi-Fi Imaging." In Proceedings of the 12th ACM Conference on Embedded Network Sensor Systems, pp. 266-279.

Zhang, H., et al., (Oct. 2016). "DopEnc: Acoustic-Based Encounter Profiling Using Smartphones." In Proceedings of the 22nd Annual International Conference on Mobile Computing and Networking (pp. 294-307).

Jaynes, E.T. (2003). "Probability Theory: The Logic of Science." Cambridge University Press.

Jiang, Y., et al., (Sep. 2013). "Hallway Based Automatic Indoor Floorplan Construction Using Room Fingerprints." In Proceedings of the 2013 ACM International Joint Conference on Pervasive and Ubiquitous Computing, pp. 315-324.

Khoshelham, K., et al., (2012). "Accuracy and Resolution of Kinect Depth Data for Indoor Mapping Applications." Sensors, 12(2), pp. 1437-1454.

Klepeis, N. E., et al., (2001). "The National Human Activity Pattern Survey (NHAPS): A Resource for Assessing Exposure to Environmental Pollutants." Journal of Exposure Analysis & Environmental Epidemiology, 11(3), pp. 231-252.

Lane, N.D., et al., (Sep. 2015). "DeepEar: Robust Smartphone Audio Sensing in Unconstrained Acoustic Environments Using Deep Learning." In Proceedings of the 2015 ACM International Joint Conference on Pervasive and Ubiquitous Computing, pp. 283-294.

Liu, H., et al., (Aug. 2012). "Push the Limit of WiFi Based Localization for Smartphones." In Proceedings of the 18th Annual International Conference on Mobile Computing and Networking, pp. 305-316.

Liu, J., et al., (Sep. 2015). "Snooping Keystrokes with mm-Level Audio Ranging on a Single Phone." In Proceedings of the 21st Annual International Conference on Mobile Computing and Networking, pp. 142-154.

Liu, K., et al., (Jun. 2013). "Guoguo: Enabling Fine-Grained Indoor Localization Via Smartphone." In Proceeding of the 11th Annual International Conference on Mobile Systems, Applications, and Services, pp. 235-248.

Lu, H., et al., (Sep. 2012). "StressSense: Detecting Stress in Unconstrained Acoustic Environments Using Smartphones." In Proceedings of the 2012 ACM Conference on Ubiquitous Computing, pp. 351-360.

Mao, W., et al., (Oct. 2016). "CAT: High-Precision Acoustic Motion Tracking." In Proceedings of the 22nd Annual International Conference on Mobile Computing and Networking, pp. 69-81.

Nandakumar, R., et al., (May 2015). "Contactless Sleep Apnea Detection on Smartphones." In Proceedings of the 13th Annual International Conference on Mobile Systems, Applications, and Services, pp. 45-57.

Nandakumar, R., et al., (May 2016). "FingerIO: Using Active Sonar for Fine-Grained Finger Tracking." In Proceedings of the 2016 CHI Conference on Human Factors in Computing Systems, pp. 1515-1525.

Orfanidis, S. J. (1988), "Optimum Signal Processing: An Introduction," 2d ed., Macmillan Publishing Company.

Peng, C., et al., (Nov. 2007). "BeepBeep: A High Accuracy Acoustic Ranging System Using COTS Mobile Devices." In Proceedings of the 5th International Conference on Embedded Networked Sensor Systems, pp. 1-14.

Roy, N., et al., (Jun. 2014). "I am a Smartphone and I can Tell My User's Walking Direction." In Proceedings of the 12th Annual International Conference on Mobile Systems, Applications, and Services, pp. 329-342.

Sankar, A., et al., (Oct. 2012). "Capturing Indoor Scenes with Smartphones." In Proceedings of the 25th Annual ACM Symposium on User Interface Software and Technology, pp. 403-412.

Shen, G., et al., (2013). "Walkie-Markie: Indoor Pathway Mapping Made Easy." In Presented as Part of the 10th USENIX Symposium on Networked Systems Design and Implementation (NSDI '13), pp. 85-98.

Snavely, N., et al., (2010). "Scene Reconstruction and Visualization from Community Photo Collections." Proceedings of the IEEE, 98(8), 1370-1390.

Yun, S., et al., (May 2015). "Turning a Mobile Device Into a Mouse in the Air." In Proceedings of the 13th Annual International Conference on Mobile Systems, Applications, and Services (pp. 15-29).

Surmann, H., et al., (2003). "An Autonomous Mobile Robot with a 3D Laser Range Finder for 3D Exploration and Digitalization of Indoor Environments." Robotics and Autonomous Systems, 45(3-4), 181-198.

Suykens, J.A.K., et al., (1999). "Least Squares Support Vector Machine Classifiers." Neural Processing Letters, 9(3), 293-300.

Tardos, J. D., (2002). "Robust Mapping and Localization in Indoor Environments Using Sonar Data." The International Journal of Robotics Research, 21(4), 311-330.

Ting, J. A., et al., (Oct. 2007). "A Kalman Filter for Robust Outlier Detection." In 2007 IEEE/RSJ International Conference on Intelligent Robots and Systems (pp. 1514-1519). IEEE.

Wang, H., et al., (Jun. 2012). "No Need to War-Drive: Unsupervised Indoor Localization." In Proceedings of the 10th International Conference on Mobile Systems, Applications, and Services (pp. 197-210).

Wang, J., et al., (Jun. 2014). "Ubiquitous Keyboard for Small Mobile Devices: Harnessing Multipath Fading for Fine-Grained Keystroke Localization." In Proceedings of the 12th Annual International Conference on Mobile Systems, Applications, and Services (pp. 14-27).

Wang, W., et al., (Oct. 2016). "Device-Free Gesture Tracking Using Acoustic Signals." In Proceedings of the 22nd Annual International Conference on Mobile Computing and Networking (pp. 82-94).

Yang, J., et al., (Sep. 2011). "Detecting Driver Phone Use Leveraging Car Speakers." In Proceedings of the 17th Annual International Conference on Mobile Computing and Networking (pp. 97-108).

Mendez, Matthew W., "3D Printed Maps for People with Visual Impairments", (https://huskiecommons.lib.niu.edu/cgi/viewcontent.cgi?article=1001&context-studentengagement-projects) published on May 4, 2018, retrieved on Oct. 11, 2023.

\* cited by examiner

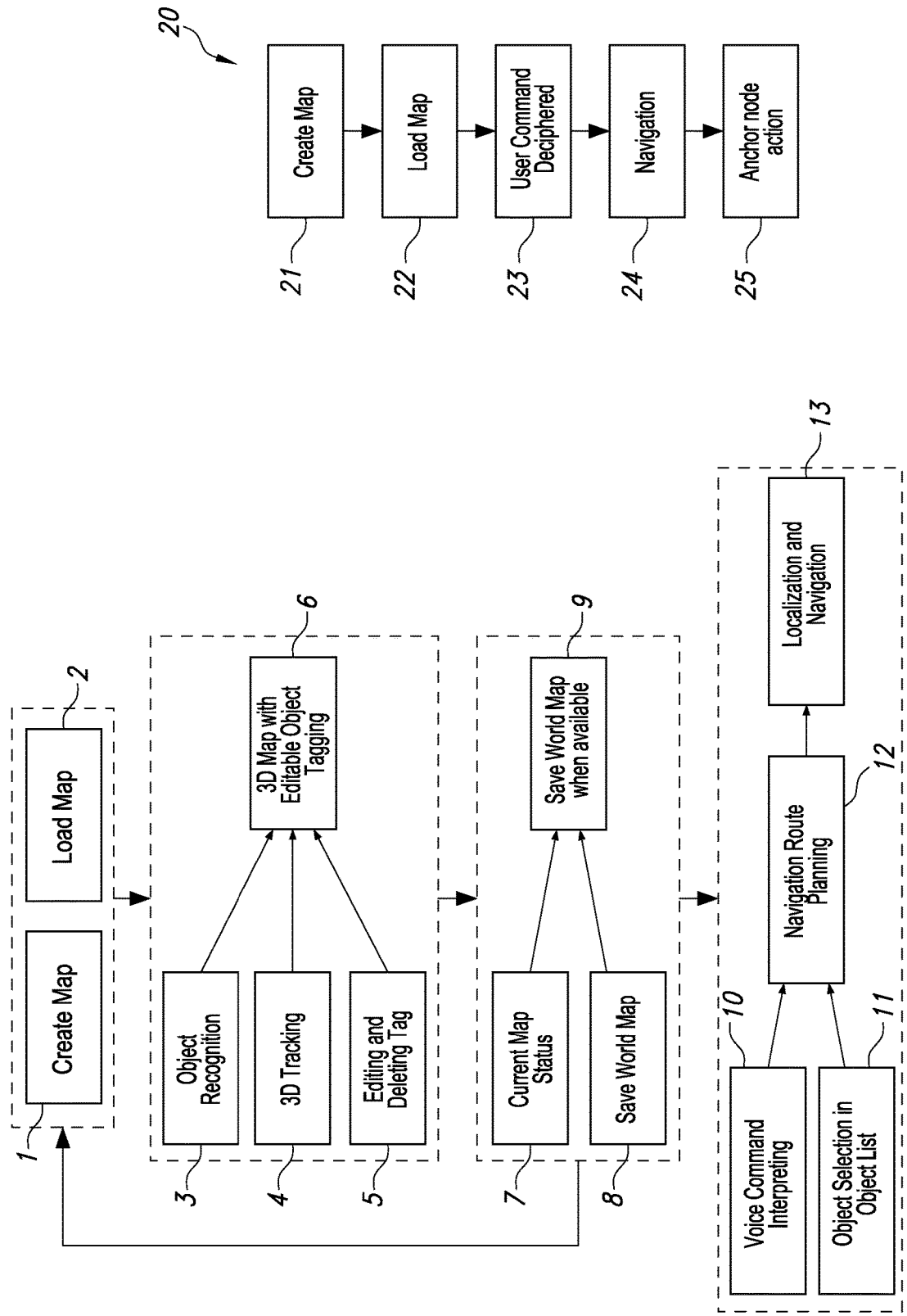

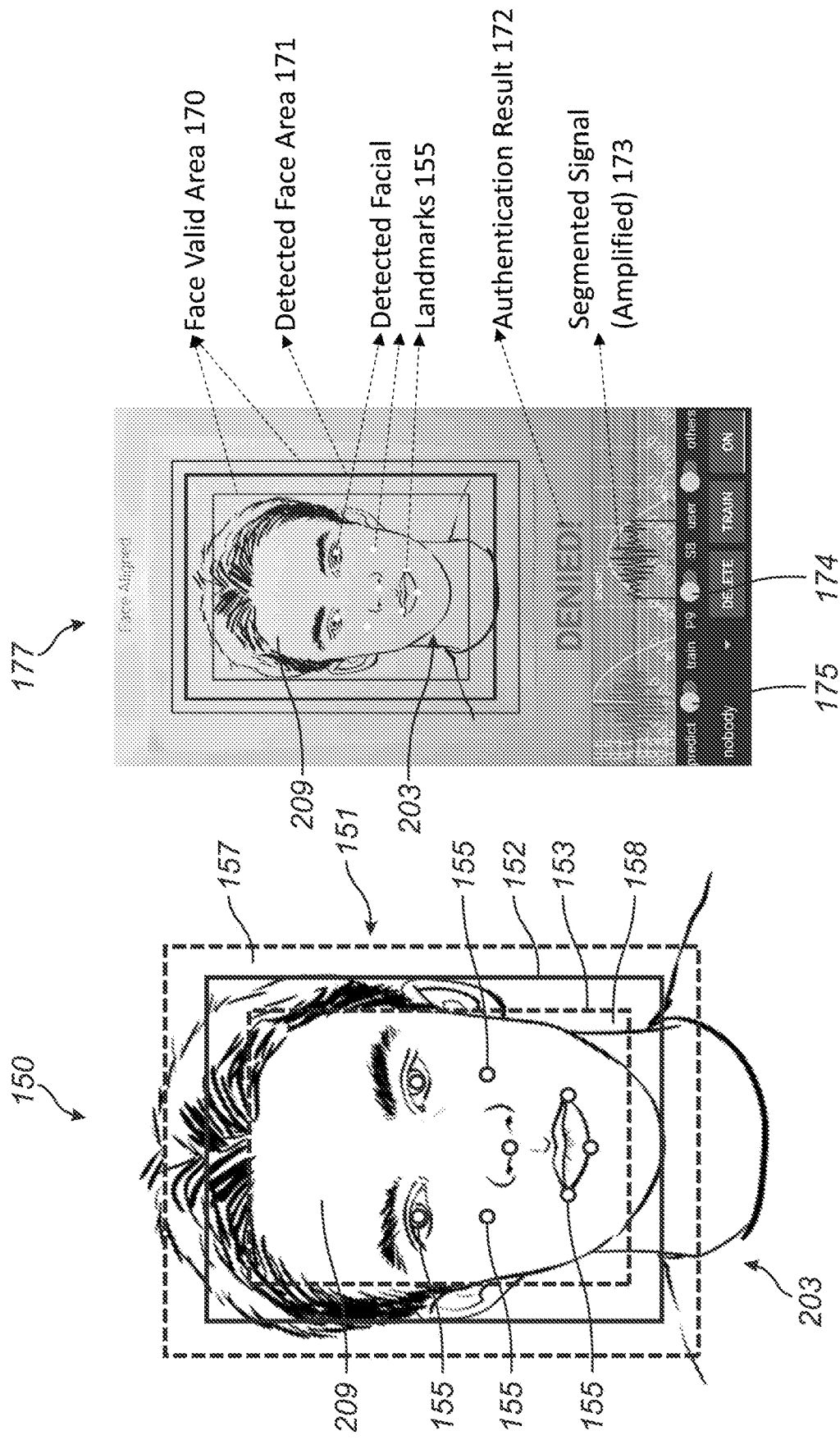

SYSTEM AND METHOD ASSOCIATED WITH EXPEDIENT DETERMINATION OF LOCATION OF ONE OR MORE OBJECT(S) WITHIN A BOUNDED PERIMETER OF 3D SPACE BASED ON MAPPING AND NAVIGATION TO A PRECISE POI DESTINATION USING A SMART LASER POINTER DEVICE

CROSS-REFERENCE TO RELATED APPLICATIONS

The present application is the U.S. National Phase of International Patent Application No. PCT/US2019/035400, filed on Jun. 4, 2019, which in turn claims priority to U.S. provisional Application No. 62/680,131, filed on Jun. 4, 2018, the entire contents of which are each incorporated by reference herein in their entirety for all purposes.

FIELD OF THE DISCLOSURE

The present disclosure relates to a system and method associated with expedient determination of the location of one or more objects of interest in a 3D space using a smart laser pointer and related object mapping system. Even more particularly, the present invention relates to a novel system and method that implements indoor mapping, navigation and the determination of objects in a defined 3D space, including on a fine-granularity scale, by effecting precise rotational movement of one or more laser pointers to target the one or more objects of interest with an emitting laser beam. The present system and method can further operate on user voice command which in certain embodiments, incorporates additional authentication of voice command and/or user including predictive analysis of acoustic features and visual landmark features of the user relative to an epoch of time during use of the smart laser point and related system.

BACKGROUND

Determining and/or finding the location of a desired object in cluttered and/or large or complex indoor environments can pose a challenge for both a normal user or otherwise, a user that suffers from a form of impairment, such as visual impairment. While current navigational systems and/or augmented reality systems offer immersion of a user into virtual reality allowing natural and safe human locomotion within a circumscribed physical environment and/or safe navigation from one location to another with pointed and particularized directions in a virtualized world map of their current location to the destination location, there is currently a need for a system and method that can identify a point of interest (POI) within an indoor environment or other environment in 3D space instantly in real-time, while providing voice-based interaction coupled with indoor navigation to the POI and/or object of interest.

There is currently a need for such a system and method that is cost-effective to the consumer, and would not require costly additional hardware other than popular and known personal or mobile computing devices and/or smartphones.

There is also currently a need for such a system and method for a business merchant who can leverage such indoor anchor node systems to facilitate use of a system that the user can achieve which can achieve high balanced accuracy using existing hardware within the indoor environment that is cost-effective to the merchant or institution which can be used in assisting the user of the mobile computing device identify a point of interest (POI) within the indoor environment or other environment in 3D space instantly in real-time, while providing voice-based interaction coupled with indoor navigation to the POI and/or object of interest.

Additionally, there is a need for such a system that is coupled with efficient and effective user authentication on smartphones or other mobile devices on voice command for an added layer of security during use thereof. In particular, there is a need for an acoustics echo-signature based authentication system that leverages active and novel acoustic sensing of unique facial depth of a user combined with visual features for user authentication, which can achieve high balanced accuracy using existing hardware.

In order to achieve resilient, secure and easy-to-use authentication using acoustic signals and visual aspects, it is desirable to implement a user authentication system embedded in the smartphone or mobile device without requiring any additional hardware such as sensors.

Hence, it is desirable to implement a novel system and method associated with expedient determination of location of one or more objects, even among clutter, in a bounded 3D space based on mapping and navigation of user device to a precise laser signal generated by a smart-laser pointer and related system.

Hence, it is further desirable to implement such system that in certain embodiments may include voice-based user facial authentication based on prediction of an echo-signature associated with a user during registration and/or user authentication of their profile and further implementation of the claimed system and method.

It is further desirable to achieve object tagging in a defined 3D space to facilitate object finding for the user by positioning augmented reality enabled 3D tracking and tagging.

It is further desirable to achieve voice-controlled automatic object pointing using an anchor node system coupled with the indoor environment so that a smart laser pointer can be controlled to achieve identifying an object of interest by emitting an IR laser that is targeted on the object of interest, hence assisting a user locate an object of interest among clutter or in a complex 3D space.

It is further desirable to implement a smart device controlled laser pointer for fast and expedient object finding using voice-based interaction for indoor navigation, for either object finding among clutter, a complex indoor environment and/or to assist a visually impaired individual.

It is further desirable to use such smart laser point system and method in certain environments such as large retail stores, in order to assist stores or other facilities internally with managing inventory. Other example uses include locating and managing inventory of books in libraries; identifying medicine more efficiently in pharmacies; unmanned supermarkets such as Amazon Go® such that users can voice command their smartphone which item(s) they are interested in with a respective mapping route being created for each item and the object is pointed out by the laser pointer and/or with simultaneous voice emission on the user's PDA or from the actual anchor node to assist for example, visually impaired individuals.

It is further desirable to assist individuals with vision impairment or other impairments by providing the option for voice-based interaction and navigation to an object of interest.

It is further desirable to implement a system and method to assist with expedient determination of location of objects in applications such as seniors, pharmaceutical, libraries, and/or other industries in which locating an object among clutter is a challenge.

It is further desirable to implement a system and method that uses three modules, a mobile device for object tagging, a hardware platform for precise laser pointer control and a PC or mobile computing device based console.

It is further desirable to implement an acoustic based echo-signature authentication system and related method that emits nearly inaudible sound signals from the earpiece speaker of the user's smartphone device in order to "illuminate" the user's face. The extracted acoustic features from the echoes are combined with visual facial landmarks detected from the frontal camera and used to authenticate the user, without requiring any additional hardware components being added to existing smartphone devices and which cannot be easily spoofed.

It is further desirable to implement a novel echo signature authentication system that actively emits almost inaudible acoustic signals from the earpiece speaker of the smartphone device in order to "illuminate" the user's face, and authenticate the user by the unique features extracted from any of the echoes and acoustic signals that bounce off the 3D facial contour of a user's face.

It is further desirable to effectively combat the required changes in phone-holding poses and instead implement the echoes (i.e. acoustic signals) that bounce off the 3D facial contours of a user. In certain aspects or embodiment an end-to-end hybrid machine learning framework is implemented, which extracts representative acoustic features using a convolutional neural network, and fuses vision and acoustic features to a support vector machine (SVM) for final authentication.

In certain aspects or embodiments, a Convolutional Neural Network (CNN) is trained to extract reliable acoustic features, which may also be further combined with visual facial landmark locations that are in turn, input into a binary Support Vector Machine (SVM) classifier for the final layer of authentication of the user.

SUMMARY OF THE INVENTION

In accordance with an embodiment or aspect, the present technology is directed to a system and method associated with expedient determination of location of one or more objects, even among clutter, in a bounded 3D space based on mapping and navigation of user device to a precise laser signal generated by a smart-laser pointer and related system. In certain embodiments, such system may include voice-based user facial authentication based on prediction of an echo-signature associated with a particular user during registration and/or user authentication of their profile and further implementation of the claimed system and method.

In particular, in accordance with an embodiment or aspect, the presently disclosed technology is directed to an object mapping system and method associated with expedient determination of a location of one or more coordinate points of interest (POI) in a bounded 3D environment. The method comprises an anchor node device that includes a processor that performs various operations. The system comprises a laser pointer device and an anchor node device that includes a processor that performs similar various operations.

In accordance with an embodiment or aspect, disclosed is a system and method that includes the processor perform the various operations that include creating an initial map comprising unique characteristics associated with a bounded physical environment in response to a request by a user via a computing device. The system and method further includes performing object recognition analysis in order to determine labels associated with objects using image recognition processing based at least on a user command to locate one or more objects of interest and the unique characteristics associated with the bounded physical environment. The system and method yet further includes generating a world map representation with editable object tags associated with the one or more objects of interest and the unique characteristics associated with the bounded physical environment. The system and method further includes providing navigation instructions to guide the user device to the one or more objects of interest based on a distance analysis of a current location of the user device to a destination location. The system and method yet further includes generating a control signal to the anchor node based on an angle analysis associated with the destination location and the object of interest location. The system and method further includes processing the control signal using the anchor node to facilitate rotation of at least one laser pointer device in one or more of an (x, y, z) coordinate-based directional angle. The system and method yet further includes generating a laser signal that targets the one or more objects of interest for expedient determination of the one or more coordinate points of interest (POI) associated with the one or more objects of interest and respective location.

The system and method in accordance with additional embodiments or aspects, further includes operations which are provided herein below respectively. In yet a further disclosed embodiment, the system and method further includes that a user command is transmitted using one or more of selection of the object of interest via a user interface selection menu and a voice command. In yet a further disclosed embodiment, the system and method further includes interpretation of the voice command in order to transmit a control signal to the anchor node. In yet a further disclosed embodiment, the system and method further includes that generating the control signal to the anchor node based on an angle analysis, further comprises a determination of at least one of a horizontal and vertical rotational value associated with the relative location of the object of interest to the anchor node. In yet a further disclosed embodiment, the system and method further includes determination of at least one of a horizontal and vertical rotational value associated with the relative location of the object of interest to the anchor node facilitates rotation of the laser pointer device, using the at least one of the horizontal and vertical rotational value as determined. In yet a further disclosed embodiment, the system and method further includes determination of at least one of a horizontal and vertical rotational value is further based on an absolute location of the object of interest in the world map representation using a first (x, y, z) coordinate value and an absolute location of the anchor device using a second (x, y, z) coordinate value. In yet a further disclosed embodiment, the system and method further includes that the unique characteristics associated with the bounded physical environment comprise one or more of 2D user trajectories, wall boundaries and 3D points of interest (POI).

In yet a further disclosed embodiment, the system and method further includes that the unique characteristics associated with the bounded physical environment further comprise underlying point cloud information that comprises 3D coordinates of feature points in the bounded physical environment and a visual features based world map, used for re-localization when a change in system status occurs. In yet a further disclosed embodiment, the system and method further includes that the world map representation is further based on augmented reality in displaying labels on real world images associated with the bounded physical environment. In yet a further disclosed embodiment, the system and method further includes that generating the world map representation further comprises registering a series of 3D coordinates associated with objects of interest or points of interest associated with the user device. In yet a further disclosed embodiment, the system and method further includes generating the world map representation further comprises mapping boundaries associated with a complex bounded physical environment by using acoustic echo signals, in order to refine respective boundaries drawn for the complex bounded physical environment in the world map representation.

In accordance with yet another disclosed embodiment, a computer readable medium is disclosed storing instructions that, when executed by a processing device, performs various operations. The various disclosed operations include creating an initial map comprising unique characteristics associated with a bounded physical environment in response to a request by a user via a computing device. Further disclosed operations include performing object recognition analysis in order to determine labels associated with objects using image recognition processing based at least on a user command to locate one or more objects of interest and the unique characteristics associated with the bounded physical environment. Yet a further disclosed operation includes generating a world map representation with editable object tags associated with the one or more objects of interest and the unique characteristics associated with the bounded physical environment. Yet a further disclosed operation includes providing navigation instructions to guide the user device to the one or more objects of interest based on a distance analysis of a current location of the user device to a destination location. Yet a further disclosed operation includes generating a control signal to the anchor node based on an angle analysis associated with the destination location and the object of interest location. Yet a further disclosed operation includes processing the control signal using the anchor node to facilitate rotation of at least one laser pointer device in one or more of an (x, y, z) coordinate-based directional angle. Yet further disclosed operations include generating a laser signal that targets the one or more objects of interest for expedient determination of the one or more coordinate points of interest (POI) associated with the one or more objects of interest and respective location.

In yet another disclosed embodiment, further includes that a user command is transmitted using one or more of selection of the object of interest via a user interface selection menu and a voice command. Yet a further disclosed embodiment includes interpretation of the voice command in order to transmit a control signal to the anchor node. Yet a further disclosed embodiment includes that generating the control signal to the anchor node based on an angle analysis, further comprises a determination of at least one of a horizontal and vertical rotational value associated with the relative location of the object of interest to the anchor node.

These and other purposes, goals and advantages of the present application will become apparent from the following detailed description read in connection with the accompanying drawings.

BRIEF DESCRIPTION OF THE DRAWINGS

The patent or application file may contain at least one drawing executed in color. Copies of this patent or patent application publication with any color drawing(s) will be provided by the respective Patent Office upon request and payment of any necessary fee.

Some embodiments or aspects are illustrated by way of example and not limitation in the figures of the accompanying drawings in which:

FIG. 1 illustrates an example flowchart of the workflow associated with identification of the location of an object in a defined 3D space, in accordance with an embodiment of the disclosed system and method.

FIG. 1A illustrates an example flowchart that delineates the core modules implemented by the smart laser pointer system, in accordance with an embodiment of the disclosed system and method.

FIG. 25D provides an illustration of determining facial landmarks and respective face tracking, in accordance with an embodiment of the disclosed authentication system and method.

FIG. 25E provides an illustration of user authentication during an example implementation of an embodiment of the acoustic-based facial echo-signature system and method.

Figure 1B:
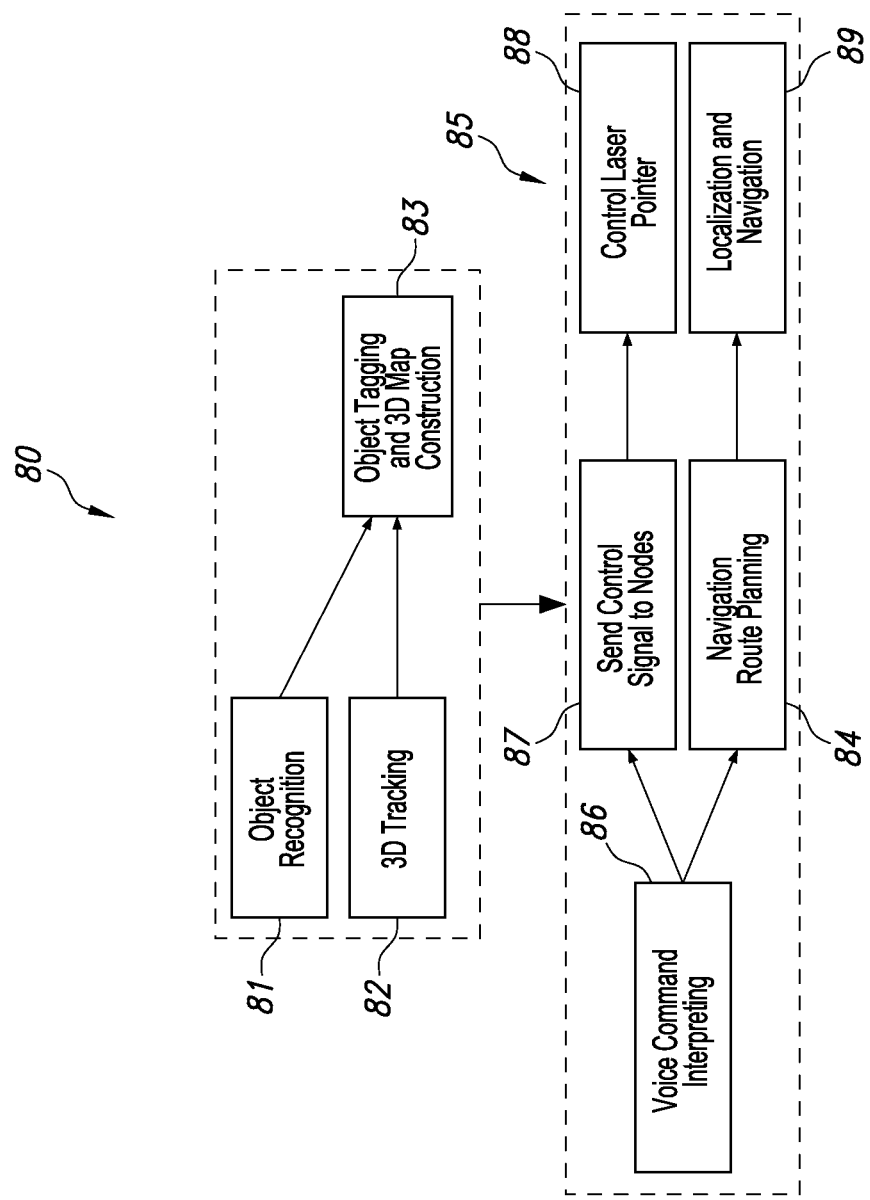
FIG. 1B provides a flowchart illustration that provides an overview of the phases associated with an example embodiment, including object recognition, object tagging, voice command interpretation, localization and navigation, in accordance with an embodiment of the disclosed system and method.

It should be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

The present disclosure relates to a system and method associated with expedient determination of the location of one or more objects in a 3D space using a smart laser pointer and related system. Even more particularly, the present invention relates to a novel system and method that implements indoor mapping, navigation and the determination of objects in a defined 3D space, including on a fine-granularity scale. The present system and method can further operate on user voice command which in certain embodiments, incorporates authentication of voice command and/or user including acoustic features and visual landmark features of the user relative to an epoch of time during use of the smart laser pointer, object mapping and navigation system and other related systems.

In certain embodiments or aspects, contemplated is an novel indoor mapping, navigation and determination of location of one or more objects on a fine-scale level, even in a cluttered or complex indoor or defined environment in 3D space.

In certain embodiments or aspects, further contemplated is a fine-level of granularity in implementation of one or more laser devices and/or related anchor nodes that can point to user-requested objects, even among cluttered and/or complex environments, with the ability to re-localize the device in the particular defined environment once the user system is re-located to and/or implemented at a different location.

In other embodiments or aspects, further contemplated is implementation of an acoustics-based echo-signature print associated with an original user of a device that is implemented during use of the disclosed smart laser system and method. Even more particularly, the present invention relates to a novel system and method that trains and augments a classification model in order to predict and implement the respective authentication of a joint features representation including acoustic features and visual landmark features associated with the user during an initial authentication of a user of the device and subsequent use of the smart laser pointer system and other related systems.

Referring to FIG. 1, shown is an overview of the disclosed smart laser navigation system and method. The steps are divided into four (4) major modules. In the first module, steps 1-2 are directed to constructing a 3D map of a defined indoor environment using for example, a mobile computing device, iPad, or other PDA device. During the second module (steps 3-6), the system performs object recognition via speech recognition, for example entered via voice command (and may further, in certain embodiments, employ user authentication module(s) such as echo signature acoustic authentication described for example in co-pending international PCT application No. PCT/2018/057951, the specification of which is incorporated by reference herein in its entirety). The second module (steps 3-6) performs indoor mapping and object recognition. The third module (steps 7-9) performs current map status determination and storing of the world map in for example, a database or system memory. The last module (steps 10-13) performs voice command interpretation, object selection, navigation and tracking real-time routes of the user, based on real-time navigation trajectory and localization sub-processes.

The system initiates a session to locate an object in a defined 3D environment by creation of a map as shown in step 1 of FIG. 1. The creation of a map as described further in connection with FIGS. 2 and 3, can be extended to complex indoor environments with predefined boundaries. The map is created and facilitated by a number of user device actions that leverages existing augmented reality technology, as described in greater detail in connection with FIG. 3 hereinbelow. The created map is loaded into the smart laser navigation system shown in step 2. In certain embodiments, step 1 requires the user to move a smart device, PDA, mobile computing device or other handheld personal computing device in a defined 3-D space environment and further tag objects of interest. A world map, for example using an AR kit, along with the tags that may be manually added by the user, are saved as the map.

Augmented reality (AR) generally describes user experiences that add 2D or 3D elements to the live view from a device's camera in a way that makes those elements appear to inhabit the real world. In certain embodiments, an ARKit combines device motion tracking, camera scene capture, advanced scene processing, and display conveniences to simplify the task of building an AR experience. These technologies can be used to create many kinds of AR experiences using either the back camera or front camera of for example, an iOS device. For example, augmented reality with the back camera can be used to use an AR experience display using a view from an iOS device's back-facing camera, augmented by other visual content, giving the user a new way to see and interact with the world around them. ARKit maps and tracks the real-world space the user inhabits, and matches it with a coordinate space for the system to place virtual content. Such example form of world tracking also offers features to make AR experiences more immersive, such as recognizing objects and images in the user's environment and responding to real-world lighting conditions and other environmental stimuli and/or objects that are present.

Referring back to step 2 of FIG. 1, the user device (via a user or otherwise pre-selected and/or automated selection) may select a saved map associated with a particular defined environment and load it in into the augmented reality (AR) scene. This map also will permit the user device to re-localize and display all saved tags. Next, the system proceeds to step 3 in which the process of object recognition is performed. In certain embodiments, step 3 process leverages machine learning models that are processed on the mobile device or other mobile computing device for object recognition, as described further herein below with respect to FIGS. 1A-2. In addition, the model can be fine-tuned to a specific building floor plan, architectural layout and/or interior design, in order to increase the accuracy of object recognition and related user navigation. In step 4, 3D tracking is implemented and can be accomplished for example, using the ARKit. In order to initialize 3D tracking, the system would need to re-localize, in certain embodiments. This is accomplished for example, using an ARKit. In other embodiments, Wi-Fi based localization is used to render a more robust system when the map is large. During re-localization, the system retrieves a saved map based on the new location and displays all the objects that were added since the initial creation or most recent version of such map.

Such process of re-localization is further described in greater detail herein below in connection with FIG. 5.

Proceeding to step 5 in FIG. 1, the system enables tag management. The tag names associated with one or more objects located within a particular mapped environment, can be further edited and/or deleted at user command. The output generated by steps 3-5 in FIG. 1, is generated in step 6. In certain embodiments a 3D map with editable object tagging is created during step 6, as a result of the processes described in steps 3-5. Next, steps 7-9 perform detailed real-time navigation trajectory. The system generates a particular trajectory for the user to reach a particular object requested via user voice command or user interface entry in their PDA or other mobile computing device, for example, entry of a typewritten name of object, such as a title of a book. In step 7, the current map status is shown when the user creates a map. The system indicates in step 7 if sufficient data is or was collected in order to save such created map during step 1. In step 8, the system saves the world map and all respective tags associated with objects in such defined environment. Next, the system saves the world map and related object tags once the map status indicates it is ready to save such world map in step 9. Next, the system employs voice command interpretation in step 10. The system next implements for voice recognition, for example, an API to translate voice commands to text and then interprets the text and executes the voice commands. All the tags associated with objects can be reviewed in a list which can be selected by the user via user interface selection by mouse, click, or other method of selection. Once selected in step 11, navigation to this object will commence. During step 12, the module computes the route for navigation to a specific user-selected object of interest. Next, the system navigates the user in step 13 to the object and using the rotational capabilities of the anchor node affixed with smart laser, will determine the exact rotation in the (x, y, z) axis to flash and emit the laser light by rotation of one or more servo motors or other controller that rotates the physical position of the smart laser's emitting light. Each of these steps 10-13 of module four (4) are described in greater detail herein below in connection with FIGS. 1A-4.

It is noted that the disclosed smart laser system and method includes five (5) core capabilities for indoor mapping, navigation, and object finding. The system can 1) create the map of a possibly complex indoor area; 2) add object/point of interests (POI); 3) provides navigation to POI; 4) performs fine-grained object finding by controlling lasers to point with precision at user requested objects; and/or 5) re-localizes the device in the indoor environment after it is powered on at a different location, by loading the saved map and displaying all the objects that were added previously or newly added to the map. The system can also provide navigation instructions to guide the user via a navigation map to reach the object by either selection of for example, via user-interface of the name of the object in the list or by interpretation of a user's voice command. A hardware anchor node receives control signals from mobile devices or other consoles such as a PC, and can actuate the one or more laser pointers to point out the point-of-interest (POI) requested by the user for efficient object finding.

Point of interest (POI) or POI Mapping is generally referred to data set that is quick, easy and accurate way to populate the mapping project with important places of feature/buildings/landmarks. POI data supports a range of application including digital mapping enhanced routing products and validation of databases. POI also known as feature of interest data supports a range of application including digital mapping, enhanced routing products and validation of private databases. POI mapping is very useful and efficient in digital map creation because it gives detail route information with picture of target site. It acts as a tool in navigation system. In the disclosed smart laser system and method, a POI refers to any POI data including user-selectable objects of interest (and/or user added objects associated with a map) in a particular environment.

FIG. 1A refers to the core modules that are implemented by the disclosed system. The overall process 20 shown in FIG. 1A begins with creation of the map in step 21. The map in certain embodiments consists of one or more components: 2D user trajectories, wall boundaries, 3D point of interests (POI) coordinates {represented as (x, y) or (x, y, z) spatial coordinates}, and the underlying point cloud/visual feature-based world map for re-localization process as shown and described in greater detail herein below in connection with FIG. 3.

Next, step 22 in FIG. 1A illustrates the step of loading the map created in step 21. The map in certain embodiments, is created by one or more user actions as the system leverages augmented reality technology to display labels on real world images and videos. The user is requested to point his/her device's camera to special locations (e.g., corners of walls), and click a button on the UI to enter and register the 3D coordinates of such locations. The device implements computer vision and inertial data to measure the relative distance and angle of those locations to the device. Thus, the device can determine the 3D coordinates of these locations. Next, the user device continues to point, and register a series of such locations, thus forming the boundaries of a simple or otherwise, complex indoor environment. The user also points and registers object/point(s) of interest (e.g., doors, pictures on the walls, books, other objects). The respective 3D spatial coordinates (x, y, z) will be recorded in the map as well.

Referring back to FIG. 1A, the system deciphers user command(s) in step 23. The system implements existing speech to text translation API on mobile platforms to translate the voice commands to text. In certain embodiments, the user selects for example, by click and hold of the microphone button, and speaks the commands. Next the user releases the button when the command is completed. The commands will be translated into text and displayed on the screen by the system. Keywords matching (searching object names in our object list) or more advanced machine learning approaches are used for selecting which object the user is seeking. Once identified, the user will be provided navigation instructions to that object, and control signals will be sent to corresponding anchor device(s) as shown for example, in FIG. 8, to actuate laser pointers to point to the requested object(s) of interest based on determined (x, y, z) coordinate locations of the one or more object(s) of interest.

In step 24, navigation is next performed by the system. In an example system, the route that has the shortest distance to the requested object is computed. The 3D coordinates and user trajectories, which are accessible areas in the saved world map, are converted to a connected graph, where nodes stand for objects, and edges stand for trajectories, aisles, stairs and elevators, each of which has a cost in the form of physical distance or moving time. The known Dukstra's algorithm can be used to compute the shortest path. Multiple possible routes that lead to the 3D coordinate of the object are computed and compared, and the shortest one is then chosen and displayed to the user. Such step of navigation is further shown and described in connection with FIGS. 2, 4 and 7 herein below.

Figure 8:
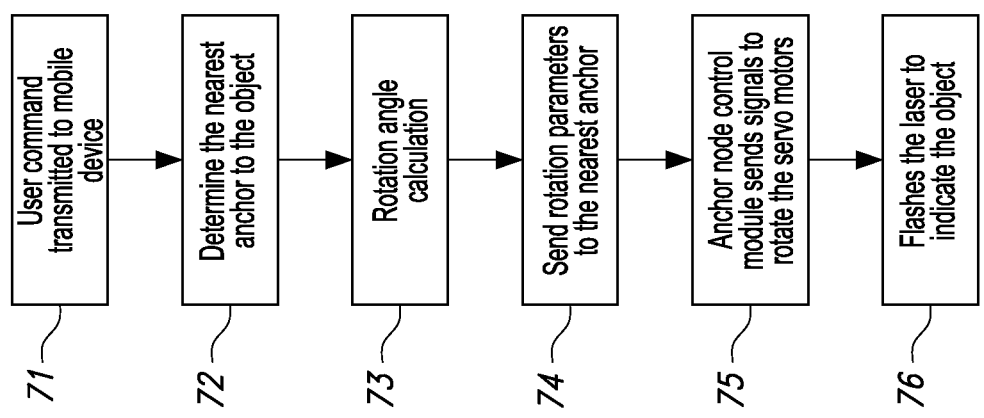
FIG. 8 is a flowchart illustration providing the steps in which system control signals effect anchor node control signals that rotate the laser pointer at certain angle(s) to target the object of interest with a laser light, in accordance with an embodiment of the disclosed system and method.

Finally, step 25 in FIG. 1A, illustrates the step of implementation by the anchor node device. In an example embodiment, the anchor hardware consists of a control unit, servo motors, and laser pointer. The control unit receives action commands from the mobile device (or any other console such as PC), and then control the servo motors to rotate them by a certain determined angle to point the laser pointer to the object. An exemplary anchor is shown in FIG. 8. The anchor device can receive commands from smart devices through wireless communication (e.g., Bluetooth, WIFI or other contemplated wireless transmission protocol including IR wireless communication, satellite communication, broadcast radio, microwave radio, Zigbee, etc.), and implements corresponding actions (pointing at one or more objects of interest with the laser pointer via emitted laser signal, with the laser pointer forming part of the anchor device). Rotational angles (both horizontal and vertical) are computed by the system and control signals are transmitted to the servomotors in order to generate the respective rotational angles that are required to steer the laser light via the servo motor controllers to the target destination of one or more requested object(s) of interest located in a particular indoor environment represented by the current world map on the user device.

In order for the system to perform the correct angle calculation that actuates the laser pointers to point out with targeted precision the POI requested by the user, in certain embodiments, it is based on the determined 3D coordinates of the laser device, and the object of interest. The relative orientation angle of the object to the device should determine the angle at which the servo motors rotate the laser pointer in the respective (x, y, z) axis and angle(s) of rotation determined with respect to the reference line/point of reference, such that the laser pointer can aim at and emit its laser beam on the target object of interest so that the determination of the location of the object is facilitated, and more easily identifiable to the user, as described further hereinbelow in connection with FIGS. 8 and 9 herein below.

At least two angles (alpha $\alpha$ and beta $\beta$) are determined for azimuth (horizontal) and elevation (vertical) rotations. In certain embodiments, two servo motors are used, one for horizontal rotation and one for vertical rotation. Hence, the coordinates (x, y, z) are the relative location of the object to the anchor node. Using variables (x_object, y_object, z_object) which represent the absolute location of the object in the map coordinate, and coordinates (x_anchor, y_anchor, z_anchor) to represent anchor location, then the relative location (x, y, z) of the object of interest=(x_object−x_anchor, y_object−y_anchor, z_object−z_anchor) as described further herein below in connection with FIGS. 8 and 9.

FIG. 1B provides a flowchart illustration that provides an overview of the phases associated with an example embodiment, including object recognition, object tagging, voice command interpretation, localization and navigation, in accordance with an embodiment of the disclosed system and method. In an example embodiment, a smart laser pointer device is implemented for expedient object finding. The system tracks the mobile device position in 3D space, recognizes the registered objects automatically, and tags their names in 3D virtual space, as further described herein below. Multiple embedded system controlled laser emitters may point to the object of interest based on user command whether by voice command or other command input, such that the object can be located easily.

Figure 13:
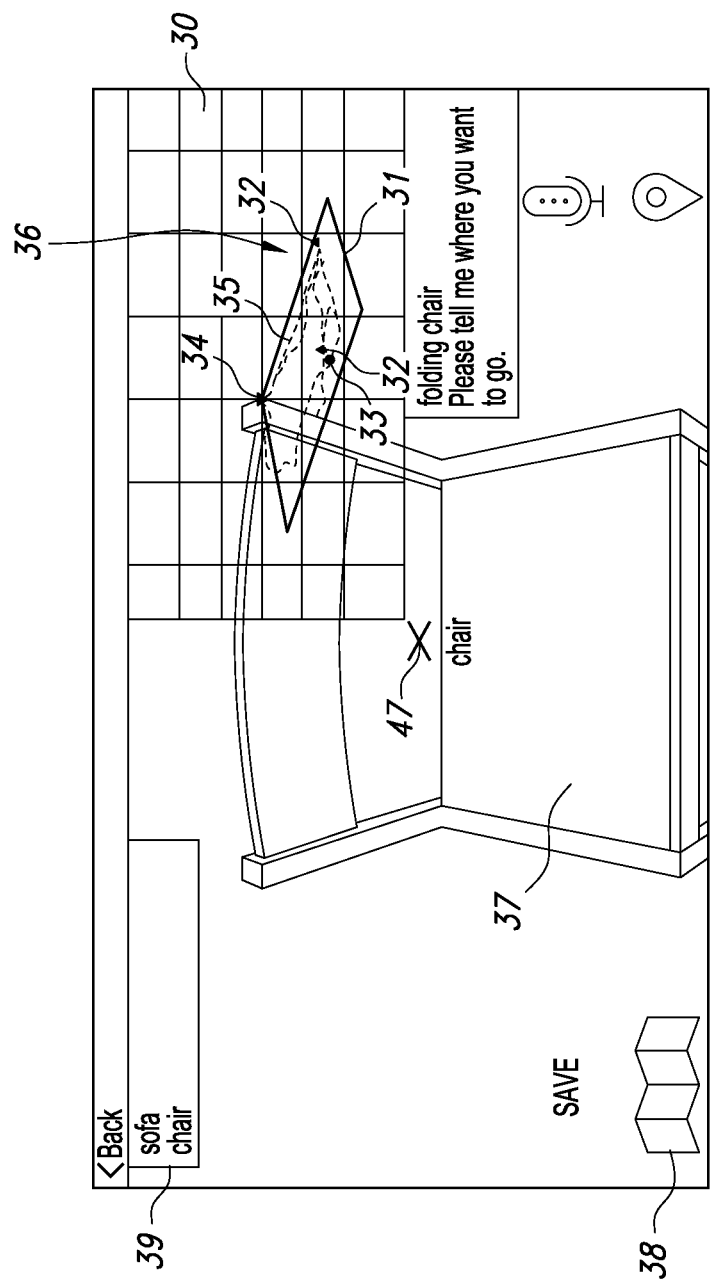
FIG. 13 illustrates an example user interface associated with mapping and navigation during implementation of the smart laser pointer system including respective 3D text label(s), in accordance with an embodiment of the disclosed system and method.

In particular, shown in FIG. 1B is an initial object tagging phase 80 associated with an embodiment of the smart laser pointer system. The second phase is the object finding phase 85. In the object tagging phase 80, the system undergoes two sub-phases: object recognition 81, 3D recognition 82 and object tagging and 3D map construction 83. During the object tagging and 3D map construction sub-phase 83, a map of respective points of interest (POIs) is generated by tagging their label names and respective 3D positions. A mobile device is used in certain embodiments to accomplish tagging. The device tracks the position in 3D space using augmented reality (AR) tracking (for example, available from ARKit from Apple or ARCore from Google®). The (x, y, z) coordinate positions of the POIs are automatically determined by pointing the device camera at the objects. In order to recognize the objects, computer vision based image recognition methods may be used. In the event of objects such as books or medicines, names are recognized by text recognition or barcode scanning. Next, a virtual label of their respective names are tagged in a virtual 3D space above the physical object (for example, the label chair as shown in FIG. 13).

Next, during the object finding phase 85 in FIG. 1B, the system may implement a mobile based or PC based system. The user may send voice command(s) to the mobile device of the POI, then the control signal (rotation angles to effect pointing of the laser in 3D space vertically and/or horizontally) is computed by the mobile device, or a backend computing service, which is transmitted to a hardware platform (for example, Raspberry pi) through wireless communication (Bluetooth, Zigbee or Wi-Fi). Finally, a path (for example, a shortest path) from the user to the POI is planned on the mobile device or the back-end. The hardware platform controls the laser pointer rotated by servo motors in order to point at the POI. Voice commands can also be transmitted from other inputs, such as PC console or browser based cloud front-end. Multiple raspberry-pi controlled laser emitters can be deployed to cover a larger area as needed, for example, multiple anchor nodes including raspberry-pi controlled laser emitters that cover each for example, an aisle in a supermarket or each aisle of books in a library.

The system may build an indoor map with object tags using object recognition process, 3D position tracking of the user as he/she navigates through the indoor environment in step 84, and hence the information can be combined to generate an indoor map representation with tags. The system may also implement point to point navigation in step 84 by using voice commands and interpretation in step 86, perform indoor navigation 84 and be able to point out using precision-based algorithms to effect the laser pointer be rotated in one or more of the (x, y, z) axis to emit its laser signal at the object of interest. The system can also be deployed for stock-out detection and loss prevention in shelf-monitoring application and other shop-lifting detection applications. Hence, the object mapping system will perform voice command interpretation in step 86, and sends control signal to anchor nodes in step 87 as well as perform navigational route planning in step 84 to create a map based on the user's entered object of interest in step 86. Next, the control signals are transmitted to the laser pointer in step 88 to effect rotational movement of the servo motors that are connected to the laser pointer such that the laser pointer can be rotated and aim precisely at the user's object of interest. Such determination of the actual angles of rotation are described further hereinbelow with respect to FIGS. 8 and 9. The relative orientation angle of the object to the device should determine the angle at which the servo motors rotate the laser pointer in the respective (x, y, z) axis and angle(s) of rotation determined with respect to the reference line/point of reference, such that the laser pointer can aim at and emit its laser beam on the target object of interest so that the determination of the location of the object is facilitated, and more easily identifiable to the user, as described further hereinbelow in connection with FIGS. 8 and 9 herein below. Further localization and navigation functions in step 89 are performed based on the user's current position and re-positioning, as described further hereinbelow with respect to at least FIGS. 4-6 and 10.

Figure 2:
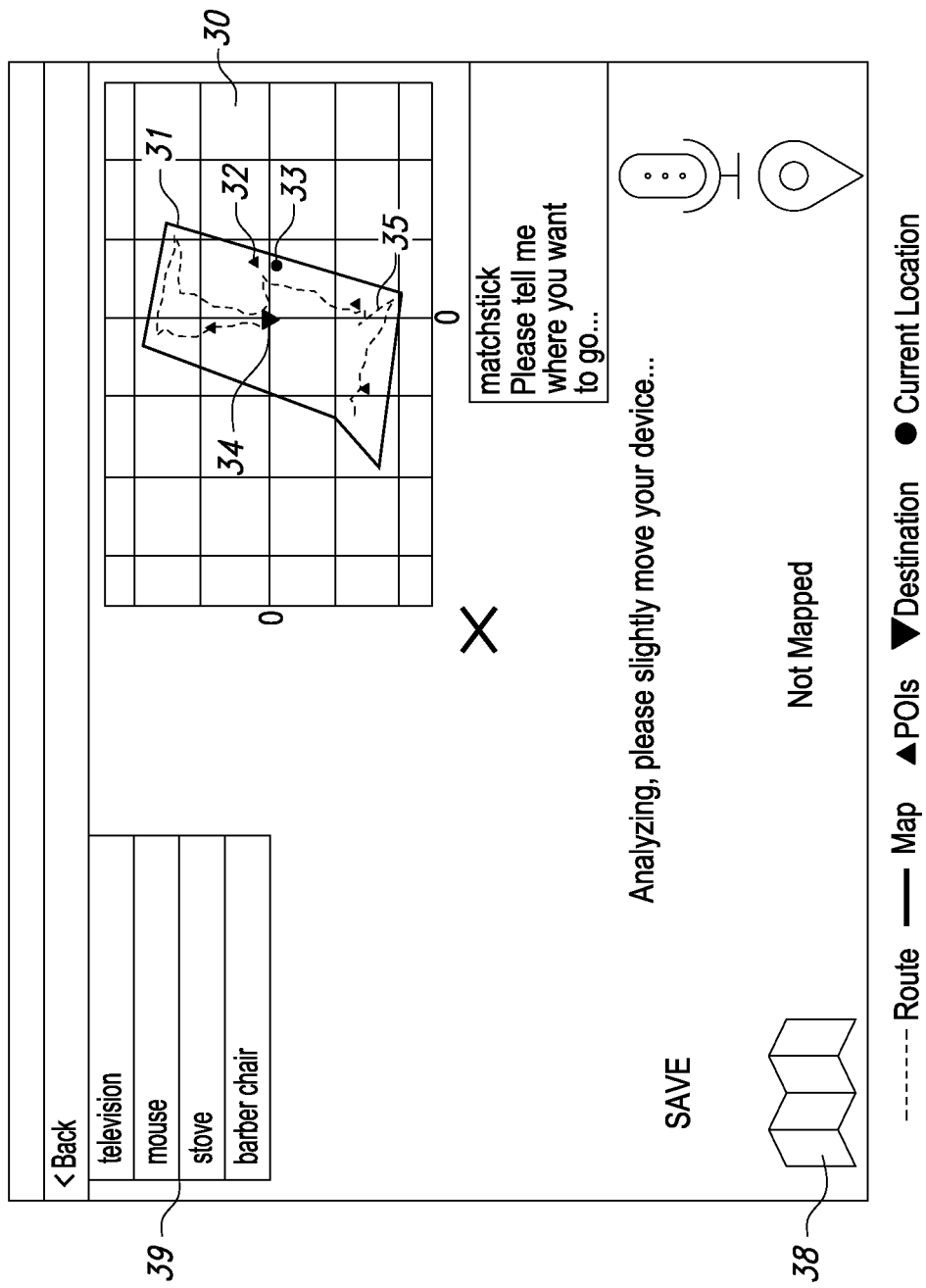
FIG. 2 illustrates an example user interface associated with mapping and navigation during implementation of the smart laser pointer system, in accordance with an embodiment of the disclosed system and method.

FIG. 2 illustrates an exemplary mapping and navigation user interface (UI) implemented by the smart laser pointer system. More particularly, FIG. 2 illustrates an example user interface associated with mapping and navigation during implementation of the smart laser pointer system, in accordance with an embodiment of the disclosed system and method.

The user can enter via keyboard or mouse entry, the object of interest or alternatively may select from the menu 39 of items shown (for example, television, mouse, stove, barber chair). Next shown is an overlaying grid 30 that provides the x-y coordinate grid template for an additional overlaying map defined by boundary line 31, located within the boundaries of the grid 30. Shown within the boundary lines 31 of the map, is the creation of a virtual reality mapping of a suggested route 35 to perform navigation and hence, reach a destination 34 starting from current location of user 33 or another location within the map 31. The user can implement such map boundary lines 31 and route 35 located there between, in order to navigate to and locate an object of interest, with the suggested route 35 being created based on the object of interest, shown in FIG. 2 as a dashed line or path. Respective points of interest (POIs) 32 are also shown within map boundary line 31. The POIs represent, in certain embodiments, the actual locations of objects of interest that are located within the boundaries of a particular defined indoor spatial environment. Also shown in FIG. 2, is a map button 38 which is used to create the wall boundaries or other delineating features such as a corner, associated with the room being mapped. In certain embodiments, the user holds the mobile device and walks simultaneously near each corner of the room or any respective turning locations, and selecting or clicking the map button 38, in order to mark a point. These respective turning points are connected one by one in order to draw and create the shape of the room in the respective map representation.

Figure 3:
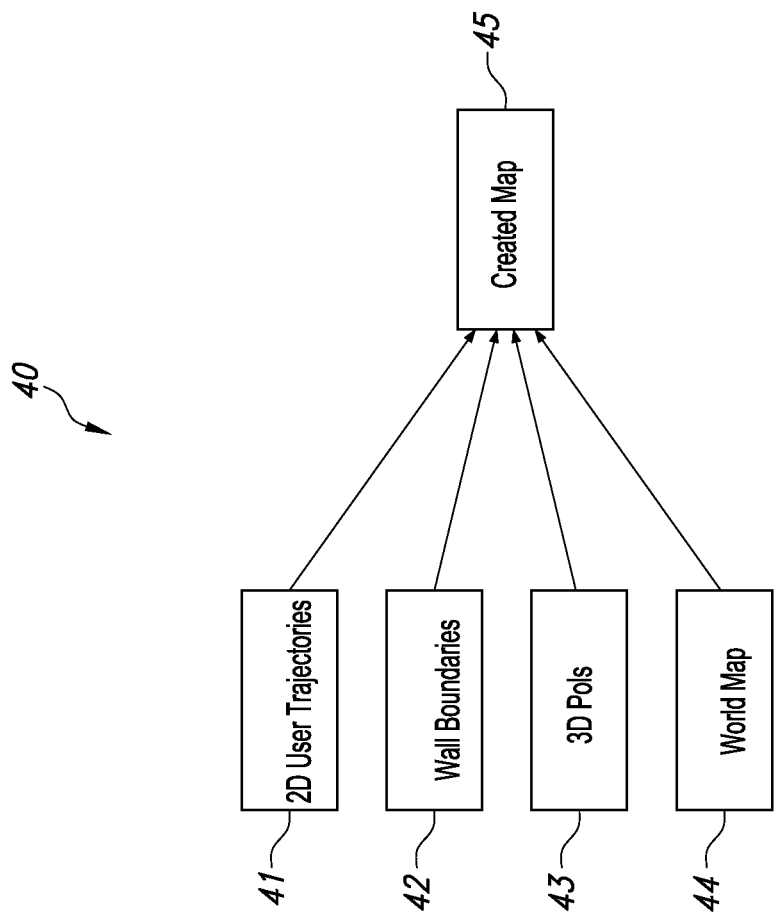
FIG. 3 provides an illustration of the components of the map, which are used in the creation of the world map, in accordance with an embodiment of the disclosed system and method.

In certain embodiments, the map representation shown in FIG. 3 consists of multiple components as illustrated in FIG. 3. In particular, FIG. 3 provides an illustration of the components of the map, which are used in the creation of the world map, in accordance with an embodiment of the disclosed system and method.

The components of the map of FIG. 3 include the determination of two-dimensional (2D) user trajectories 41, wall boundaries 42, 3D point of interests (POI) 43 and/or their respective (x, y, z) coordinates, and/or an underlying point cloud/visual feature-based world map 44 for re-localization, in the formation of a final map 45, as described in greater detail in connection with at least FIGS. 4-6 and 10.

The map representation defined by thick boundary line 31 is created in certain embodiments, by a number of user actions that form the components of the world map, as shown in example FIG. 3. During such map creation, the system leverages augmented reality technology to display labels on real world images and videos on the map representation in FIG. 3. The map representation may be created as the system requests the user point the user device's camera to special locations in the defined environment (e.g., corners of walls, bookshelves, other shelves or areas), and further click a button on the UI to register the 3D coordinates of such locations. The user device may use computer vision and/or inertial data to measure the relative distance and angle of those special locations and/or locations of objects of interest relative to the user device. Thus the processor associated with the user device or other mobile computing device determines the 3D coordinates of these special locations. They may continue to point to and register a series of such locations, thus forming the wall boundaries 42 of a simple or even a complex indoor environment. The user also points and registers one or more object(s)/point of interest(s) 43 (e.g., doors, pictures on the walls). The respective 3D coordinates of such object(s)/point of interest(s) 43 will be recorded in the map 45 as well.

Figure 4:
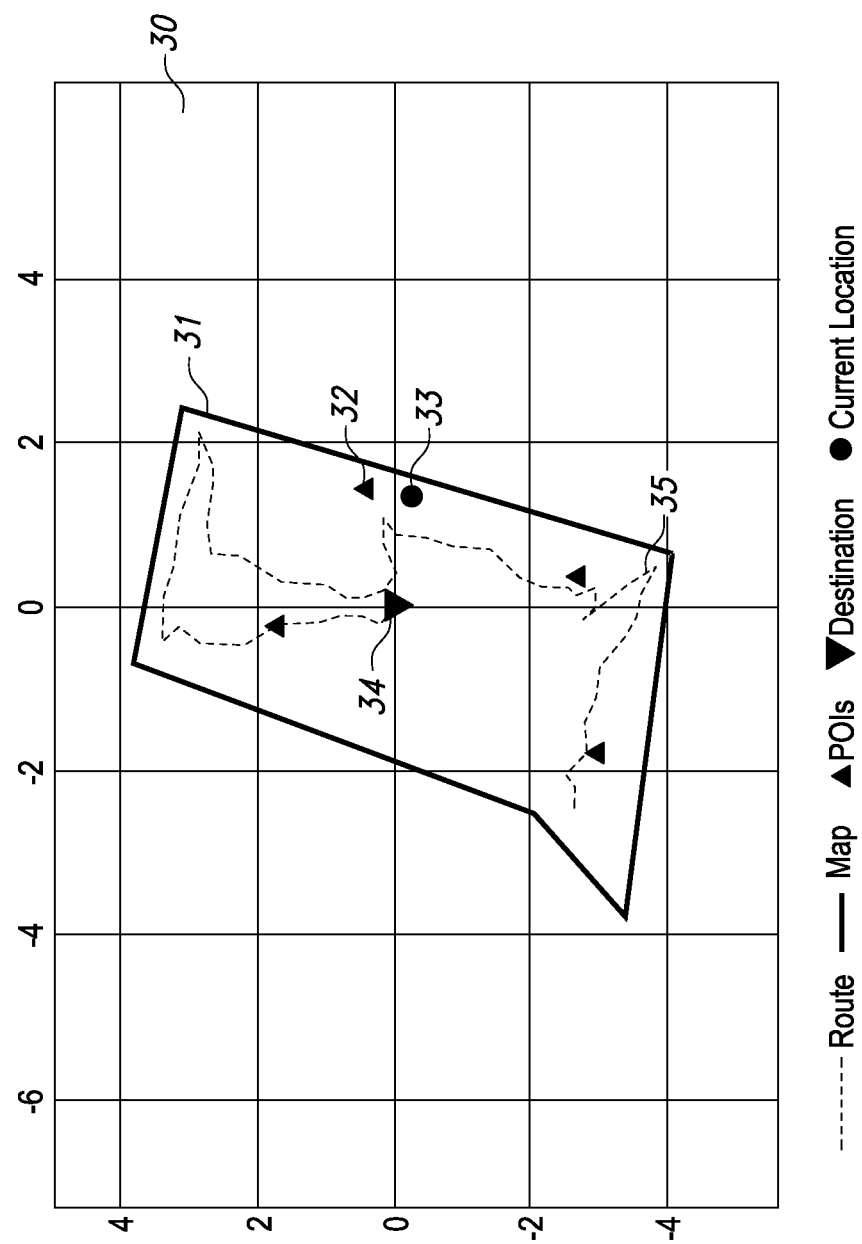
FIG. 4 provides an illustration of an exemplary map created for navigation shown in an enlarged view of an exemplary user-interface, in accordance with an embodiment of the disclosed system and method.

FIG. 4 provides an illustration of an example map created for navigation during implementation of the smart laser system and may be displayed in the right top portion of the user interface screen as shown in an enlarged view. The map includes one or more components for example, as shown and described in connection with FIG. 3 such as 2D user trajectories shown as the route 35 (as defined by the dotted line) in FIG. 4.

The 2D user trajectories shown as route 35, which form a part of the map representation in FIG. 4, are constructed in certain embodiments, using tracking algorithms (e.g., a combination of inertial and visual data). These 2D trajectories indicate the accessible areas with a defined room. The 2D trajectories also show the topology of the point of interests 32, which can be used for further navigation among these points of interests. The 2D user trajectories are collected when the user walks in the building and is tracked using mobile tracking algorithms (e.g., dead reckoning with inertial sensors, or a third party SDK such as ARKit/ARCore that combines inertial and visual data).

The thick boundary line 31 shown in map representation of FIG. 4 represents the wall boundaries of the map. The black thick lines 31 represent the wall boundaries of a room, and may reflect the shape of a room. In certain embodiments, in order to create the wall boundaries, the user while holding the mobile device, walks or steers close to each corner or turning locations of the indoor location, selects or clicks a respective map button (shown for example in bottom of user interface of FIG. 4 represented in the key as route 35, map boundary line 31, POIs 32, destination 32 or current location 33) to mark a point. These turning points are in certain embodiments, automatically connected one by one to draw the shape of the room. Following the same process, the system can create a large map beyond just one room, but including the aisles, rooms of multiple floors in a whole building and/or any additional areas that comprise the building or floor. The floor number of each room and/or aisle can also be noted and labeled in the map during map creation.

In certain embodiments, when further fine-grained type wall boundary mapping is required, this approach can be integrated with acoustic distance measurements on mobile devices. The system can simultaneously track user's trajectories along the internal walls using acoustic echoes, which can generate accurate distance measures at sub-centimeter resolution. This can produce more accurate lengths and shapes of wall boundaries than visual/inertial data alone.

In certain embodiments the mapping system measure the distance from the smart device to the wall using acoustic echoes. Basically, the device emits a pulse signal, and the signal is bounced back. Based on the time of delay, the system can estimate the distance and use that estimate in generating the world map. Hence, the user's trajectories are measured along the internal walls using acoustic echoes which can generate more accurate distance measures at sub-centimeter resolution.

Different methods are used for generating a world map using acoustic echoes including room construction involving rooms of two types: 1) small, regular rooms and 2) irregular or large rooms. Rectangle or polygon rooms smaller than 8×8 m² are type 1, including bathrooms, bedrooms, personal offices and laboratories 4. Type 2 are either irregular shapes or over 8×8 m², such as large classrooms, lobbies, auditoriums. Experiments show that the maximum distance that can be reliably measured is 4 m to each side. In an example embodiment, the system implements a fast room construction method that obtains the width/depth of a regular room using a simple measurement gesture. The top microphone of the user device 217 may be used in such example. The user holds the device 217 phone in front of his/her body, clicks a button to trigger the phone to emit many chirps quickly (e.g., 50 in 5 s), producing N distance measurements as the original set $D^O=\{d^O_1, d^O_2, \ldots, d^O_N\}$. Each distance has an equal probability of being generated or originating from the left wall. The user stretches his/her arm and moves the phone to the right side; it emits multiple chirps (e.g., 10 in 1s) and produces an updated set $D^U=\{d^U_1, d^U_2, \ldots, d^U_M\}$.

The system implements the following candidate weight updates and resampling to determine and obtain distance from certain directions. Then the user moves the phone to left, in order repeat the process. The user may need to move the phone left/right a few times to produce reliable results in the example embodiment.

Candidate Resampling is next implemented in certain embodiments during the room mapping process. Candidate resampling recalculates the probabilities of distance candidates over multiple measurements. The intuition is to "penalize" those distance candidates that behave inconsistently given the phone's movement. For example, echoes coming from the front wall are assigned smaller weights because their distances do not change much in left/right movements. Such echoes will exhibit much smaller weights and thus are less likely to be chosen during resampling. The weight $\omega_j$ is computed as follows: $\omega_j$ for each $d_j^O \in D^O$ in accordance with equation defined hereinbelow as:

$$\omega_j = f(d_k^U - d_j^O - \mu), \quad k = \arg \min_k (|d_k^U - d_j^O - \mu|)$$

where f(•) is the likelihood function which has the form as PDF of Gaussian distribution N (0, σ²) that describes the similarity between actual distance change $d_j^O - d_j^O$ and expected move distance p·d"$_j \in$ D" is a distance measurement in the update set, σ is the variance tolerating estimation errors in moving distance. Assuming the device 203 phone is held by the right hand, the system sets μ=0.3 m and μ=0.5 m for left/right movement, σ at 0.2 empirically. A new set is hence formed, by sampling N distances from the original set, each with probabilities proportional to their respective weights. The original set is then replaced by the new set.

The user may need to move the phone left/right multiple times. However, with each round, the correct distance will be reinforced and incorrect ones penalized. Thus, the results quickly converge (i.e., showing a distance with dominating probability) after a couple left/right movements, which can be accomplished in tens of seconds. Although clutters along the movement directions may create echoes, such echoes are unstable compared to those from targeted large surfaces (e.g., walls) in the disclosed example. Hence, such echoes are assigned lower probabilities and eventually removed by the system. In order to achieve better robustness and quick convergence, the user should avoid large objects, such as large furniture, along the moving directions. The user can turn 90° and repeat the above process in order to measure the other two walls. The total height between ceiling and floor can also be measured by holding and moving the phone vertically. In irregular/large rooms, the system combines user traces and acoustic measurements for construction.

Due to the limited sensing range, the fast construction method does not generally work as reliably for irregular or large sized rooms. The user must walk a full loop around the internal boundaries of the room, and measure the distance to the wall continuously. Hence, the system in certain embodiments combines the user trace and distance measurements to create the room boundaries. In this embodiment, the system user achieves the mapping by walking close to the wall on right while holding the phone 217, and leveraging PEA probabilistic evidence accumulation (PEA) method for distance-wall association and related analysis (as disclosed in *BatMapper: Acoustic Sending Based Indoor Floor Plan Construction using Smartphones, MobiSys '17*, Jun. 19-23, 2018; Bing, et al). Such PEA method is used in certain embodiments in order to identify the distance from the wall to bottom microphone. $P_1 \cdot P_2$ in PEA does not rely on the left sidewall, thus the system can achieve reliable distance measurements. As long as objects do not fully block the line of sight to the wall, the acoustics can detect distance to walls reliably. Compared to other approaches using only user traces that can be subject to distortion by objects, this method can generate much more accurate room shapes.

In certain embodiments, echo candidates are analyzed and generated. First noise removal occurs in which the received signals will go through a Butterworth bandpass filter, 8~10 KHz and 8~16 KHz for the bottom/top microphone, to achieve removal of background noise. Without such filtering, weak reflections can be buried in the noise. This step is important when collecting data in noisy environments Echo Peak Generation is another process that occurs in certain embodiments in generating echo candidates for use during room and object mapping. Next the system cross-correlates the signal with its respective pulse, a common technique that produces a peak for each echo, and obtain the upper envelop for the signal. Next the system chops the envelop into segments of small time windows of 35 ms, each containing echoes from one pulse only Next, the system determines the start of these windows. The first peak will always be the direct sound from the speaker to the microphone, and it has the highest amplitude. It will be used as the starting point. Before the system determines peak locations, a low pass filter is applied moving the average to eliminate small outlier peaks and smooth the envelop.

Next, Echo Candidates Generation occurs. For each emitted chirp, multiple peaks corresponding to different echoes are detected. For example, a chirp in a small room will create echoes from all sidewalls, the ceiling and floor, even echoes reflected multiple times. In order to associate echoes to objects, deciding which corresponds to which, is critical to derive the geometry of the environment Using a threshold, the system can select just the top-K strongest peaks, which are anticipated to emanate from larger, closer objects. More candidates will cover those objects of greater interest (e.g., wall surfaces), but many candidates may also include echoes from other smaller, irrelevant objects (e.g., desks, chairs), making distance-wall association more difficult. In order to handle this issue, generally the system will select the top 6 peaks for the top microphone, because it is more sensitive and has stronger echoes from faraway objects, and top 10 for the bottom one, because it is less sensitive and may miss echoes from faraway walls.

In certain example embodiments, in order to construct a floor plan, which includes corridors and rooms, the shapes, sizes of corridors and the locations of doors along corridors form the map skeleton; the contours of rooms augment the skeleton and are used to complete the map.

The system combines user traces and acoustic distance measurements to both sides of walls for fast, light eight, and accurate corridor construction. The user holds the device 217 phone horizontally, and walks along corridors continuously. A few minutes of user 203 walking is enough to cover a floor of decent sizes (e.g., 40×40 m$^2$). This incurs minimal user efforts, and minimal phone rotations, which minimizes gyroscope drifts for robust user traces. Door locations are automatically determined by detecting small distance increases caused by doors usually slightly recessed (~10 cm) from walls. In order to handle many echoes and outliers from sound reverberation over multiple surfaces (e.g., floor, ceiling, and sidewalls) and moving objects, the systm implements a probabilistic evidence accumulation algorithm and recursive outlier removal to robustly associate distances to different sidewalls. Inevitable hand movements during walking may cause distance variations compariable to the small recess depth of doors. Distance may be increased/decreased, causing false detection or missing of doors. The system also implements a sway compensation technique in order to correct such minute distance variations for reliable, automatic door detection.

Distance-Wall Association is used in certain embodiments in order to identify which distance corresponds to which objects. Hence, the geometry of corridors, are analyzed and the system further analyzes the relationships among the distances and amplitudes of echo candidates from both microphones. The system implores and devise a probabilistic evidence accumulation (PEA) method for distance-wall association.

Figure 10:
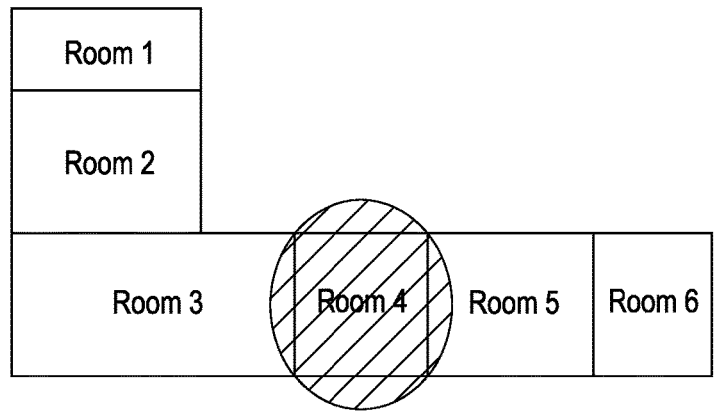
FIG. 10 provides an overview of an example layout of a floor to illustrate how the system achieves fine-grained localization in larger scale buildings using initial coarse location information, in accordance with an embodiment of the disclosed system and method.
Figure 10A:
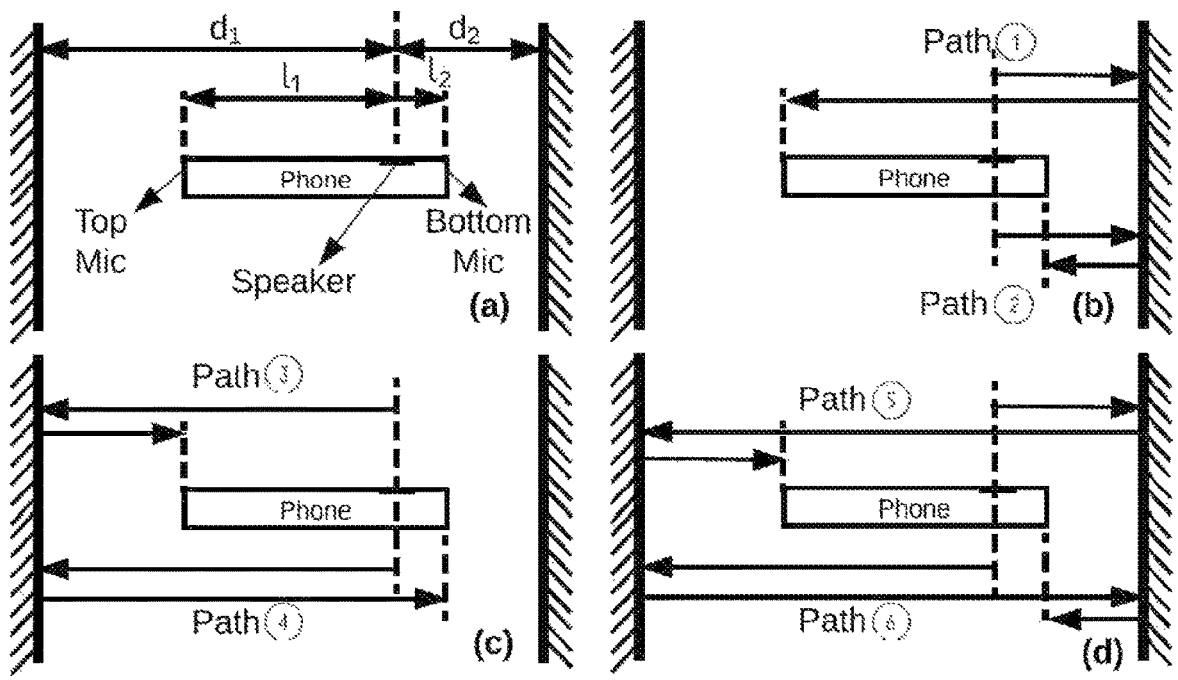
FIG. 10A provides an illustration of corridors and walls of a room and the position of speaker and microphones on the user device with respect thereto, with sound traveling paths of strong echoes shown in the corridor, in accordance with an embodiment of the disclosed system and method.

FIG. 10A provides an illustration of corridors and walls of a room and the position of speaker and microphones on the user device with respect thereto, with sound traveling paths of strong echoes shown in the corridor, in accordance with an embodiment of the disclosed system and method. Specifically FIG. 10A shows a phone device 217 held perpendicular to both sidewalls in a corridor, and reflection paths of strong echoes received by microphones. In FIG. 10A, $d_1$, $d_2$ are distances from the speaker to the left/right wall (the width of corridor $d=d_1+d_2$); $l_1$ and $l_2$ are the constant distances from speaker to the two microphones (the length of the phone $l=l_1+l_2$).

In paths 1, 2 as shown in FIG. 10A, the sound bounces off the right wall once, and is received by top/bottom microphones. The echoes are likely very strong due to short travel distances, and similarly for echoes from left wall in path 3, 4 (shown in FIG. 10A). The echoes bouncing both sidewalls can still be detected, with less amplitude due to longer travel distances as shown in FIG. 10A. Generally, the top microphone can detect echoes from path 1, 3, 5 in most cases, and the bottom microphone can detect those from path 2, but missed some echoes emanating from path 4, 6 due to its low sensitivity to far field sounds. Additional estimates of probability are computed and parameter learning variances are computed in order to determine respective probabilities. Using mathematical sets of strongest echo candidates, their distance measurements and amplitudes from top microphone as well as from bottom microphone, estimates of probability can be determined for a given echo candidate along a path k.

In particular, in accordance with an embodiment, the system lets $\{c_i^h\}, \{d_i^h\}, \{s_i^h\}$ ($i=\{1, \ldots, 6\}$) denote the sets of the 6 strongest echo candidates, their distance measurements and amplitudes from the top microphone; with sets $\{c_i^h\}, \{d_i^h\}, \{s_i^h\}$ and ($i=\{1, \ldots, 10\}$) are those sets of 6 strongest echo candidates from the bottom microphone. Given these sets, the challenge is to estimate the probability $P(c_i^u$: path k) that a given candidate $c_i^u$, $u \in \{t,b\}$ travels along path k. The distances of candidates with greatest probabilities will be used to infer path lengths, thus corridor geometry such as width l.

The following equations may be employed in order to determine the respective distance candidates as provided hereinbelow:

1) $P(c_i^b$: path 2): we combine two evidences. If $c_i^b$ is a direct echo from the right wall, a) it is likely to have the highest amplitude in $\{s_i^b\}$. Thus $$P_1 = f_1\left(1 - s_i^b \Big/ \max_i(s_i^b)\right) \quad (1)$$

where $f_1(\bullet) \sim N(0, \sigma_1^2)$ i the PDF function of a Gaussian distribution, commonly used in Bayesian Networks to represent probabilities of such evidences. b) considering path 1 and 2, there must exist a candidate from top microphone $c_j^t$ that travels path 1 where $d_j^t - d_i^b = l$. We model this probability as:

$$P_2 = f_2\left(\min_j(|d_j^a - d_i^b - l|)\right) \quad (2)$$

where $f_2(\bullet) \sim N(0, \sigma_2^2)$. We combine the two evidences to compute $P(c_i^b$: path 2)$=P_1 \cdot P_2$.

2) $P(c_i^t$: path 3): we combine three evidences. If $c_i^t$ is a direct echo from the left wall, a) it is likely to have a high amplitude in $\{s_i^t\}^2$. We model this probability as:

$$P_3 = f_3\left(1 - s_i^t \Big/ \max_i(s_i^t)\right) \quad (3)$$

where $f_3(\sim) \sim N(0, \sigma_3^2)$, b) a $c_i^t$ along path 1 can generate a high amplitude. We exclude it by the evidence of a corresponding $c_j^b$ along path 2 computed in step 1. A large $P(c_j^b$: path 2) indicates less likely $c_i^t$ goes path 2.

$$P_4 = 1 - P(c_j^b\text{:path } 2) \quad (4)$$

where $j=\arg \min(|d_i^t - d_j^b - l|)$. c) two other echoes $c_j^t$, $c_k^t$ must exist such that $d_i^t + d_j^t - d_k^t = l_1$. Hence $$P_5 = f_5\left(\min_{j,k}|d_i^t + d_j^t - d_k^t - l_1|\right); \quad (5)$$

where $j, k \in \{1, \ldots, 6\}$, $j \neq i$, $k \neq i$, $j \neq k$, $f_5(\bullet) \sim N(0, \sigma_5^2)$. We combine the three evidences for $P(c_k^t$: path 3)$=P_3 \cdot P_4 \cdot P_5$.

3) $P(c_i^t$: path 5): if echo $c_i^t$ bounces off right then left wall along path 5: a) considering distance relationship among path 1, 3, 5. There must exist two other echoes $c_j^t$, $c_k^t$ such that $d_k^t - d_j^t - d_k^t = l_1$, hence $$P_6 = f_5\left(\min_{j,k}|d_i^t - d_j^t - d_k^t + l_1|\right); \quad (6)$$

where j, k ∈ {1, . . . , 6}, j≠i, k≠i, j≠k and $f_5(\cdot) \sim N(0, \sigma_5^2)$.
b) considering distance relationship among path 2, 3, 5. There must exist another $c_j^t$ and $c_k^b$ such that $d_i^t - d_j^t - d_k^b = l_2$, hence $$P_7 = f_7\left(\min_{j,k}|d_i^t - d_j^t - d_k^b - l_2|\right); \quad (7)$$

where j ∈ {1, . . . , 6}, j≠i, k ∈ {1, . . . , 10}, $f_7(\cdot) \sim N(0, \sigma_7^2)$.

We combine them to get $P(c_i^t$: path 5$)=P_6 \cdot P_7$.

The word "we" as used hereinabove is intended to denote the "system" and is being used interchangeably and Applicant reserves herewith the right to amend such term "we" with "system" (specifically the three paragraphs directly hereinabove).

Next parameter learning algorithms are employed in which variances $\{\sigma_1, \sigma_2, \sigma_3, \sigma_5, \sigma_7\}$ are determined from above to compute probabilities. Training data is collected for samples where the traveled paths of echoes are labeled. Given a sample collection as provided below $\{x_i\}$ from a normal distribution, its mean and variance can be estimated as follows using equation provided hereinbelow:

$$\mu = \sum_{j=1}^n \frac{x_j}{n} \text{ and } \sigma = \frac{1}{n}\sum_{j=1}^n (x_i - \mu)^2.$$

These parameters do not change significantly in different buildings and hence, the system learning them even once may produce accurate results in corridors having example widths of 1.5~4 m.

In addition, recursive outlier removal is performed once the above computations are determined providing the probabilities for each $c_i^h$ traveling path 2 and each $c_i^h$ traveling path 3 and 5 as shown in FIG. 10A. The candidate with highest probability is selected for each path. Since outliers can occur due to signal noise, moving objects/people during data collection, a recursive outlier removal (ROR) algorithm is implemented in order to detect and replace such outliers.

In addition, during object mapping process, 3D points of interests 32 can also be tagged in certain aspects or embodiments of the disclosed system and method. The system also may tag the objects that are of interest to a user and located on the map, as shown as smaller triangles, POIs 32, or larger triangles, destination 34. In order to tag an object of interest, the user points the camera of his/her user device to the particular object(s) of interest. The object recognition module will function to process the image information and hence, will recognize the object (as described in greater detail hereinbelow in connection with FIG. 4).

In certain aspects or embodiments, a module associated with object recognition runs continuously in the background, and is able to process information associated with the major object and hence, can render such object within the camera view recognizable to the system. In certain embodiments, existing object recognition machine learning models for object recognition may be implemented, and these models can be further fine-tuned with a specific set of objects for more accurate recognition thereof. The model inference (recognition) can be scheduled to perform once a second, for example, thus saving power consumption and improving efficiencies.

Hence, the recognized labels are added into the map when the user clicks or selects the tag button. A 3D text is shown over the object in the AR scene, and the corresponding label is added to the table for management (for example, the text "chair" shown in FIG. 13. The user can change such labels in order to correct errors or customize them to desired forms. Such 3D text is a rendered label that can be seen through the camera. It is a virtual label augmented in the camera view.

Once the user selects or clicks the tag button for the particular object (for example, shown as lower right corner button of FIG. 2), the 3D coordinates of the object is saved, and a triangle associated with a POI 32 is displayed on the map according to the x, y coordinates determined for the object. In order to correct possibly incorrect or inaccurate object recognition performed by the system, the user can further modify the label to any customized form in certain disclosed embodiments.

In creation of the world map associated with a particular defined or bounded environment, an underlying point cloud that consists of the 3D coordinates of many feature points of the environment and/or visual feature-based world map are also saved for re-localization, which occurs when the user enters the same area after exiting the system. When the system powers on again, the system will be able to determine and know its current location. These visual features are used to determine the initial position of the mobile devices after power on. In certain embodiments, the world map saving functionality of ARKit can be directly used.

In certain aspects or embodiments, the room contour is associated with a "traditional" map, which shows the floor plan of a room/building. The smart laser system processor or computing device tracks the position of the mobile device when the user is moving or otherwise navigates inside the known boundaries of a building. At each corner/turning point, the user can mark such locations on the screen using for example a map button 38, as shown in FIG. 2. This marking process and creating of the room contours with integration into the world map, can be accomplished by leveraging current augmented reality technology that combines inertial and visual data to determine the relative movement of the device relative to its surrounding environment. The coordinates of these particular marked locations are connected geometrically via line segment end point or other arc curve line endpoint connections, to generate the unique and particular contour of the wall boundary associated with a particular user location.

The system saves (for example, in a database or other device memory unit) the created world map including respective visual features of a particular bounded area, and such world map including respective visual features, can be used for future re-localization as for example, described in connection with workflow of FIG. 5. In certain embodiments, when the user re-enters the area, the mobile device scans the current area and extracts any visual features, and compare such visual features to existing saved world map, find out which saved features match, thus the system can determine the new location, and re-localize the map settings.

Extracted features provide the context for inference about an image, and often the richer the features, the better the inference. Sophisticated hand-designed features such as scale-invariant feature transform (SIFT), Gabor filters, and histogram of oriented gradients (HOG) have been the focus of computer vision for feature extraction and have been successfully implemented for feature extraction.

Deep learning can be implemented such that complex and useful features can be automatically learned directly from large image datasets. More specifically, a deep hierarchy of rich features can be learned and automatically extracted from images, provided by the multiple deep layers of known neural network models. Such neural network models can be implemented in embodiments of the disclosed system and method as they have deeper architectures with the capacity to learn more complex features than the known shallow neural network models. Also, the expressivity and robust training algorithms permit the system to learn informative object representations without the need to design features manually. Sophisticated hand-crafted feature detection methods such as SIFT may be implemented but alternatively, deep convolutional neural networks on standard computer vision benchmark datasets, such as the ImageNet Large Scale Visual Recognition Competition (ILSVRC) are being implemented too. Coded SIFT features and other evolving large-scale convolutional neural networks dominating all three tasks of image classification, single-object localization, and/or object detection can be implemented to achieve at least feature extraction.

Feature extraction generally works well in a small area (for example, room level such as living room). However, in large areas such as a whole building, it may not perform well due to similarity of visual features across many rooms and aisles. Hence, a novel approach to such problem is disclosed by combining such methods of feature matching and localization, with other coarse-grained existing localization methods. This novel approach is discussed in greater detail herein below in connection with FIG. 5.

Figure 5:
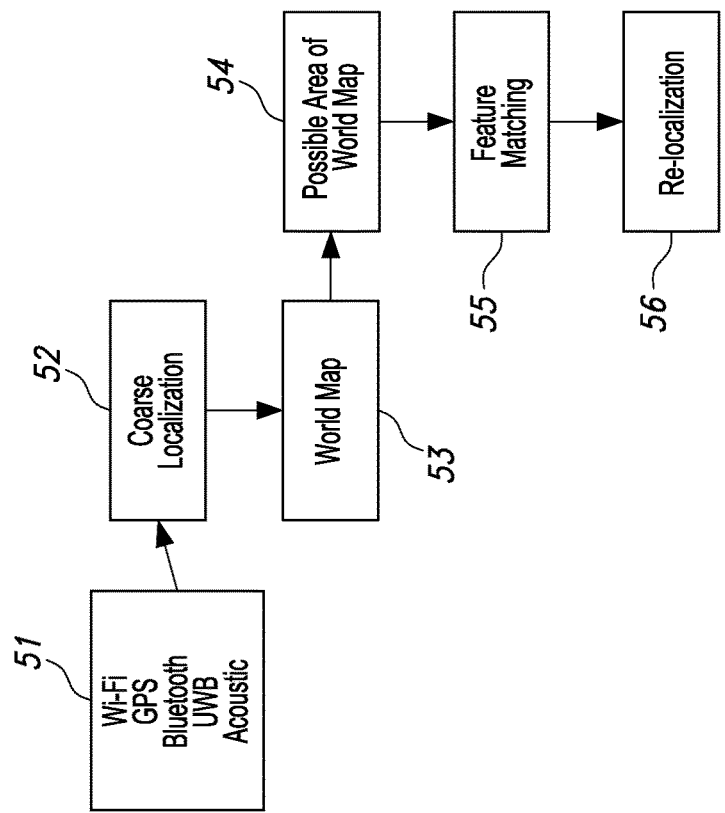
FIG. 5 provides a flowchart illustration associated with the re-localization process used during world map creation, in accordance with an embodiment of the disclosed system and method.

FIG. 5 provides a flowchart illustration associated with the re-localization process used during world map creation, in accordance with an embodiment of the disclosed system and method. An example embodiment, implements ARKit, an augmented reality software development kit (SDK) created by Apple. Other kinds, for example, AR SDK can be implemented in other embodiments. Such SDK(s) provide basic re-localization features that can be leveraged directly. Such SDK(s) use the saved world map and match the current visual observations including feature extractions to the map to determine the mobile device location. This implementation works fairly well in small to middle sized spaces, but the performance may decrease as the size of the location and/or datasets grow larger. Thus, in accordance with an embodiment of the disclosed system and method, a novel approach is disclosed herein in order to overcome this problem with larger sized spaces and/or colossal datasets.

The AR based tracking provides very fine-grained 6-DOF (degree of freedom) tracking once the initial pose is determined through re-localization via world map. However, when the mapping area is too large or becomes too large, it becomes an obstacle to obtain sufficient visual features for the whole area without experiencing ambiguity (e.g., different office rooms may look similar to each other). Hence, AR for tracking and re-localization at a room level is sufficient, but not at a complex or large building level. Thus, the disclosed system combines existing coarse-grained localization methods with AR tracking to improve the re-localization process in a novel fashion. Traditional indoor/outdoor localization approaches such as Wi-Fi, Bluetooth beacon, UWB, and GPS based approaches can be integrated as well.

As shown in FIG. 5, the system uses WI-FI, GPS Bluetooth, UWB or acoustic-based approaches in step 51 to connect to the system. The system will use the coarse localization approach in step 52 to create a world map in step 53. In particular, the disclosed system leverages a coarse-grained localization step 52 to confine the device location to a possible area when using the system in smaller sized areas in order to generate a possible area of the world map in step 54. Next, the system performs the step of feature matching 55 by determining and finding matching features 55 within a small sized perimeter area using for example, the visual feature based AR re-localization process for more fine-grained re-localization. Since a small size area does not result in a large amount of similar visual features, re-localization can be performed with finer granularity. Thus, the system in step 56 can perform re-localization at a finer level of re-localization than in a scenario where there exists a very complex building and/or other complex area within which to perform feature extraction and matching and re-localization.

It is known that Wi-Fi usage can be ubiquitous in larger buildings, with usually a reasonable number of Wi-Fi routers needed to be deployed in larger size building to achieve full coverage throughout. Thus, the received Wi-Fi signals, such as RSSID, signal strengths, i.e., Wi-Fi fingerprints, may differ from one location to another. Based on this difference in signal strengths, etc. it is possible to have room level localization accuracy at a coarse level (for example, step 52). Once the coarse room-level location is achieved, the system constrains the AR world map searching with the portion of this room to find the exact fine grained location of the device. This also reduces greatly the potential number of visual features to compare to a small area, thus speeding up the re-localization process of step 56. In certain embodiments, the system can achieve fine-grained localization in larger size buildings, as described in greater detail herein below in connection with FIG. 10.

Figure 6:
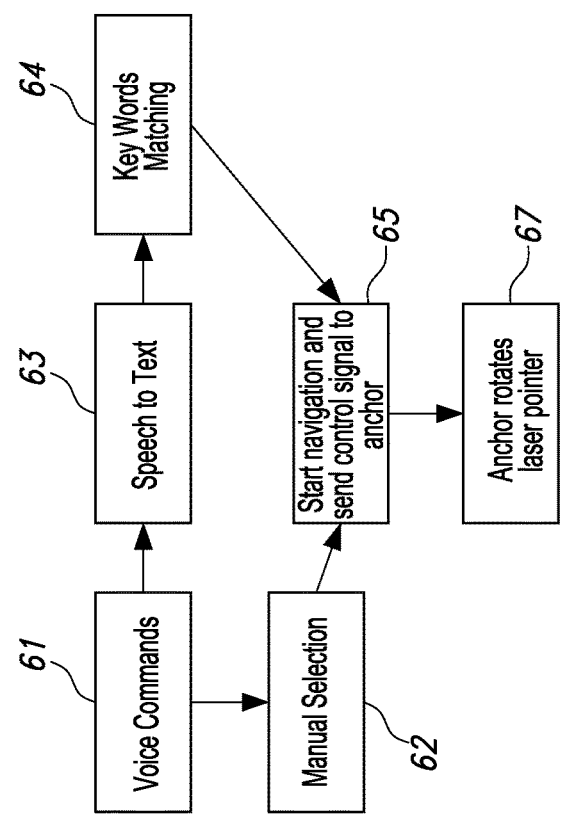
FIG. 6 provides a flowchart illustration associated with processing user voice commands and interpretation to effect navigation and control the anchor device, in accordance with an embodiment of the disclosed system and method.

FIG. 6 provides a flowchart illustration associated with processing user voice commands and interpretation of such voice commands to effect navigation and control the anchor device, in accordance with an embodiment of the disclosed system and method. The system implements existing speech to text translation API on mobile platforms to translate the voice commands to text. The user using the mobile device user interface, selects for example, by clicking and holding the microphone button, and articulates the particular voice command 61 (for example, request the system direct him to an object of interest) which is received by the mobile device. Once the user completes the voice command 61, the user may then release the button located on their mobile device. The commands will be translated into text in step 63 and displayed on the mobile device display screen. Alternatively, the system permits manual selection of the objects in step 62 and/or in addition to voice commands 61, at which point the system next performs navigation in step 65, in order to guide the user to the location of the one or more requested objects in step(s) 61 and/or 62. In step 62, the user would manually select the object to navigate to, by clicking or selecting from the menu, the object name listed on the menu list or otherwise, manually selecting via other user interface selection, the object. The list of objects can also be modified by removing objects from the list and/or modifying object names.

Figure 17:
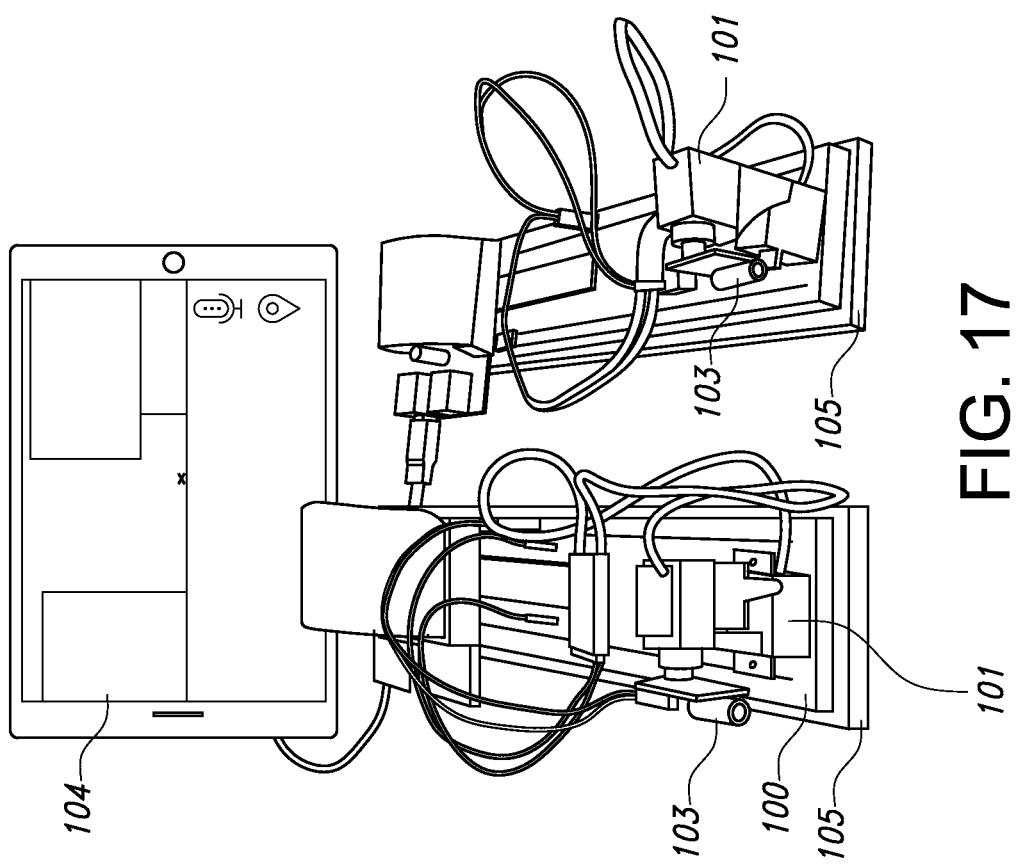
FIG. 17 provides an illustration of the structural design of two anchor nodes connected to a computing device including controller, servo motors and laser pointer, in accordance with an embodiment of the disclosed system and method.
Figure 18:
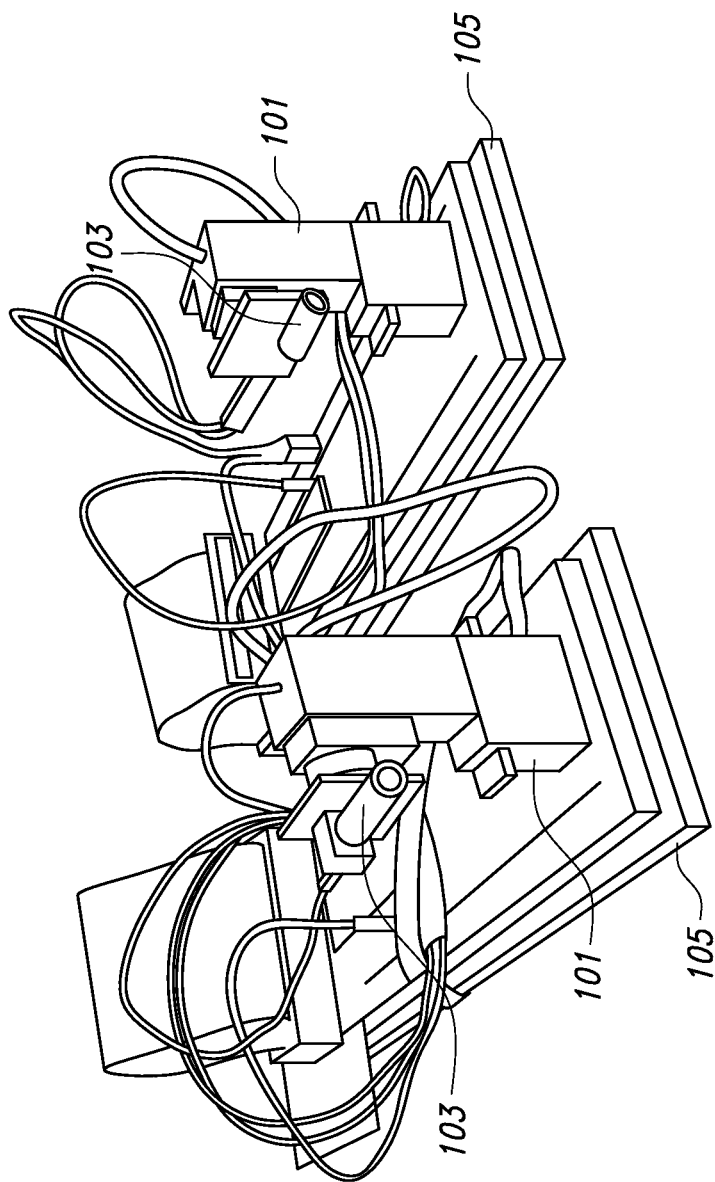
FIG. 18 provides a perspective view illustration of the structural design of two anchor nodes including controller, servo motors and laser pointer, in accordance with an embodiment of the disclosed system and method.
Figure 19:
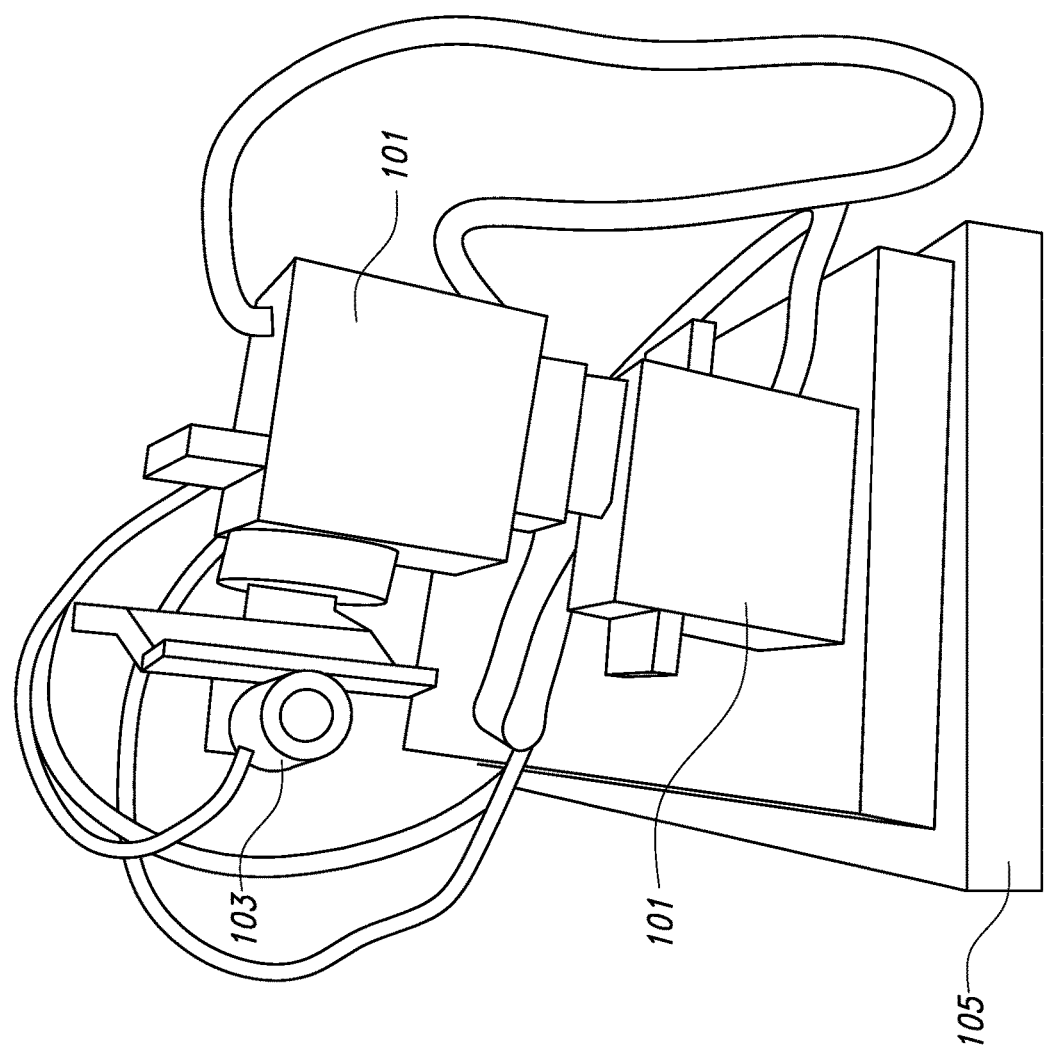
FIG. 19 provides an enlarged side perspective view illustrating of the structural design of two anchor nodes including controller, servo motors and laser pointer, in accordance with an embodiment of the disclosed system and method.

Keywords matching in step 64 is next performed by the system processor as shown in FIG. 6 once any entry of voice commands and conversion to text occurs in step 63. During step 64, the system searches object names created in the system object list or alternatively, in certain embodiments, may implement more advanced machine learning approaches that are used in selecting which object the user is searching. Once the one or more objects are identified, the user will be provided navigation instructions to that object in step 65, and control signals will be sent to corresponding anchor device(s) in step 65 (for example as shown in FIGS. 17-19) in order to actuate laser pointers to point the emitting laser with precision and target the one or more requested object(s) once the user reaches the respective one or more location(s). In order for the smart laser pointers to function properly, in certain embodiments, the system registers the locations of each of the laser pointers, which are each integrated with the anchor devices. Based on the 3D coordinates of the requested object, the system creates control commands to rotate one or multiple laser pointers to appropriate angles in step 67, such that the lasers will be emitted at the correct rotational angles so that the laser pointer targets with precision, the requested object, as described in greater detail herein below in connection with FIG. 9. The laser (for example, a laser signal appearing as a dot) will assist the user in identifying the object location and hence, the object more readily.

Figure 7:
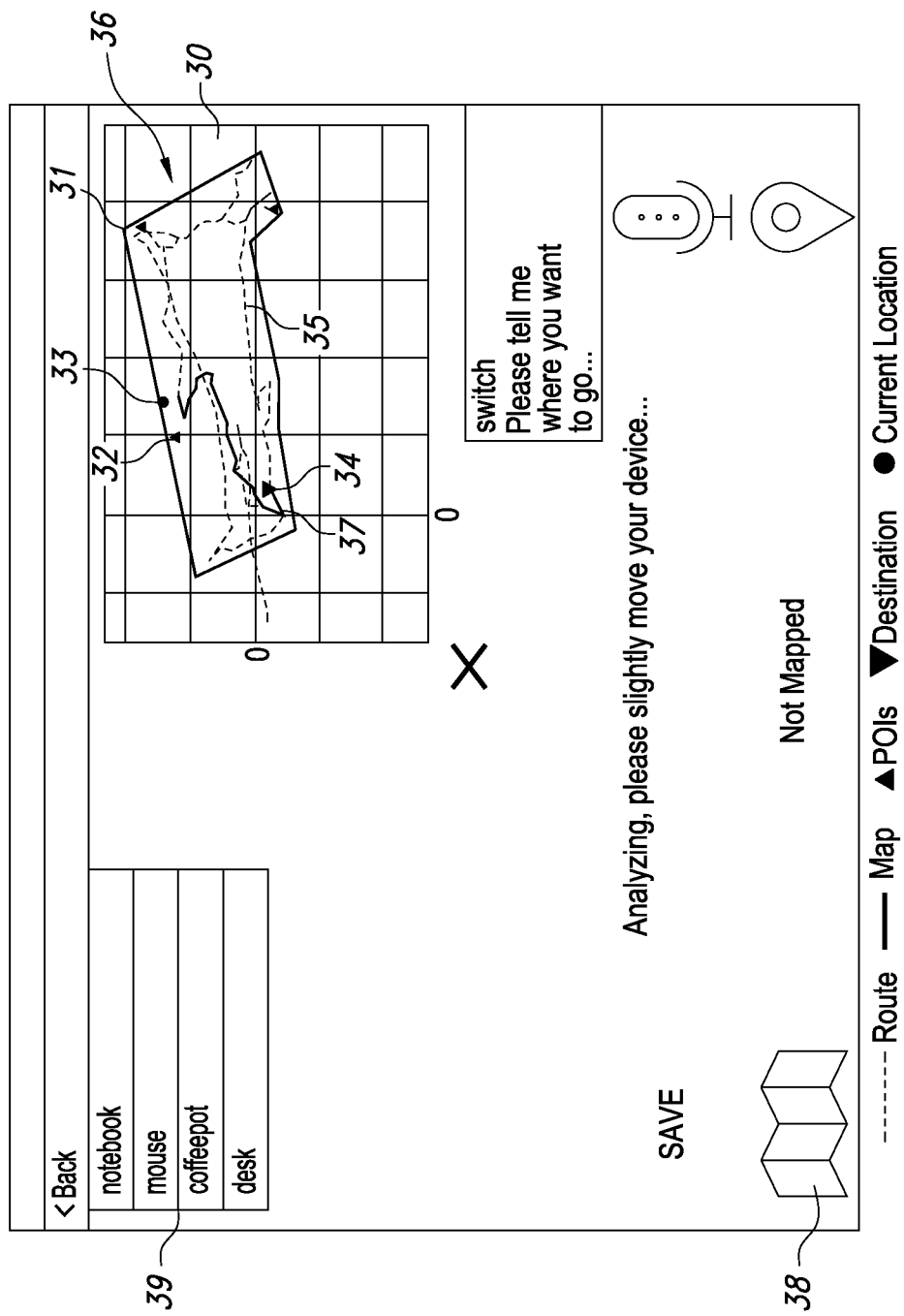
FIG. 7 illustrates an example user interface associated with mapping and navigation during implementation of the smart laser pointer system, in accordance with an embodiment of the disclosed system and method.

Referring to FIG. 7, illustrated is an example user interface associated with mapping and navigation during implementation of the smart laser pointer system, in accordance with an embodiment of the disclosed system and method.

More particularly, FIG. 7 illustrates an example user interface associated with mapping and navigation during implementation of the smart laser pointer system, in accordance with an embodiment of the disclosed system and method.

The user can enter via keyboard or mouse entry, the object of interest or alternatively may select from the menu 39 of items shown (for example, television, mouse, stove, barber chair). Next shown is an overlaying grid 30 that provides the x-y coordinate grid template for an additional overlaying map defined by boundary line 31, located within the boundaries of the grid 30. Shown within the boundary lines 31 of the map, is the creation of a virtual reality mapping of a suggested route 35 to perform navigation and hence, reach a destination 34 starting from current location of user 33 or another location within the map 31. The user can implement such map boundary lines 31 and route 35 located there between, in order to navigate to and locate an object of interest, with the suggested route 35 being created based on the object of interest, shown in FIG. 7 as a dashed line or path. Respective points of interest (POIs) 32 are also shown within map boundary line 31. The POIs represent, in certain embodiments, the actual locations of objects of interest that are located within the boundaries of a particular defined indoor spatial environment. Also shown in FIG. 7, is a map button 38 which is used to create the wall boundaries or other features such as corners, turns or other unique bounding features, associated with the particular room being mapped. In certain embodiments, the user holds the mobile device and walks simultaneously near each corner of the room or any respective turning locations (and/or other defining boundary features of the room), and selecting or clicking the map button 38, in order to mark a point. These respective turning points are connected one by one in order to draw and create the shape of the room in the respective AR map representation.

Further shown in FIG. 7, is a dark bold line 37, which is the planned path for navigation from the current location 33 to an object or POI destination 34. In certain embodiments, the smart laser system processor computes the route that has the shortest distance to the requested object destination 34. The 3D coordinates, user trajectories, and/or accessible areas (for example in the form of geo-coordinates or (x, y, z) coordinates of location in space) are saved in the world map and converted to a connected graph, wherein nodes represent objects, and edges represent trajectories (for example, aisles, stairs and/or elevators), each of which is associated with an expediture/work in the form of physical distance or moving time. The well known Dukstra's algorithm can be used to compute the shortest path. Multiple possible routes that lead to the 3D coordinate of the object are computed and compared, and the shortest one is chosen and displayed to the user.

Hence, Dijkstra's algorithm is used in certain embodiments to determine the shortest path between a and b. It selects the unvisited vertex with the lowest distance, calculates the distance through it to each unvisited neighbor, and updates the neighbor's distance if smaller. A more common variant fixes a single node as the "source" node and finds shortest paths from the source to all other nodes in the graph, producing a shortest-path tree. For a given source node in the graph, the algorithm finds the shortest path between that node and every other. It can also be used for finding the shortest paths from a single node to a single destination node by stopping the algorithm once the shortest path to the destination node has been determined. For example, if the nodes of the graph represent cities and edge path costs represent driving distances between pairs of cities connected by a direct road (for simplicity, ignore red lights, stop signs, toll roads and other obstructions), Dijkstra's algorithm can be used to find the shortest route between one city and all other cities. A widely used application of shortest path algorithm is network routing protocols, most notably IS-IS (Intermediate System to Intermediate System) and Open Shortest Path First (OSPF). It is also employed as a sub-routine in other algorithms such as Johnson's.

The Dijkstra algorithm uses labels that are positive integer or real numbers, which have the strict weak ordering defined. Interestingly, Dijkstra can be generalized to use labels defined in any way, provided they have the strict partial order defined, and provided the subsequent labels (a subsequent label is produced when traversing an edge) are monotonically non-decreasing. This generalization is called the Generic Dijkstra shortest-path algorithm.

In an example implementation, the starting point is called the initial node. The distance of node Y is defined as the distance from the initial node to Y. Dijkstra's algorithm will assign some initial distance values and will try to improve them incrementally step by step. All nodes are marked unvisited. The system next creates a set of all the unvisited nodes called the unvisited set. Next, the system assigns to every node a tentative distance value: setting the node to zero for the initial node and to infinity for all other nodes. The initial node is set as the current node.

Next, for the current node, the system considers all of its unvisited neighbours and calculates their tentative distances through the current node. The system further compares the newly calculated tentative distance to the current assigned value and assigns the smaller one. For example, if the current node A is marked with a distance of 6, and the edge connecting it with a neighbour B has length 2, then the distance to B through A will be 6+2=8. If B was previously marked with a distance greater than 8, then the system changes it to 8. Otherwise, the system keeps the current value. When the system is done considering all of the unvisited neighbours of the current node, the system marks the current node as visited and removes it from the unvisited set. A visited node will never be checked again. If the destination node has been marked visited (when planning a route between two specific nodes) or if the smallest tentative distance among the nodes in the unvisited set is infinity (when planning a complete traversal; occurs when there is no connection between the initial node and remaining unvisited nodes), then the system ends the process and the algorithm has completed its calculation. Otherwise, the system selects the unvisited node that is marked with the smallest tentative distance, sets it as the new "current node", and returns back to the earlier step of considering all of unvisited neighbours as described hereinabove in the beginning of this same paragraph.

When planning a route, it is actually not necessary to wait until the destination node is "visited" as above: the algorithm can stop once the destination node determines the smallest tentative distance among all "unvisited" nodes (and thus could be selected as the next "current").

Referring back to FIG. 7, the system can also take into other factors while computing the navigation route, such as user preference or crowdsourced information to generate efficient intelligent navigation route 35 planning. For example, in an embodiment, the system and/or system user may prefer a route 35 for example, with only elevators instead of stairs, or a route 35 for example, with only wide aisles without passing through any narrow doors. These constraints and/or configurations can be included and programmed to configure the route computing process in accordance with user selection of user-preferred routes.

The world map representation generated by the smart laser pointer system is the 3D map representation of the physical space and may contain in certain embodiments, 3D point clouds, which are used during the process of re-localization, as already described hereinabove in connection with at least FIG. 5.

FIG. 8 is a flowchart illustration providing the steps in which system control signals effect anchor node control signals that rotate the laser pointer at certain angle(s) to target the object of interest with a laser light beam, in accordance with an embodiment of the disclosed system and method. In certain aspects or embodiments, the one or more anchor hardware devices 105 consists of a control unit 100, servo motors 101, laser pointer 103, and communicate with one or more computing device(s) 104 as shown in FIGS. 17-19. The control unit 100 receives action commands from the user mobile device (or any other console such as PC), and then control the servo motors 101 which are situated as horizontally and vertically with respect to the control board 100, in order to rotate the servo motors 101 by a certain angle to effect rotation to aim and point the laser pointer 103 at the object of interest. An exemplary anchor device 105 is shown in FIG. 17. The one or more anchor device(s) 105 are configured to receive commands from smart devices through wireless communication (e.g., Bluetooth, Wi-Fi, etc.), and effect corresponding actions (pointing at one or more object(s) with laser pointer 103).

Figure 24:
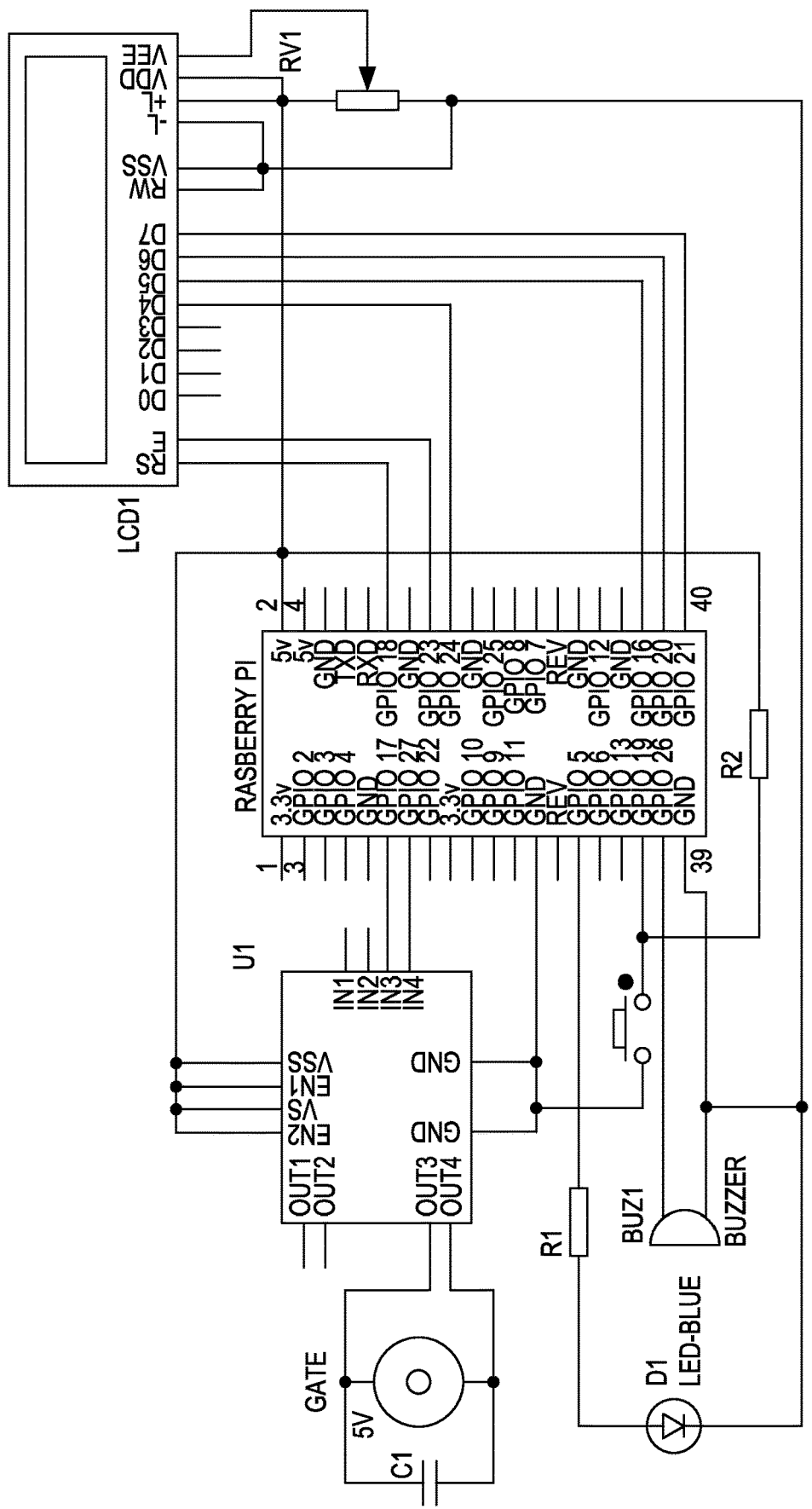
FIG. 24 illustrates an example microcontroller in the form of at least one raspberry pi board implemented in the smart laser pointer system, which includes an integrated central processing unit, in accordance with an embodiment of the disclosed system.

In the example embodiment shown in FIGS. 17-19, shown is a control board 105 that for example can consist of a raspberry pi embedded system as shown in FIG. 24. Also shown are two (2) servo motors 101 positioned as stacked on each other: one being situated horizontal rotation, the second being situated for vertical rotation (more specifically shown in enlarged view in FIG. 19). A servomotor is a rotary actuator or linear actuator that allows for precise control of angular or linear position, velocity and acceleration. The servo motor generally consists of a suitable motor coupled to a sensor for position feedback. Additionally, the servo motor requires a relatively sophisticated controller, often a dedicated module designed specifically for use with such servomotors. Servomotors are not considered a specific class of motor although the term servomotor is often used to refer to a motor suitable for use in a closed-loop control system, as the disclosed smart laser pointer system. Hence, the servomotor is a closed-loop servomechanism that uses position feedback to control its motion and final position. The input to its control is a signal (either analogue or digital) representing the position commanded for the output shaft. The motor is paired with some type of encoder to provide position and speed feedback. In the simplest case, only the position is measured. The measured position of the output is compared to the command position, the external input to the controller. If the output position differs from that required, an error signal is generated which then causes the motor to rotate in either direction, as needed to bring the output shaft to the appropriate position. As the positions approach, the error signal reduces to zero and the motor stops.

Figure 22:
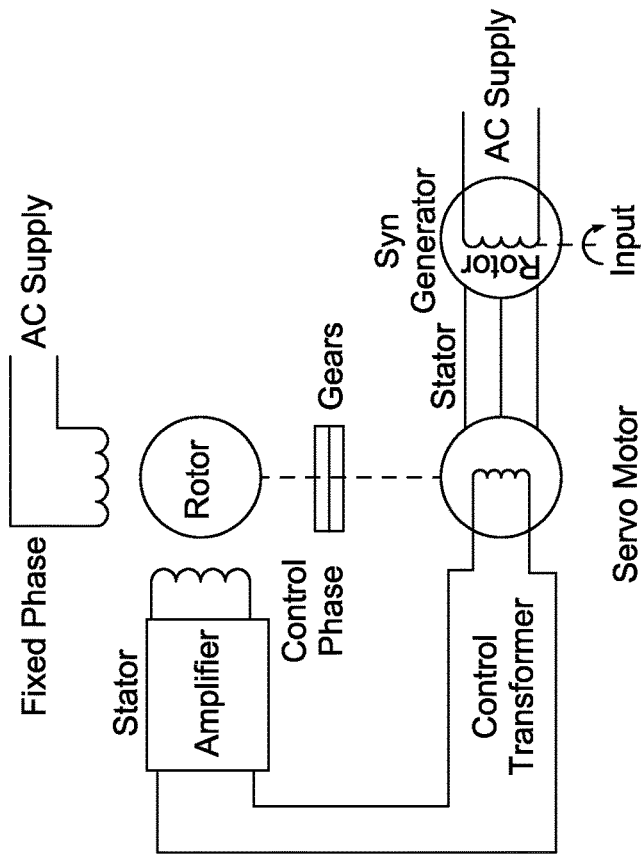
FIG. 22 illustrates an example circuit design of a servo motor, in accordance with an embodiment of the disclosed system and method.
Figure 23:
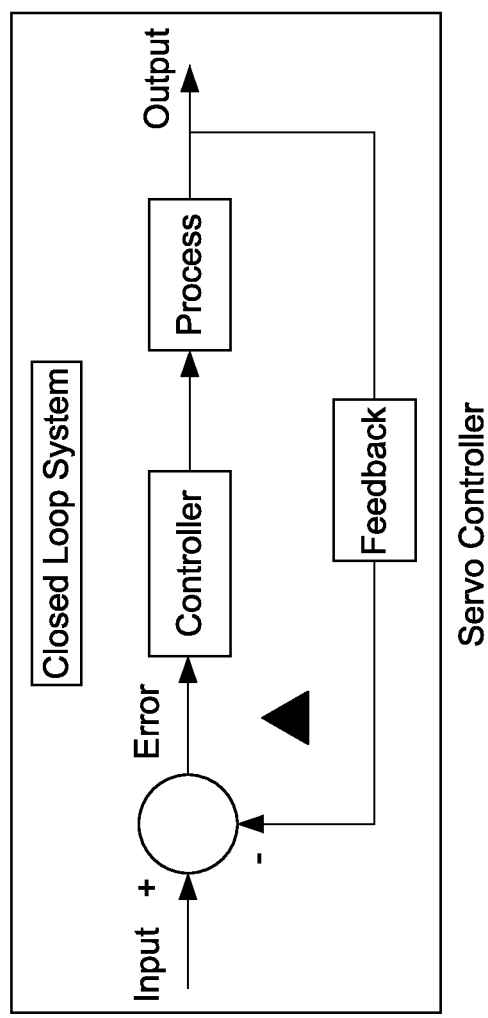
FIG. 23 illustrates an exemplary closed loop system for a servo controller design, in accordance with an embodiment of the disclosed system and method.

More sophisticated servomotors use optical rotary encoders to measure the speed of the output shaft and a variable-speed drive to control the motor speed. Both of these enhancements, usually in combination with a PID control algorithm, allow the servomotor to be brought to its commanded position more quickly and more precisely, with less overshooting and preventing error in reaching a target position. Industrial type servomotors often are used with controllers or microcontrollers for greater precision with commanding rotational positions. The servo circuitry is included in the motor unit and includes a positionable shaft which is usually fitted with a gear. The motor of the servo motor is controlled with an electric signal which determines the amount of movement of the shaft. In certain embodiments, a servo motor may include a small DC motor, a potentiometer and a control circuit therein. The motor is attached by gears to the control wheel. As the motor rotates, the potentiometer's resistance changes, so that the control circuit can precisely regulate how much movement there is and in which direction. When the shaft of the motor reaches a desired position, the power supplied is stopped. If not, the motor is turned in the appropriate direction. The desired position is transmitted via electrical signal pulses through the signal wire. The motor may also implement proportional control and will run faster or slower depending on the near desired position of the servo motor. An example circuit design of a servo motor is illustrated in FIG. 22. FIG. 23 illustrates an exemplary closed loop system for a servo controller design.

The position data (x,y,z coordinates) of the target object as determined and obtained during the mapping and navigation process described hereinabove, hence, will define such rotational movement of the servo motors 101, as described further herein below in connection with FIGS. 8 and 9.

Additionally connected to the two physically and orthogonally connected servo motors 101 (and/or servo motor apparatus), is a laser pointer 103, as shown in FIGS. 17-19. Data exchanges are implemented in the system including a unique anchor ID to identify the particular anchor device 105, and rotation angles (both horizontal and vertical) transmitted to the servo motors 101 in order to effect precise rotation by the servo motors 101 and in effect rotate the laser pointer 103 so it can effect emission of its laser light to target and flash its emitting light on the object of interest.

In certain aspect or embodiments, a laser pointer 103 or laser pen is a small handheld device with a power source (usually a battery) and a laser diode emitting a very narrow and coherent low-powered laser beam of visible light, intended to be used to highlight something of interest by illuminating it with a small bright spot of colored light.

Power is generally restricted in most jurisdictions not to exceed 5 mW. The small width of the beam and low power of typical laser pointers make the beam itself invisible in a reasonably clean atmosphere, only showing a point of light when striking an opaque surface. Some higher-powered laser pointers project a visible beam via scattering from dust particles or water droplets along the beam path. Higher-power and higher-frequency green or blue lasers may produce a beam visible even in clean air because of Raleigh scattering from air molecules, especially when viewed in moderately-to-dimly lit conditions. The intensity of such scattering increases when these beams are viewed from angles near the beam axis. The low-cost availability of infrared (IR) diode laser modules of up to 1000 mW (1 watt) output has created a generation of IR-pumped, frequency-doubled, green, blue, and violet diode-pumped solid-state laser pointers with visible power up to 300 mW. Because the invisible IR component in the beams of these visible lasers may be difficult to filter out, and also because filtering it contributes extra heat which is difficult to dissipate in a small pocket "laser pointer" package, it is often left as a beam component in less costly high-power pointers.

Referring back to FIG. 8, the mobile device or other console (for example, PC, server, desktop, other computing device, etc.) receives the voice/manual command of the user which is transmitted to the mobile device in step 71. Next the system determines the nearest anchor node to the target object in step 72 (by calculating the shortest route there between such as by using Dukstra's algorithm as described hereinabove in connection with FIG. 7) based on already registered 3D locations. Based on the relative location between the anchor node and target object, the system calculates the rotation angles in step 73 (both horizontal and vertical rotation angle calculations) that should be effected to rotate the servo motors 101, by applying for example formulas described in connection with FIG. 9 herein below. Such rotation angle information is determined in step 73 by using the distance calculated for the nearest anchor to the object in step 73.

The rotational angles alpha α and beta (3 are for azimuth (horizontal) and elevation (vertical) rotations of the servo motors 101. In the embodiment shown in FIGS. 17-19, there are two servo motors 101 positioned differently but stacked, one for horizontal and one for vertical. The determined coordinate value (x, y, z) as shown in FIG. 9, is the relative location of the object with respect to the anchor node. The system may use the values (x_object, y_object, z_object) to represent the absolute location of the object in the map coordinate, and values (x_anchor, y_anchor, z_anchor) to represent anchor location, then the relative location (x, y, z) of the object equals (=) (x_object−x_anchor, y_object−y_anchor, z_object−z_anchor).

The computed rotation angle data, alpha α and beta β, is then transmitted to the anchor node 105 via wireless/wired means such as Wi-Fi, Zigbee, Bluetooth or Ethernet. The anchor control module receives the rotation parameters (or rotation angles alpha α and beta β values) in step 74 and transmits control signals to both servo motors 101 (horizontal and vertical servo motors) in step 75 in order to rotate the laser pointer connected thereto at the proper angle α and angle β in the (x, y, z) plane as shown in FIG. 9, so that the target object and hence, location thereof, can accurately be reached by the emitted laser of the laser pointer. The laser pointer will point out the target object by flashing the IR beam with precision using the proper rotational angles α and angle β to steer the motor servers 101 and hence effect rotation of the laser pointer beam that is flashed to the target object in step 76 of FIG. 8.

Figure 9:
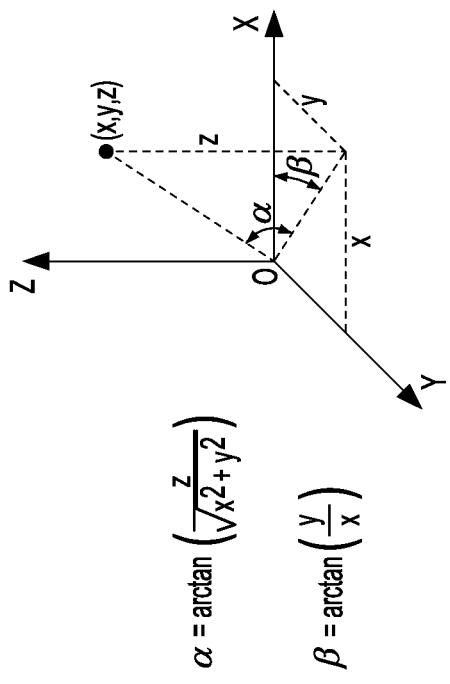
FIG. 9 illustrates the formulas that are used in determining the rotational angles alpha $\alpha$ and beta $\beta$ (representing azimuth (horizontal) and elevation (vertical) rotations of the laser pointer) that is required to target the object of interest with the laser beam light, in accordance with an embodiment of the disclosed system and method.

FIG. 9 illustrates the formulas that are used in determining the rotational angles alpha α and beta β (representing azimuth (horizontal) and elevation (vertical) rotations of the servo motors 101) that is required to rotate the laser so that the emitting laser beam can reach the target object.

The value of the rotational angles alpha α and beta β (representing azimuth (horizontal) and elevation (vertical) rotations of the servo motors 101 is determined by equations (1) and (2) shown below:

$$\alpha = \arctan\left(\frac{z}{\sqrt{x^2 + y^2}}\right) \quad \text{equation (1)}$$

$$\beta = \arctan\left(\frac{y}{x}\right) \quad \text{equation (2)}$$

The determined coordinate value (x, y, z) as shown in the (x, y, z) representation graph shown in FIG. 9, is the relative location of the object to the anchor node. The system may use the values (x_object, y_object, z_object) to represent the absolute location of the object in the map coordinate, and values (x_anchor, y_anchor, z_anchor) to represent anchor location. Hence, the relative location (x, y, z) of the object is determined as =(x_object−x_anchor, y_object−y_anchor, z_object−z_anchor). Such determined (x, y, z) value representing the relative location of the object to the anchor node is used in determination of the rotational angles alpha α and beta β (representing azimuth (horizontal) and elevation (vertical) rotations of the servo motors 101, and hence, respective rotation of the laser pointer 103 in the (x, y, z) plane.

FIG. 10 provides an overview of how the system can also achieve fine-grained localization in larger scale buildings. More particularly, FIG. 10 provides an overview of an example layout of a floor to illustrate how the system can also achieve fine-grained localization in larger scale buildings using initial coarse localization information, in accordance with an embodiment of the disclosed system and method. Hence, there are embodiments in which the smart laser system and method can still achieve fine-grained localization when being implemented in larger size buildings. The system saves the created world map including the extracted visual features of the environment, which are ideally unique at different locations. However, when the user re-enters the same building or indoor location, based on such saved features, the system can match the captured features against the saved features in the world map to re-localize (for example using ARKit). This process generally works well in small size buildings. However, this process does not always work as well in large buildings due to at least two reasons. First, as the size of the building increases, more visual features are needed to cover the whole building. Thus, when the user starts to re-localize, the system using for example, ARKit) would need to search a large database (matching visual features). This becomes unduly inefficient, burdensome and/or even not feasible. Second, in larger-sized buildings, there is a greater chance that repetitive features do occur. For example, in an office building, it is more unlikely to consist of repetitive features in a single room. However, repetitive features may appear in multiple rooms, for example, each room includes the same kind of table, furniture, bookcase, etc.

Thus, in order to overcome this problem, the system will identify which room the user is in, and then load the visual features of that room area, and performs an additional layer of matching for more fine-grained localization. As shown in FIG. 10, the circled area room 4 includes coarse location information using other localization methods, such as WI-FI. Hence, the system searches the world map portion associated with this coarse area location.

The world map that ARKit creates is used for re-localization. Once re-localized, the mobile device can keep track of its fine-grained movements without the map. ARKit needs to match what the camera "sees" or detects at the current moment to the saved visual features in the world map, in order to figure out its location. When the world map is too large, the matching will be inefficient, even infeasible. The novel solution disclosed in the example embodiment is to narrow down the matching space through coarse localization. The coarse localization such as Wi-Fi based approach provides the rough location (for example, in which room, instead of the entire building). Hence, the system only is required to match what the camera "sees" to the portion of the world map. Once the system localizes the fine-grained location of the device in the room, the system can keep track of the device's location more easily, using for example ARKit.

Figure 11:
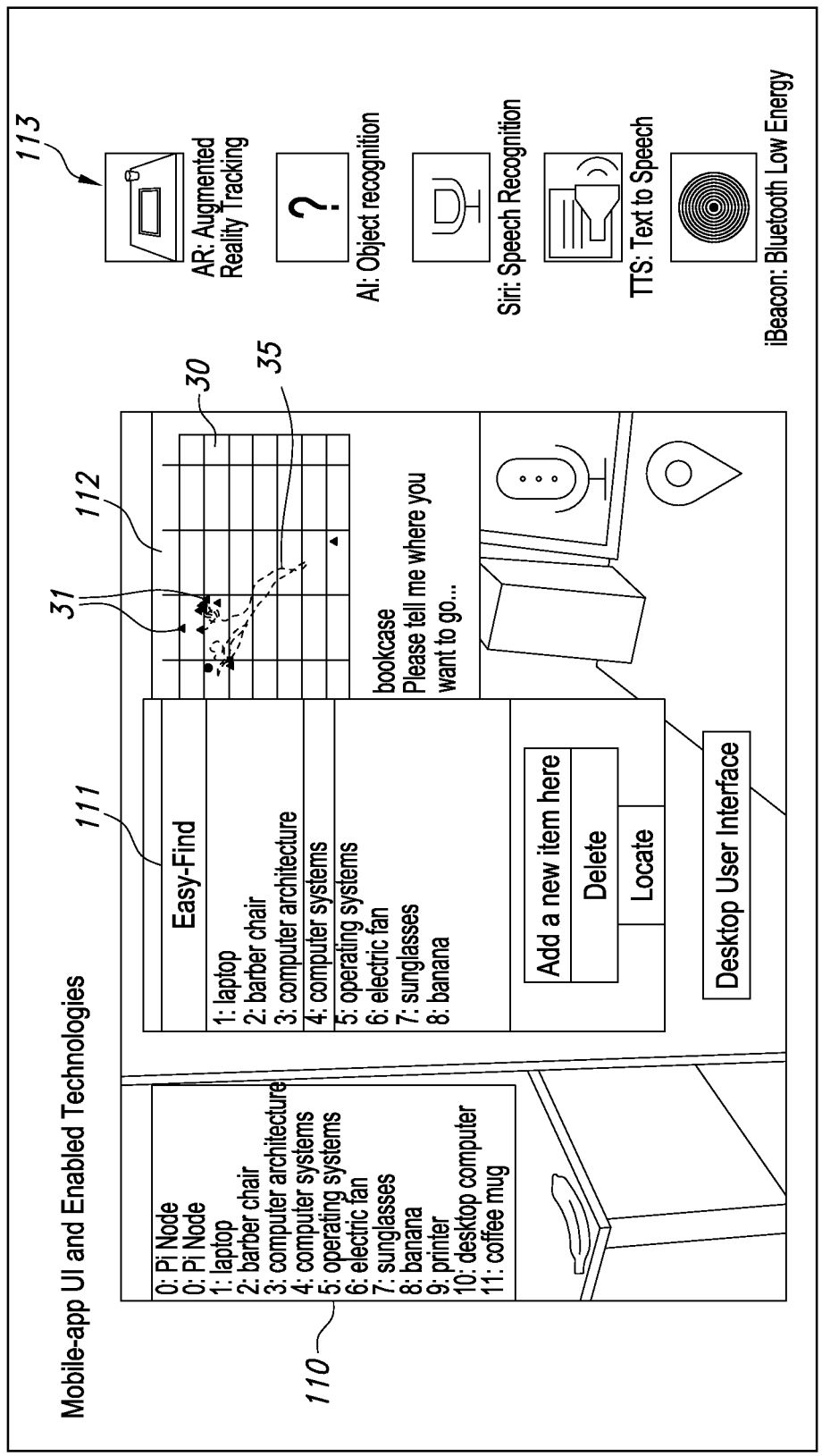
FIG. 11 illustrates an example user interface associated with mapping and navigation during implementation of the smart laser pointer system, in accordance with an embodiment of the disclosed system and method.

FIG. 11 illustrates an example user interface associated with mapping and navigation during implementation of the smart laser pointer system, in accordance with an embodiment of the disclosed system and method. Shown on left panel is a series of objects in a menu screen 110 which lists objects such as pi node, laptop, barber chair, computer architecture, computer systems, operating systems, electric fan, sunglasses, banana, printer, desktop computer and coffee mug that are tagged for inclusion in the world map of the indoor environment. Shown in the middle screen is an example desktop user interface menu selection screen 111 in which additional items can be selected to add to objects to tag and/or selected as an object to locate using an embodiment of the disclosed system and method. The right panel 113 of FIG. 11 provides exemplary contemplated applications and/or technology that can be enabled and implemented with the disclosed smart laser pointer system and method, such as augmented reality (AR) tracking, artificial intelligence (AI) object recognition, speech recognition programs (Siri), text to speech (TTS) and iBeacon, bluetooth low energy technology. FIG. 11 also shows a user interface grid 112 displaying a set of routes that set out the path or map of the user to the objects of interest and/or final destination(s), as also illustrated in FIGS. 2 and 7 in more enlarged view, with map 31 overlaying enlarged grid 30 and route(s) 35.

In accordance with a disclosed embodiment, the system and method can assist a user in creating a map of an area and add objects of interest to the map which can be used for navigation, among other potential uses. The system is able to re-localize the device in the real world by loading the saved map and displaying all the objects that were added to date. The system can also assist the user to navigate to the object by for example, the user clicking/selecting the name of the object in the list or interpreting and using the user's voice command. The system may create a new map or test a new map when initially launching an application of the smart laser pointer system.

Figure 12:
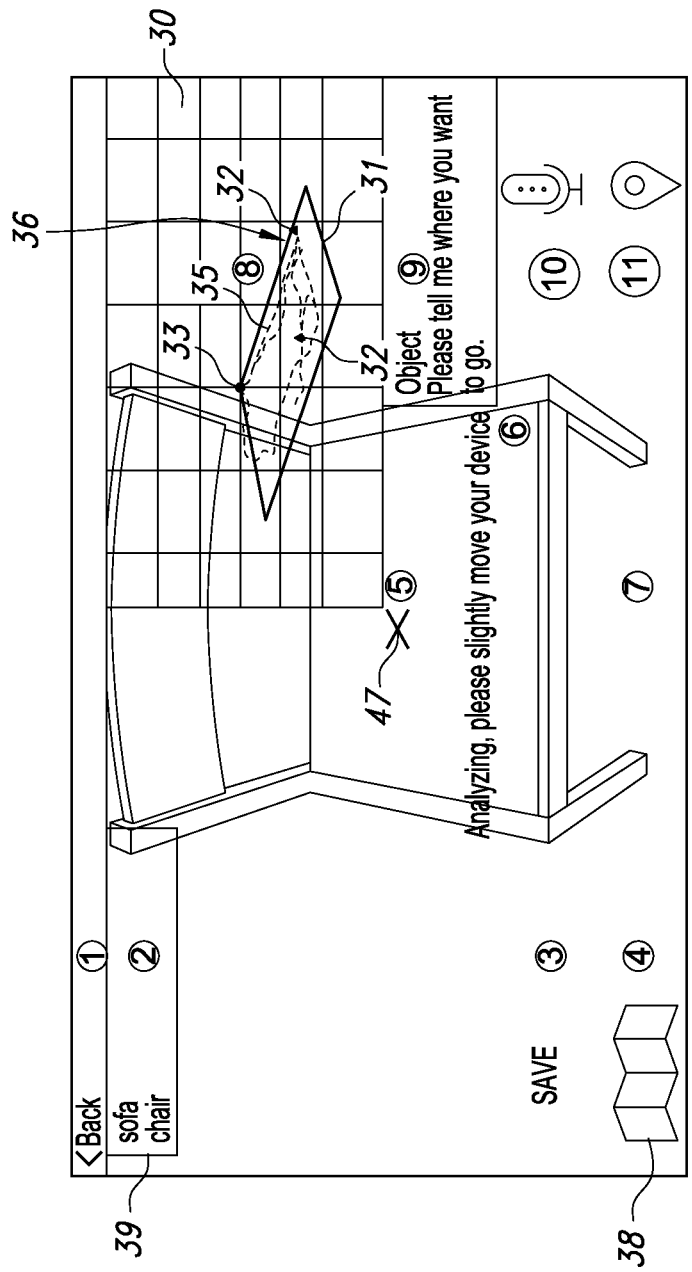
FIG. 12 illustrates an example user interface associated with mapping and navigation during implementation of the smart laser pointer system, in accordance with an embodiment of the disclosed system and method.

More particularly, FIG. 12 illustrates an example user interface associated with mapping and navigation during implementation of the smart laser pointer system, in accordance with an embodiment of the disclosed system and method.

The user can enter via keyboard or mouse entry, the object of interest or alternatively may select from the menu 39 of items shown in FIG. 12 (for example, sofa, chair, etc.). Next shown is an overlaying grid 30 (that provides the x-y coordinate grid template for an additional overlaying map 36 defined by boundary line 31, located within the boundaries of the grid 30. Shown within the boundary lines 31 of the map 36, is the creation of a virtual reality mapping of a suggested route 35 to perform navigation and hence, reach a destination 34 starting from current location of user 33 or another location within the boundary lines 31 map 36. The user can implement such map boundary lines 31 and route 35 located there between, in order to navigate to and locate an object of interest, with the suggested route 35 being created based on the object of interest, shown in FIG. 2 as a dashed line or path. Respective points of interest (POIs) 32 are also shown within map boundary line 31. The POIs represent, in certain embodiments, the actual locations of objects of interest that are located within the boundaries of a particular defined indoor spatial environment. Also shown in FIG. 12, is a map button 38 which is used to create the wall boundaries or other delineating features such as a corner, associated with the room being mapped. In certain embodiments, the user holds the mobile device and walks simultaneously near each corner of the room or any respective turning locations, and selecting or clicking the map button 38, in order to mark a point. These respective turning points are connected one by one, in order to draw and create the shape of the room in the respective map 36 representation.

The user interface circled buttons labeled 1-12 provide respective user interface functions as shown in FIG. 12. The user interface function (circled button 1) refers to abandoning the current map 36 and reverting back to map selection window. User interface (circled button 2) provides a table of all labeled objects that the user can navigate to, by using the system by clicking the name of the object in the table 39 and also swiping left to edit the name of the object or delete the object. The user interface (circled button 3) provides for saving the world map. If the tracking state is ready to save, the user can click/select the save button to save the current world map. Once the button is selected, a dialogue window will pop-up and request the user to enter the name of the world map (for example, by selection of the map name that will be shown in the map selection window). The user interface (circled button 4) permits the user to select when a corner is reached. This feature can detect the border of the wall and plot wall lines 31 in the map 36 displayed on the grid 30. The center mark x (47) indicates the center of the view. As the object identification (circled button 9) and the add label button (circled button 11) search the objects in the center of the view 47 (shown as circled button 5), this center mark x (47) is aimed to tell you which object is being identified. The information message displaying "Analyzing, please slightly move your device . . . " may appear when creating a new map or loading a saved map, in certain embodiments. This message will disappear in several seconds once the user creates a new map using the smart laser pointer system. However, it takes longer when the user is loading a saved map.

After the message disappears, the user can commence the process of creating the map 36 and/or adding objects. When loading a saved map 36, the system has not yet re-localized the user in a saved map until this information message disappears. There is a higher probability of re-localizing when the user is near or around the position of where he/she saves the world map.

Tracking state information (button 7) is shown in FIG. 12 (also as shown in FIG. 13 of example mapping window). Indicators of the tracking state can be for example, "Not Mapped" or "Ready to Save". The user can click/select save button on user device in order to save current world map but when the tracking state is "Ready to Save". The system can maintain the scene still for a few seconds to change the state from "Not Mapped" to "Ready to Save". It is easier for the system to re-localize if the user is in the position where he/she saved the map.

The map area (button 8) is the area of the user interface which provides the current map 36 bounded by lines 31. This area overlaying grid 30 provides the current map 36 defined there within the respective boundary lines 31. The curves represent the route(s) 35; triangles 32 represent the objects the user adds to the map 36; the map boundary line 31 is the outline of the bounded map area; the large triangle 34 represents the object the user selects for navigation to (as shown in example FIG. 2) and the dot 33 is the current location.

The predicted name (button 9), of the current object, for example "chair" is generally indicated in the center of the object as designated with an x (47)) in the user interface, as shown in FIGS. 12 and 13. This predicted name (for example chair) will refresh every 3 s. The line below the predicted name (button 9) is the predicted name of voice recognition (button 10).

The voice recognition button 11 permits the user to press and state the name of the object the user would like to navigate towards and then may release the button. The line in (button 9) will then display the prediction of the voice recognition. If the name exists already in the table of object (button 2), the system will directly show the route 35 to the object. Next a voice will state "Start navigation to (object name)". The route 35 will be shown then in map (button 8). When you reach the destination, a voice will state "You have arrived". If the prediction of the voice recognition does not match any object name, there will be a voice that states "No destination found, please speak again". If there are multiple names matching the voice recognition result, only one of them will be set as destination. Therefore, if the name of the object that the user desires to navigate to is not unique, the user can just select/click its name in the table or menu selection area 39 (shown button 2) for navigation in FIG. 12.

Button 11 on FIG. 12 provides an add label button. The system labels the current object in the center of the view, with the name being the current predicted name in area (button 9). The user can change the name of the object by swiping left its name in menu selection area 29 (button 2). A word (example, chair) will be added to the user interface area displaying the object (as shown in FIG. 13).

FIG. 13 illustrates an example user interface associated with mapping and navigation during implementation of the smart laser pointer system including respective 3D text label(s), in accordance with an embodiment of the disclosed system and method. FIG. 13 provides the same user interface features described hereinabove with respect to FIG. 12 but with the addition of the 3D text label "chair" added to the object 37, which in the shown example, the object is a chair.

The user can enter via keyboard or mouse entry, the object of interest or alternatively may select from the menu 39 of items shown in FIG. 12 (for example, sofa, chair, etc.). Next shown is an overlaying grid 30 (that provides the x-y coordinate grid template for an additional overlaying map 36 defined by boundary line 31, located within the boundaries of the grid 30. Shown within the boundary lines 31 of the map 36, is the creation of a virtual reality mapping of a suggested route 35 to perform navigation and hence, reach a destination 34 starting from current location of user 33 or another location within the boundary lines 31 map 36. The user can implement such map boundary lines 31 and route 35 located there between, in order to navigate to and locate an object of interest, with the suggested route 35 being created based on the object of interest, shown in FIG. 2 as a dashed line or path. Respective points of interest (POIs) 32 are also shown within map boundary line 31. The POIs represent, in certain embodiments, the actual locations of objects of interest that are located within the boundaries of a particular defined indoor spatial environment. Also shown in FIG. 12, is a map button 38 which is used to create the wall boundaries or other delineating features such as a corner, associated with the room being mapped. In certain embodiments, the user holds the mobile device and walks simultaneously near each corner of the room or any respective turning locations, and selecting or clicking the map button 38, in order to mark a point. These respective turning points are connected one by one, in order to draw and create the shape of the room in the respective map 36 representation.

When the user proceeds to create a new map, such as shown in FIG. 0.13, using the initial map selection window, the user selects create new map. Next, the user navigates until the information message "Analyzing, please slightly move your device . . . " as shown in FIG. 12, disappears. When the user reaches a corner, the user selects map button 38 to create an outline of the area. Next the user selects add label button (11) to label the object in the center of view and then the user edits the name of the label or deletes the labeled object in menu of items 39 (also shown as button (2) in FIG. 12). The voice recognition button (button 10 in FIG. 12) can be pressed to state the name of the object or click the name of the object you seek to navigate to or locate, in order to actually start the navigation. The user may walk, navigate at his leisure or even stay still for several seconds such that the tracking state information (button 7) will retrieve and process sufficient information including the (x, y, z) coordinates, label the name and then would be considered as "Ready to Save" the information. The user may press or select the save button (4) and enter the name of the world map at such point. Next, the user may load a saved world map. The user may select the name of the saved map he/she wishes to load in the map selection window. In certain embodiments, the navigation function may search the path from the route that the user has walked (and not the shortest path). The user may continue to walk around the environment or navigate until the information message, for example, "Analyzing, please slightly move your device" disappears. In certain embodiments, the user will have better chance to re-localize if the current position is near the position where you saved the world map.

Figure 14:
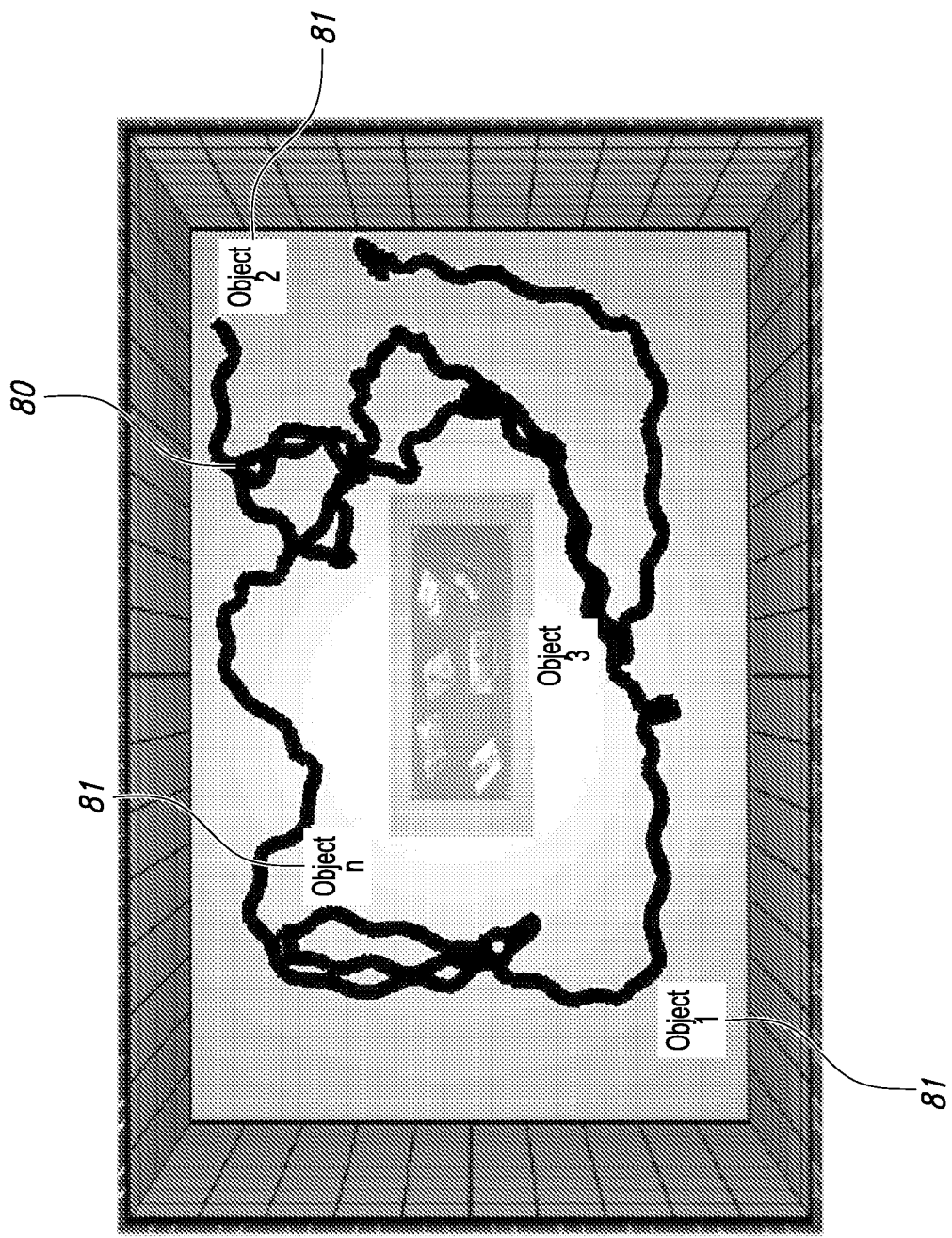
FIG. 14 provides an example overview of a mapped navigation route of the user's path 80 mapped with respect to a user while seeking to add object 1 to object n to the world map, in accordance with an embodiment of the disclosed system and method.

FIG. 14 provides an example overview of a mapped navigation route of the user's path 80 mapped with respect to a user while seeking to add object 1 to object n to the world map. The user's path is not always the shortest path that is determined using for example, known Dijkstra's algorithm can be used in certain embodiments to compute the shortest path (as described in connection with FIG. 7 hereinabove using known Dijkstra's algorithm in order to compute the shortest path). FIG. 14 further illustrates an aerial view of a set of real world floor plans and the user's navigational path 80 (and not necessarily the shortest path)

to reach from one object to the next. Such real world floor plans and the user's navigational path 80, also provided as an input to the smart laser pointer mapping system, in accordance with an embodiment of the disclosed system and method. In an embodiment of the augmented reality mapping system, the corresponding pathway 80 of the user in the physical or real scene floor plans is detected and processed by the system and shown as pathway 80 in FIG. 14. A static mapping of the virtual floor plans and the real world floor plans is computed in accordance with a disclosed embodiment of the VR mapping system. The mapping that is static is considered surjective such that the limited real world space can be reused to re-localize and use the user mapping in the virtual world map rendering once the user changes position.

During execution as described in greater detail below, the system can track the user's current and actual positions along the formed pathway 80 in the real space plans shown in FIG. 14, and determine the corresponding positions and respective user pathway thereby formed for use in system renderings of virtual space plans, as mapped thereto by the system. Such formed pathway 80 is used by the system to navigate the user to the respective objects 1 to object n.

Figure 15:
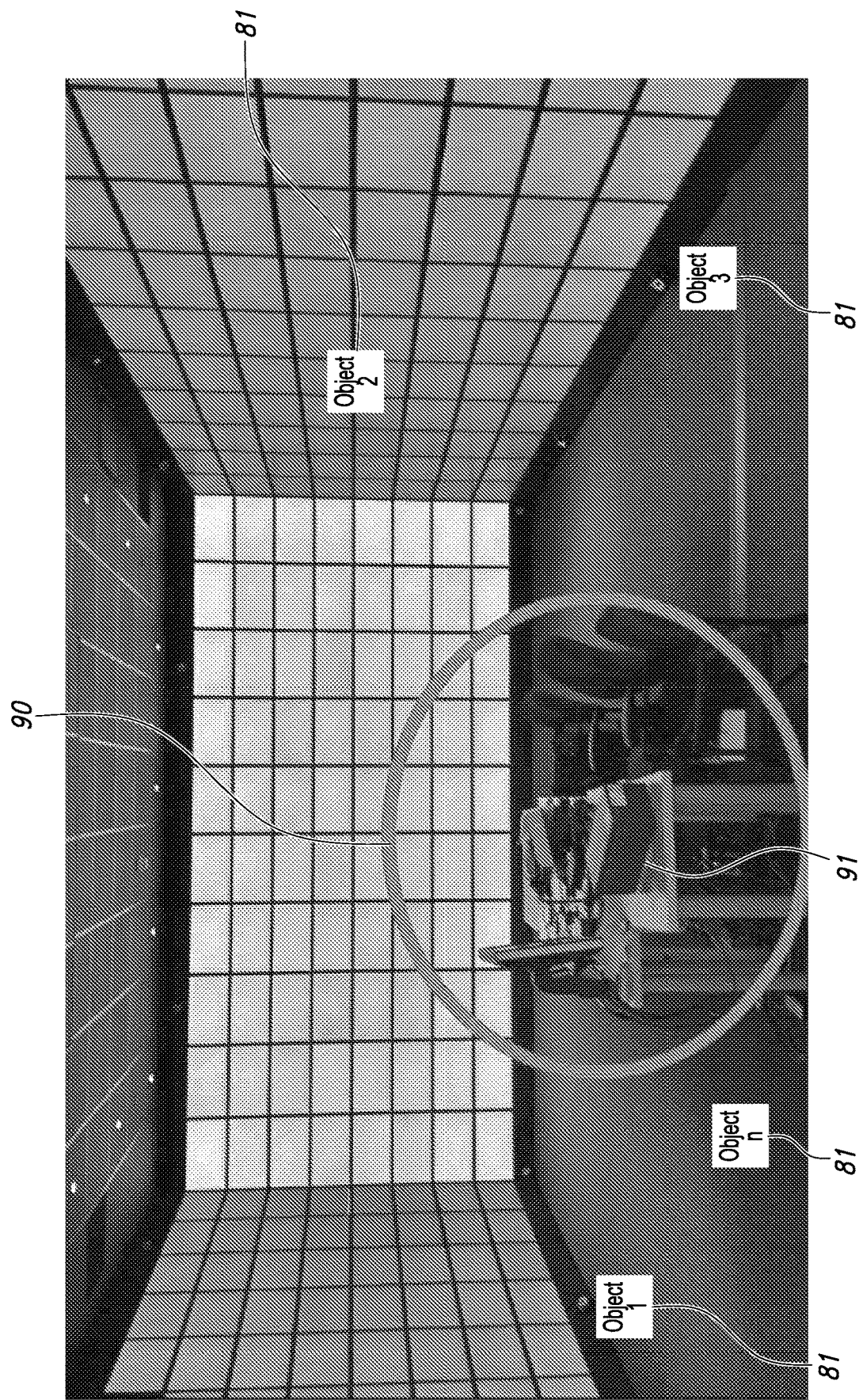
FIG. 15 illustrates an embodiment of the virtual reality mapping system including anchor nodes implemented in the smart laser pointer system, in particular the boundary of an defining walls, objects and any obstacle(s) within the physical world space that the user navigates within, from which world map is created and delineated in accordance with an embodiment of the disclosed system and method.

FIG. 15 illustrates an embodiment of a virtual reality mapping system including anchor nodes implemented in a defined indoor environment for use in the smart laser pointer system, in particular the boundary of a defining walls, object(s) and any obstacle(s) within the physical world space that the user navigates within, from which the world map is created and delineated in accordance with an embodiment of the disclosed system and method. Shown in FIG. 15, are the defining boundary walls, various objects 81, namely, object 1 to object n, a representative defining obstacle in the room marked by circle 90, which includes representative anchor nodes 91. In certain aspects or embodiments, such anchor nodes 91 include a computing device 104, one or more anchor devices 105, one or more smart laser pointer(s) 103 and servo motors 101, as shown in FIG. 17, that are implemented during use of and in accordance with an embodiment of the disclosed smart laser pointer system.

Figure 16:
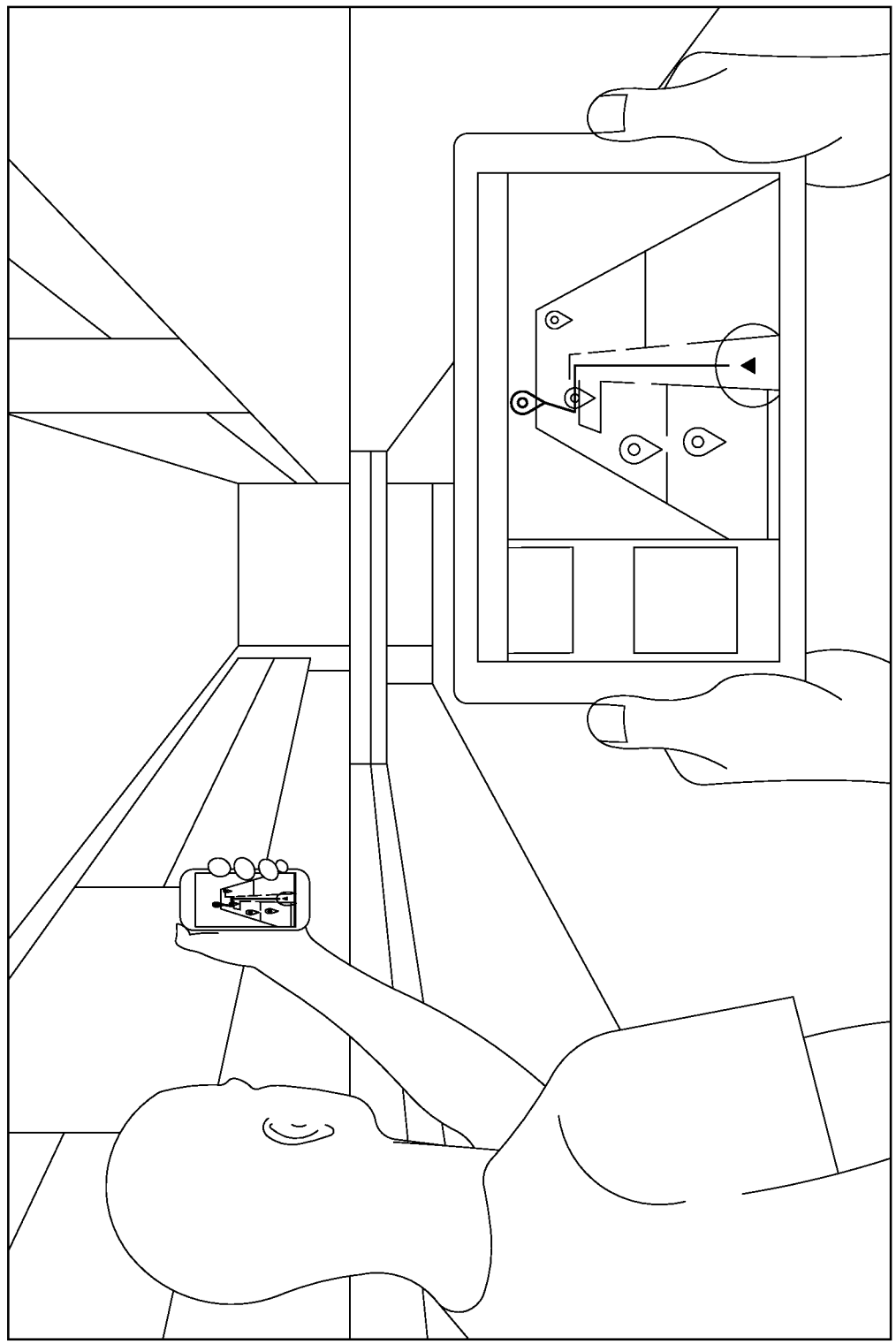
FIG. 16 shows an illustration of implementation of the smart laser pointer system in a defined indoor environment, using one or more mobile computing device(s) to search for one or more objects with respective navigational route being mapped and shown to reach one or more destination object(s), in accordance with an embodiment of the disclosed smart laser pointer system and method.

FIG. 16 shows an illustration of implementation of the smart laser pointer system in a defined indoor environment, using one or more mobile computing device(s) to search for one or more objects with respective navigational route being mapped and shown to reach one or more destination object(s), in accordance with an embodiment of the disclosed smart laser pointer system and method. Illustrated are a user holding a small smart device, such as an Iphone® using a previously mapped set of objects, retrieving a saved world map of the particular indoor environment, for example, shopping mall, and requesting access to an object of interest so the system can generate the navigational route relative to the user's current location to render the set of navigational instructions to reach the one or more destination objects of interest.

As described hereinabove, an exemplary anchor device 105 is shown in FIG. 17. The one or more anchor device(s) 105 are configured to receive commands from smart devices through wireless communication (e.g., via wireless/wired means such as Wi-Fi, Zigbee, Bluetooth or Ethernet, etc.), and effect corresponding actions (pointing at one or more object(s) with laser pointer 103).

In the example embodiment shown in FIGS. 17-19, shown is a control board 105 that for example can consist of a raspberry pi embedded system as shown in FIG. 24. Also shown are two (2) servo motors 101 positioned as stacked on each other: one being situated horizontal rotation, the second being situated for vertical rotation (more specifically shown in enlarged view in FIG. 19). A servomotor 101 is a rotary actuator or linear actuator that allows for precise control of angular or linear position, velocity and acceleration. The servo motor 101 generally consists of a suitable motor coupled to a sensor for position feedback. Additionally, the servo motor requires a relatively sophisticated controller, often a dedicated module designed specifically for use with such servomotors. Servomotors are not considered a specific class of motor although the term servomotor is often used to refer to a motor suitable for use in a closed-loop control system, as the disclosed smart laser pointer system. Hence, the servomotor is a closed-loop servomechanism that uses position feedback to control its motion and final position. The input to its control is a signal (either analogue or digital) representing the position commanded for the output shaft. The motor is paired with some type of encoder to provide position and speed feedback. In the simplest case, only the position is measured. The measured position of the output is compared to the command position, the external input to the controller. If the output position differs from that required, an error signal is generated which then causes the motor to rotate in either direction, as needed to bring the output shaft to the appropriate position. As the positions approach, the error signal reduces to zero and the motor stops.

More sophisticated servomotors use optical rotary encoders to measure the speed of the output shaft and a variable-speed drive to control the motor speed. Both of these enhancements, usually in combination with a PID control algorithm, allow the servomotor to be brought to its commanded position more quickly and more precisely, with less overshooting and preventing error in reaching a target position. Industrial type servomotors often are used with controllers or microcontrollers for greater precision with commanding rotational positions. The servo circuitry is included in the motor unit and includes a positionable shaft which is usually fitted with a gear. The motor of the servo motor 101 is controlled with an electric signal which determines the amount of movement of the shaft. In certain embodiments, a servo motor may include a small DC motor, a potentiometer and a control circuit therein. The motor is attached by gears to the control wheel. As the motor rotates, the potentiometer's resistance changes, so that the control circuit can precisely regulate how much movement there is and in which direction. When the shaft of the motor reaches a desired position, the power supplied is stopped. If not, the motor is turned in the appropriate direction. The desired position is transmitted via electrical signal pulses through the signal wire. The motor may also implement proportional control and will run faster or slower depending on the near desired position of the servo motor. An example circuit design of a servo motor is illustrated in FIG. 22. FIG. 23 illustrates an exemplary closed loop system for a servo controller design.

The position data (x,y,z coordinates) of the target object as determined and obtained during the mapping and navigation process described hereinabove, hence, will define such rotational movement of the servo motors 101, as described further herein above in connection with FIGS. 8 and 9.

Additionally connected to the two physically and orthogonally connected servo motors 101 (and/or servo motor apparatus), is a laser pointer 103, as shown in FIGS. 17-19. Data exchanges are implemented in the system including a unique anchor ID to identify the particular anchor device 105, and rotation angles (both horizontal and vertical) transmitted to the servo motors 101 in order to effect precise rotation by the servo motors 101 and in effect rotate the laser pointer 103 so it can effect emission of its laser light to target and flash its emitting light on the object of interest.

In certain aspect or embodiments, a laser pointer 103 or laser pen is a small handheld device with a power source (usually a battery) and a laser diode emitting a very narrow and coherent low-powered laser beam of visible light, intended to be used to highlight something of interest by illuminating it with a small bright spot of colored light. Power is generally restricted in most jurisdictions not to exceed 5 mW. The small width of the beam and low power of typical laser pointers make the beam itself invisible in a reasonably clean atmosphere, only showing a point of light when striking an opaque surface. Some higher-powered laser pointers project a visible beam via scattering from dust particles or water droplets along the beam path. Higher-power and higher-frequency green or blue lasers may produce a beam visible even in clean air because of Raleigh scattering from air molecules, especially when viewed in moderately-to-dimly lit conditions. The intensity of such scattering increases when these beams are viewed from angles near the beam axis. The low-cost availability of infrared (IR) diode laser modules of up to 1000 mW (1 watt) output has created a generation of IR-pumped, frequency-doubled, green, blue, and violet diode-pumped solid-state laser pointers with visible power up to 300 mW. Because the invisible IR component in the beams of these visible lasers may be difficult to filter out, and also because filtering it contributes extra heat which is difficult to dissipate in a small pocket "laser pointer" package, it is often left as a beam component in less costly high-power pointers.

Such anchor nodes 105 and computing devices 104 may be situated throughout a large location to supply usage and access of the smart laser point system and method to a user having a small computing device, such as an Ipad® or Iphone®, Android® or other Microsoft® personal computing handheld device (or otherwise, a stationed PC). Such anchor nodes 105 in certain embodiments are situated in each aisle of a library, pharmacy, a store, shopping mall or other indoor environment in an unobstructed fashion, or otherwise situated physically, such that the laser beam emitted from a laser pointer device 103, upon user command and respective control signals, can physically reach a target and destination object of interest to the user in such aisle, counter, compartment, department or other physical location in the indoor environment.

Figure 20:
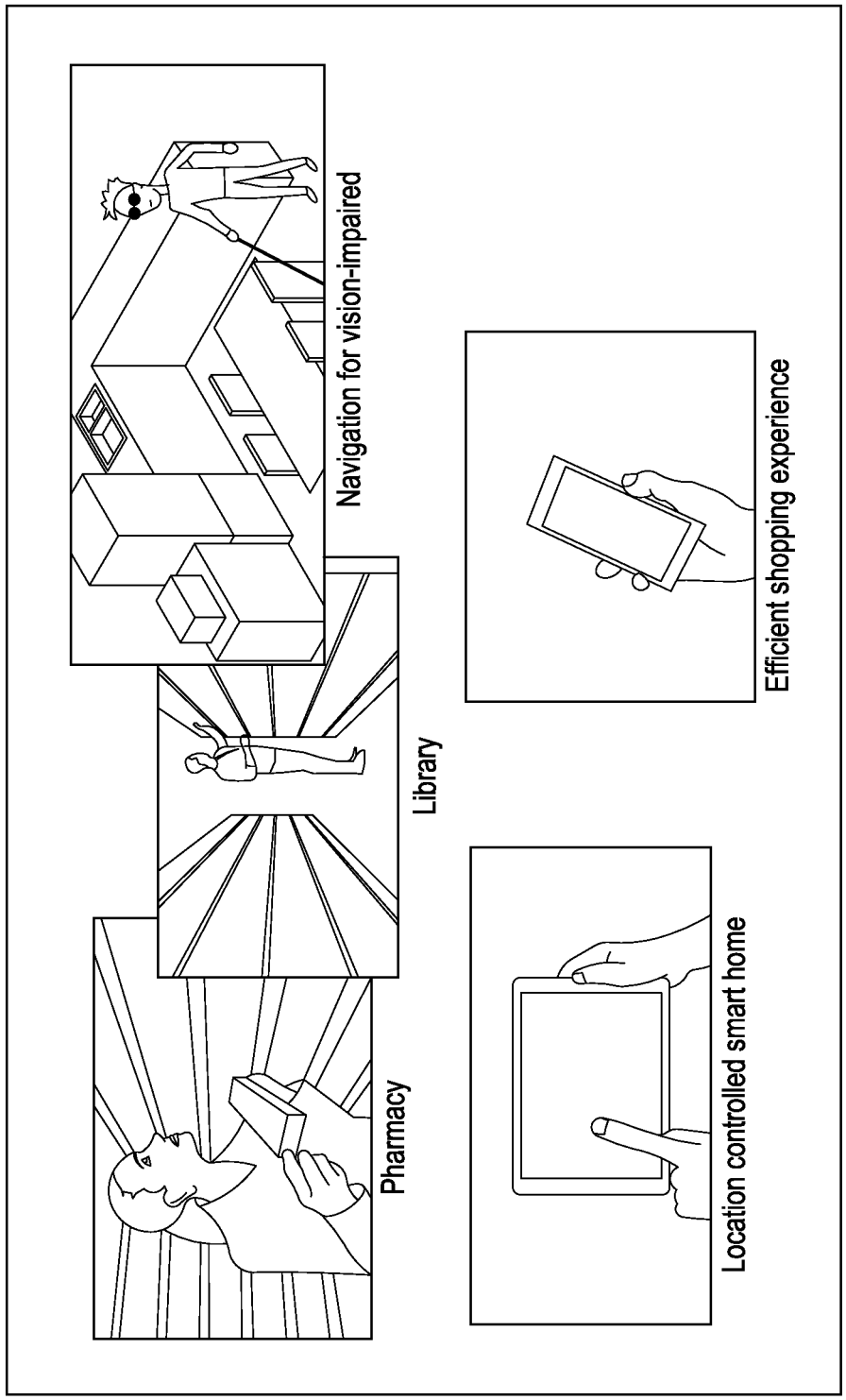
FIG. 20 illustrates an overview of various application scenarios for implementation of the smart laser pointer system, in accordance with an embodiment of the disclosed system and method.

FIG. 20 provides an overview of various application scenarios for implementation of the smart laser pointer system in accordance with an embodiment of the disclosed system and method. Shown are applications such as: use by a pharmacist in locating medicines on shelves of a pharmacy; a librarian or other library customer locating a book among thousands of books located on a library shelf; navigation by a vision-impaired individual searching for an object in an unfamiliar environment (by providing high-accuracy tracking, object recognition and voice-based interaction for such individual); location controlled smart home usage; and/or efficient shopping experiences for example, at an Amazon Go® location or a BJ's® warehouse style store.

Figure 21:
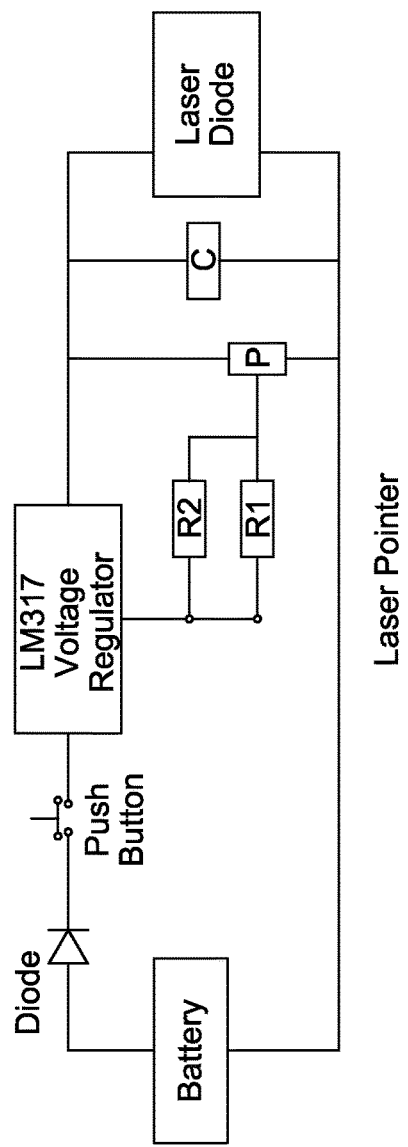
FIG. 21 illustrates an example circuit design of a laser pointer, in accordance with an embodiment of the disclosed system and method.

FIG. 21 illustrates an example circuit design of a laser pointer, in accordance with an embodiment of the disclosed system and method, including laser diode, batter, voltage regulator and other circuit components.

FIG. 22 illustrates an example circuit design of a servo motor, in accordance with an embodiment of the disclosed system and method, including gears, rotor, control phase and control transformer, among other shown circuit components and power supply.

FIG. 23 illustrates an exemplary closed loop system for a servo controller design, in accordance with an embodiment of the disclosed system and method, including input, controller, feedback look and output signals, among other shown system components.

FIG. 24 illustrates an example microcontroller in the form of at least one raspberry pi board implemented in the smart laser pointer system, which includes an integrated central processing unit, in accordance with an embodiment of the disclosed system, including raspberry pi input signals, resistors, LED and other shown circuit components. Raspberry pi small single-board computers are a popular "general purposed computer" and can be implemented with the disclosed anchor nodes 105, used in an embodiment, as the microcontroller 100, as shown in FIGS. 17-19. Many later generations of raspberry pi boards feature a Broadcom system on a chip (SoC) with an integrated ARM-compatible central processing unit (CPU) and on-chip graphics processing unit (GPU). Many of the evolved versions feature various variations in memory capacity and peripheral-device support but generally feature at least RAM, I/O, CPU/GPU, USB hub, Ethernet and 2×USB and can run up to 1 GHz CPU clock speeds. The raspberry pi boards may be operated with any generic USB computer keyboard, mouse and also USB storage, USB to MIDI converters and virtually any other device/component with USB capabilities.

Figure 25:
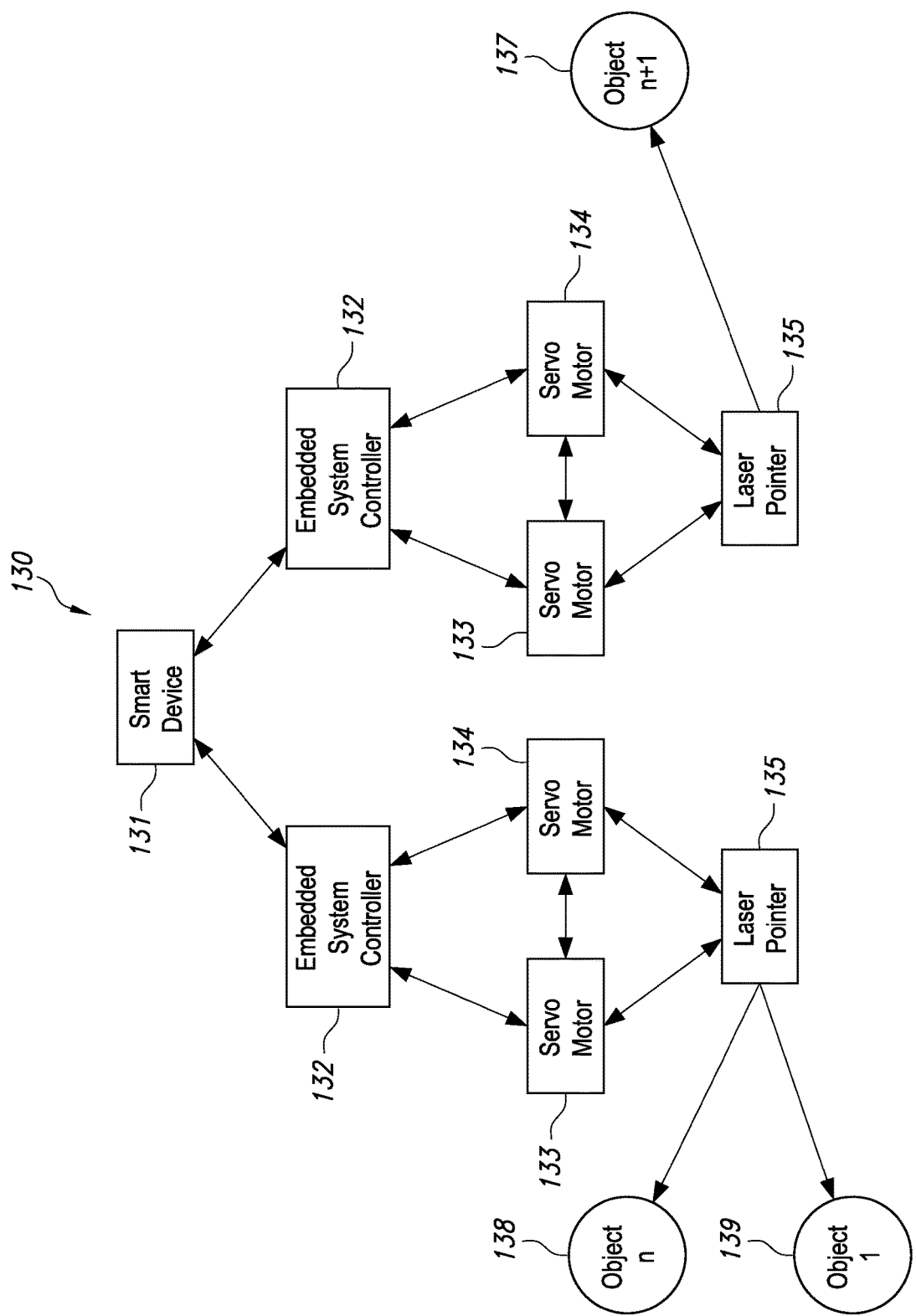
FIG. 25 provides a block dia gram overview of an example anchor node device and functional components of the smart laser pointer system, in accordance with an embodiment of the disclosed system and method.

FIG. 25 provides a block diagram overview of an example anchor node device and functional components of the smart laser pointer system, in accordance with an embodiment. Shown is smart laser pointer system 130, including smart device 131 (I.e. PDA, smartphone, IPad® or other small mobile computing device) which communicates command signals to an embedded system controller 132. Such command signals are in turn communicated to at least two servo motors (133, 134) which are situated in certain embodiments as stacked with the lower one being orthogonal to the other, for example horizontal and the second servo motor being vertical relative to an (x, y) coordinate system frame of reference.

As described hereinbove, the world map is created by a number of user actions and it leverages augmented reality technology to display labels on real world images and videos: the user points the device's 131 camera to special locations (e.g., corners of walls), and click a button on the UI to register the 3D coordinates of such locations. The device uses computer vision and inertial data to measure the relative distance and angle of those locations to the device 131. Thus the device 131 can determine the 3D coordinates of these locations. The user continues to point, and register a series of such locations, thus forming the boundaries of a possible complex indoor environment. The user also points and registers object/point of interest (e.g., doors, pictures on the walls). The respective 3D coordinates will be recorded in the map as well as objects of interest or points of interest as shown for example in FIG. 4 map.

The system using the embedded system controller 132 will translate the user voice commands to text. The user while using the microphone button of the smart device 131, enters voice commands which will be translated into text and displayed on the user device screen.

In addition the embedded system controller 132 will perform key word matching (searching for object names in our object list) or implement more advanced machine learning approaches used for selecting which object the user is specifically searching. Once identified, the user will be provided navigation instructions to that object, and control signals will be sent to corresponding anchors nodes comprising at least servo motor 133, 134 and laser pointer 135, in order to actuate laser pointers 135 to point to the requested object at the computed rotational angle(s) to aim a laser beam precisely at such object (for example using the algorithm described herein above in connection with FIGS. 8 and 9). In order for such laser pointers 135 to operate efficiently and properly in such smart laser pointer system, the system in certain embodiments registers the (x, y, z) coordinate locations of these laser pointers 135. Based on the 3D (x, y, z) coordinates of the requested object, the system creates control commands to rotate one or multiple laser pointers to appropriate computed angles α and β, such that the laser pointers 135 will emit a beam on the one or more requested object(s), namely object 1 to object n (137-139). The laser dots or circular shaped targeted beam will help the user identify the object more readily especially among a cluttered area or shelf comprising hundreds or even thousands of items to select from.

In certain embodiments and more particularly, disclosed is a system and method used with the disclosed smart laser pointer system, that is associated with user authentication based on acoustic based facial recognition that using a created facial echo-signature that is unique to and associated with a particular user. In certain embodiments or aspects, the disclosed system implements existing hardware widely available on most smartphones or personal digital assistants (PDA devices), so that it can be deployed on a large scale rapidly with minimum added or no hardware costs. In addition, the disclosed facial echo-signature system and method implements a biometric that is pervasive to every human being.

Hence, the disclosed echo-signature based authentication system and method, is more secure, resilient and implements in certain embodiments, a two-factor authentication system and method that may be implemented in most existing smartphones without requiring any additional special sensors and/or other hardware components.

Figure 25A:
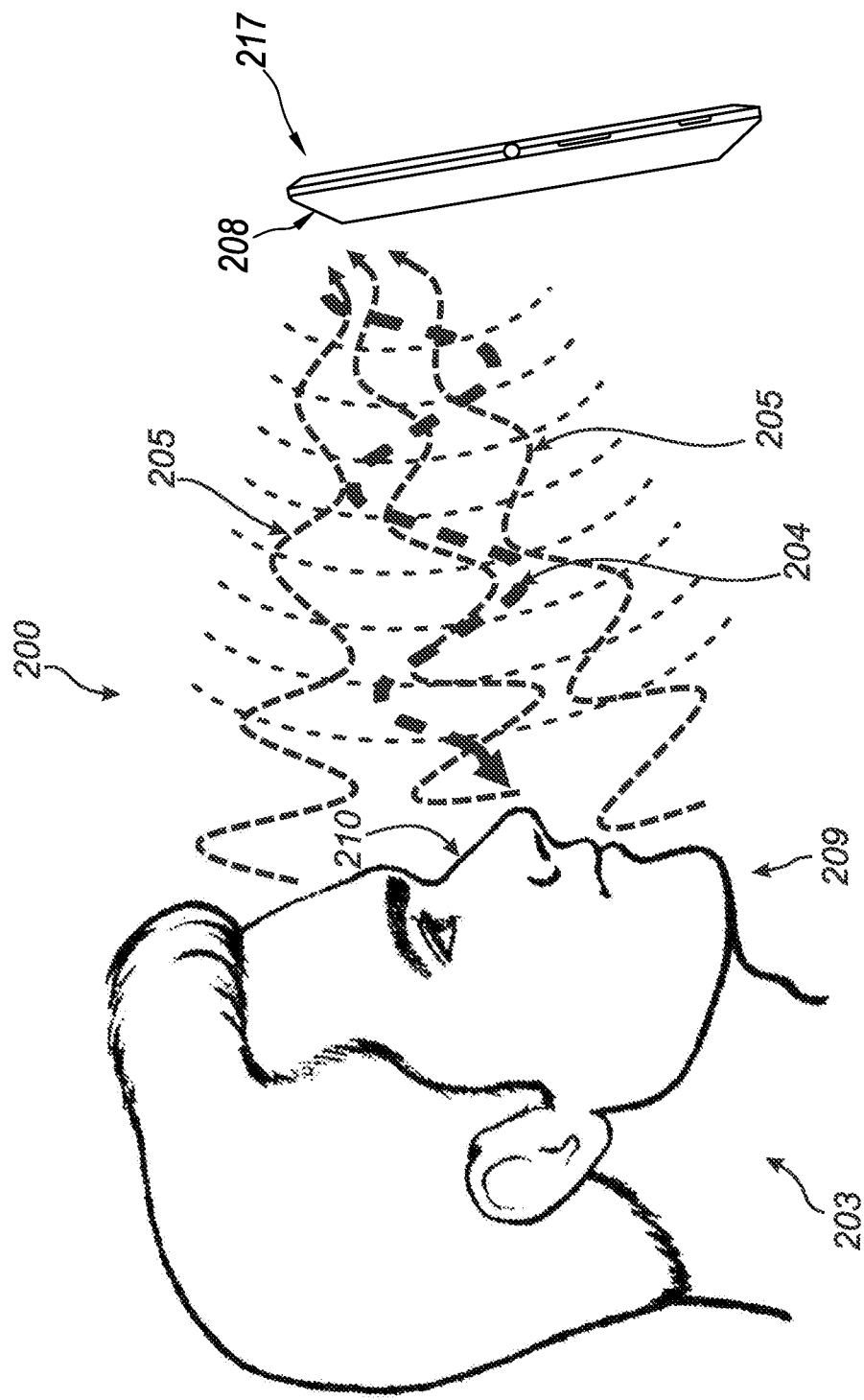
FIG. 25A illustrates an example of echo signature system in which sound signals are emitted from the earpiece speaker in order to generate an acoustic signature to authenticate a user, in accordance with an embodiment of the disclosed system and method.

Referring to FIG. 25A, shown is a flowchart illustration of the acoustic signals implemented in accordance with an embodiment of the disclosed echo-signature based system and method. The system 200 emits nearly inaudible sound signals 204 shown emanating from the earpiece speaker 208 of the device 207, which sound signals 204 illuminate the user's face 209. The extracted acoustic features from the echoes that reflect from the user's face 209 are combined with visual facial landmarks detected from the front camera of the device 207 in order to authenticate the user 203 (as described in greater detail in connection with FIGS. 2A and 7 of corresponding International application No. PCT/US 2018/057951, the disclosure of which is incorporated by reference herein).

Figure 25B:
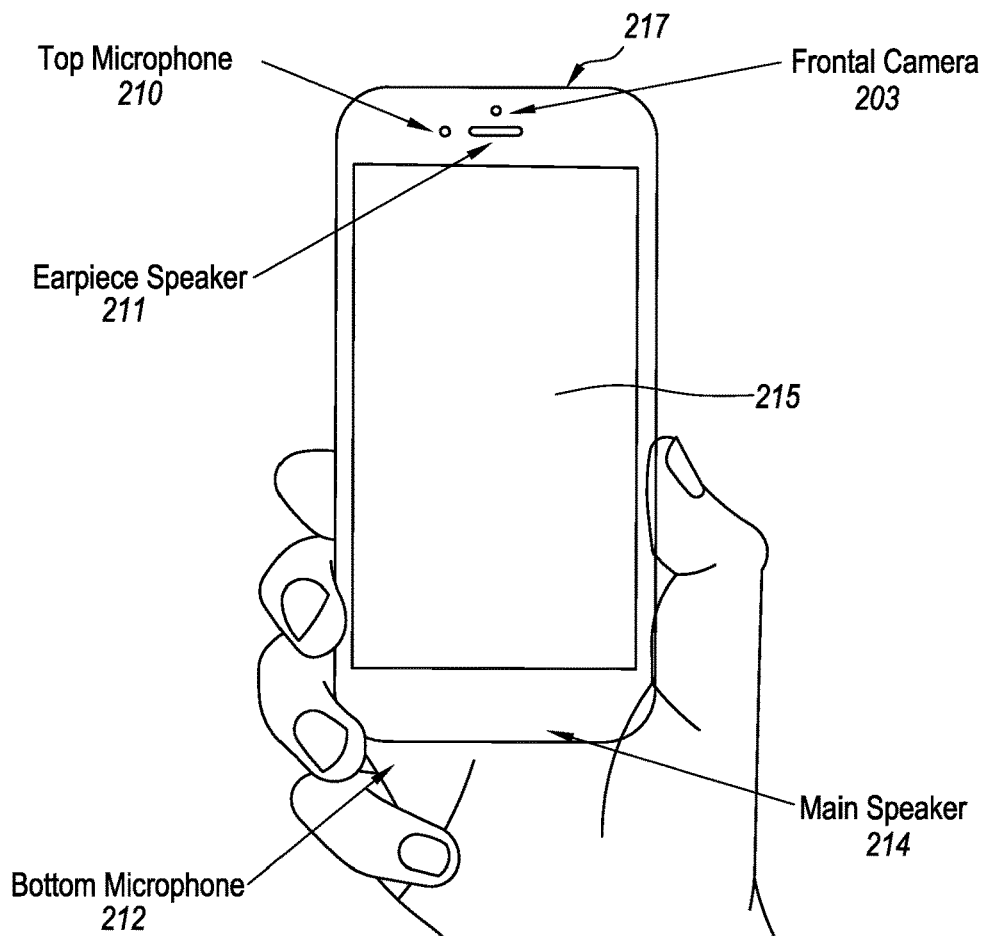
FIG. 25B illustrates a device which includes speakers, microphones and a camera layout generally included in an example mobile computing device, in accordance with an embodiment of the disclosed system and method.

In certain embodiments or aspects, the disclosed system implements the speakers/microphones associated with the smart device 217 for acoustic sensing. The frontal camera 213 as shown in FIG. 25B, is used for facial landmarks detection (for example, eyes, mouth). The device 217 extracts acoustic features from echo signals using a deep learning approach and fuses such features with facial landmarks as a joint representation for authentication, in accordance with an embodiment of the process. The system 200 leverages detected acoustic signal(s), visual landmark features and components for secure and convenient user authentication. In particular, the echo-signature system actively emits almost inaudible acoustic signals 204 from the earpiece speaker 208 to "illuminate" the user's face 209 and authenticates the user by the unique features extracted from the echoes 205 bouncing off or reflecting from the 3D facial contour(s) or 3D geometry 210 of the user's face 209.

In order to contend with any changes, for example, resulting from variations in phone-holding poses, a Convolutional Neural Network (CNN) is trained to extract reliable acoustic features. These reliable acoustic features are further combined with visual facial landmark locations to feed a binary Support Vector Machine (SVM) classifier for final authentication. Because the echo features depend on 3D facial geometries 209 of the user 203, the disclosed system cannot be easily spoofed by images or videos similar to 2D visual face recognition systems.

In an overview of an embodiment of the disclosed system design, the system consists of two major phases: user registration and user authentication. During user profile registration, the echo-signature system uses a pre-trained CNN to extract acoustic features during acoustic sensing, which are combined with visual facial landmarks as joint features. An SVM classifier is then trained to authenticate a registered user. SVM classifiers are generally considered effective for general-purpose pattern recognition processing including facial images whether frontal poses or other views of the face 209. It is further noted that generally, respective facial geometry features are expressed as vectors.

During the registration phase, the echo-signature system detects facial landmarks (for example, eyes, mouth, eyebrows, cheekbones, nose) using the frontal camera of the device 217. Meanwhile, the earpiece speaker 208 emits designed acoustic signals that are generated by the echo-signature system module or echo-signature system processor or engine, in order to "illuminate" the user's face 209. Echoes bouncing back or reflecting from the user's face 209 are received by the microphone of the device 217. A pre-trained CNN model is then used to extract acoustic features that are resilient to any phone pose changes, which are combined with detected facial landmarks as a joint feature representation, which are then transmitted and fed into an SVM classifier for model training.

During the user authentication phase, the user holds the smartphone in front of the face 209 for facial landmarks detection and acoustic sensing. The joint features are extracted during joint features extraction phase and fed into the trained SVM classifier 34 for final authentication. If the features are not recognized by the system, the user is denied access. Otherwise, the user is authenticated and allowed access to the device. Optionally, an image-based face recognition system can be integrated in an embodiment of the echo-signature system for pre-screening during user authentication. If the user image is not recognized by the system, access is denied. Otherwise, if the image is recognized the system proceeds to joint features extraction. The joint features are next extracted and fed into the trained SVM classifier in step for the next layer of authentication.

During the acoustic sensing process, which occurs during user profile registration phase, acoustic echo signals 204 reflecting from the human face 209 are detected and are determined to generally exhibit highly distinctive characteristics from one human face to another. The echoes 204 (for example, detected in the form of acoustic signals) are generally sensitive to the relative position and/or distance between the user face 209 and device 217. Each 3D facial contour 210 exhibits a unique set of multiple reflecting surfaces, which create a unique sum of individual echoes. The different materials absorb, and attenuate sound waves differently, hence, permitting the system to distinguish objects of similar geometry, but different materials (e.g., a stone sculpture). The facial region contours 210 of the face 209 include a 3D surface and hence, a certain depth. As an example, regardless of distance of the phone to the user, when in a frontal full-face pose, the tip of the nose is closest to the phone, while the ears of the user 203 are generally the farthest. The major echo assumes that the face is a flat surface. In order to cover the depth of the face 209, the system extends the major face signal to two ends.

The system can be further configured to design customized sound signals in step 46 sound emitting and recording step, for example, in a high frequency range 17-24 KHz, which is almost inaudible to humans. Different customized sound signals can be designed and emitted randomly to enhance the security. In example embodiments, during the authentication phase, the system randomly emits a designed signal and verifies the corresponding reflection signal reflect from the user's facial contours 210. In certain embodiments, the speaker on the front panel (example, earpiece speaker) of the device 217 (e.g., smartphones) is used for sound emitting signals, and any reflecting signals are captured by the microphone 208 using the smart device 217.

During acoustic feature extraction, the system extracts the reflection signal segment from the human face by identifying the signal amplitude. Due to the relative location between a user's face and the speaker/microphone, a reflection signal from the user's face exhibits high amplitude. Next, the system can extract and identify this signal segment as the unique acoustic profile for a user. Acoustic features can be extracted manually or automatically by machine learning approaches such as for example, deep neural networks. The respective profiles and extracted information is stored in profile database.

The respective profiles and extracted information are stored in profile database. The system next extracts the features from an acoustic recording, and matches them to the registered features at the given location in the database. This matching process can leverage existing algorithms such as Euclidean distance between two vectors, correlation of two signals, and other similarity metrics used in machine learning algorithms.

In certain aspects or embodiments, enhanced facial recognition is implemented than known traditional methods by using deep neural networks, which are more accurate than traditional approaches, and can be implemented to enhance the current image facial recognition methods. Liveness detection features can also be implemented by instructing the user to blink eyes, open mouth, etc., which can also be integrated as another layer of security. Note that it's not too difficult for attackers to get around such security using videos. However, videos will not pass the disclosed two-factor authentication system and method implementing image recognition and acoustics echo-signature.

In addition, in certain aspects or embodiments, the system can implement enriched acoustic features by designing more sophisticated, complex emitting signal(s). A simple solution is that the system may emit multiple sound pulses each time it performs authentication. Then the system examines all the received signals in order to reduce the false alarms.

In other embodiments or aspects, the echo-signature system and method, implements a shuffling emitting signal. As the system actively emits sound signals, it can control the signal at each time point. The system can implement multiple sound signals at different frequencies, different combinations, and different patterns. The respective training data is collected for each of the design signal(s), and the model is respectively trained. During authentication phase, the system can randomly select one or mixing multiple signals for testing. Since attackers won't be able to predict the emitting signal, it renders the system difficult to circumvent such type of acoustic based authentication. While even the response signal(s) can be perfectly recorded and replayed by attackers (but, usually impossible due to the imperfection of hardware performance), the disclosed system and method is still able to overcome such challenges as the received signal will comprise a mix of an attacker's response and a replayed signal making it rather difficult to circumvent the acoustic-based security features.

By lowering the threshold, the system can also maintain real-time authentication with minimum power consumption. When a user is out of the detection zone of the sound signal, the phone will be locked automatically. This further improves the security since the system and the device requires less accuracy and able to create inaudible sound signals for continuous detection without annoying the users. It is noted that the threshold is a similarity metric between the measure features and registered features. Hence, if the threshold is set at a lower predetermined value, it is easier for the user to pass authentication without attempting too many times. Accordingly, if the threshold is set a higher value predetermined value, it would be more difficult for the user to pass authentication and may require more attempts to seek entry into the device.

Acoustic echoes from the human face are highly distinctive. The echoes are very sensitive to the relative position between the user face and device. Each 3D facial contour is a unique set of multiple reflecting surfaces, which create a unique sum of individual echoes. Different materials absorb, attenuate sound waves differently thereby allowing the system to distinguish objects of similar geometry but of different materials (e.g., a stone sculpture verses a live human face).

Shown in FIG. 25B is a device 217 including in certain embodiments, speakers, microphones and a camera layout generally included in an example smartphone device. Shown are two speakers, a main speaker 214 at the bottom of the device 217 and an earpiece speaker 201 at the top for making phone calls. There is also one microphone 212 at the bottom, and another microphone 200 located at the top for noise cancellation.

The mobile device 217 shown in FIG. 25B can be handheld by a user 203 in a manner and position such that the device 217 is unlocked or remains unlocked by detecting a user's face 209. The device 217 may be any one of several different types of small consumer electronic devices that can be easily held in the user's hands during normal use. In particular, the device 217 may be any camera-equipped mobile device, such as a cellular phone, a smart phone, a media player, or a tablet-like portable computer, all of which may have a built-in camera. The device 217 may have an exterior front face in which there is a front-facing camera 213 and a display screen 215. As will be more fully explained below, camera 213 is used to capture an image of the device user 203 while the user is facing the display screen 215, in order to unlock the device 217 or to keep the device unlocked. Camera 213 may also be used to capture an image of the user 203 that may later be used to authenticate the user as an authorized user of the device 217, in accordance with one or more embodiments of the echo-signature based authentication system and method.

FIG. 25B shows the typical layout of speakers, microphones and camera on smartphone devices 217. In certain embodiments, the top microphone 210 is used as the receiver because it is close to earpiece speaker 211, and is less affected by the user's hand holding the device. As shown in FIG. 25B, the hand is closer to the bottom microphone 212. Even slight hand movements can create noises and variations in sound signals received by the bottom microphone 212 of the device 217.

In certain embodiments or aspects, as shown in FIG. 25B, the earpiece speaker 211, top microphone 210, and frontal camera 213 are implemented individually or in combination for even more robust acoustic/visual sensing. The earpiece speaker 211 may be selected for sound emitting for generally two reasons: 1) it is a design that exists on most smartphone devices. The location for the top microphone 210 is suitable for "illuminating" the user's face. Alternatively, the main speaker 214 comprises a more diverse design, either located at the bottom or on the back of the device 217; and 2) the earpiece speaker 211 is close to frontal camera 213, which minimizes alignment errors when the frontal camera is used for adjusting the phone pose relative to the user 203.

The echo-signature system determines the formation of the acoustic signal taking into account the following considerations in the emitting signal configuration. First, in the disclosed embodiment, the system facilitates isolation of the segment of interest (for example, echoes from the face) from the other reflections, such as interferences from clutters and self-interference from the speaker(s) 211, 214. This configuration requires the signal to be short enough so that echoes from objects at different distances have little overlap in time domain. Second, the acoustic signal should be as inaudible as possible to human ears to minimize annoyances. In certain embodiments or aspects, the implemented frequency range is generally over 20 KHz. The designed signal frequency range is generally apart from ambient noises (for example, under 8 KHz), to enable noise removal (e.g., using band-pass filters) with improved robustness thereof.

In certain disclosed embodiments, it was determined that a comfortable distance from human eyes to the phone is 25-50 cm, corresponding to a time delay of ~1.4-2.8 ms at the speed of sound. Based on experiments, when the frequency is above 20 KHz, serious power attenuation and worse signal to noise ratio occurs, and any echoes from faces are obscured, masked or buried by noises. Considering all these findings, a pulse signal with a length of 1 ms was selected with linear increasing frequencies from 16-2 KHz. A Hanning window is applied to re-shape the pulse envelop in order to increase its peak-to-side lobe ratio, thereby producing higher SNR for echoes. In authentication modes that require continuous sound-emitting phase, a delay of 50 ms for each pulse may be implemented, such that echoes from two consecutive pulses do not overlap.

In certain embodiments or aspects, the background noise is removed during background Noise Removal. The received raw signal goes through a 16-22 KHz Butterworth band-pass filter to filter out and remove background noises, such that weak echoes reflecting from human faces will not be buried or obscured by the noise.

Figure 25C:
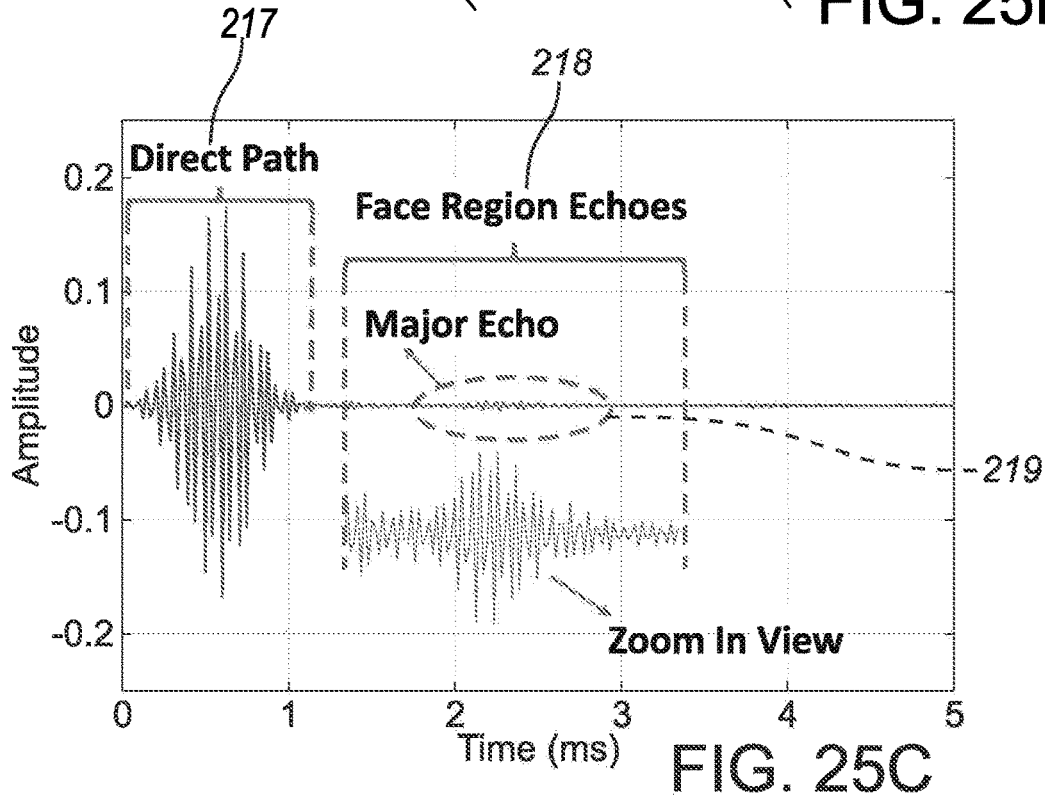
FIG. 25C illustrates a graphical representation of a sample recording segment of a received signal after noise removal during user authentication, in accordance with an embodiment of the disclosed authentication system and method.

A graphical representation of a sample recording segment of a received signal after noise removal is shown in FIG. 25C. The direct path segment is defined as the emitting signal traveling from speaker to the microphone directly, which ideally should be a copy of the emitting signal and exhibits the highest amplitude, in certain embodiments. The major echo corresponds to the mix of echoes from the major surfaces (e.g., cheek, forehead) of the face. Other surfaces of the face (e.g., nose, chin) at different distances to the phone also produce echoes, arriving earlier/later than the major echo. The face region echoes include all these echoes, capturing the full information of the face. Accurate segmenting of the face region echoes is critical to minimize the disturbances from dynamic clutters around the phone, and reduce the data dimension for model training and performance.

In certain aspects or embodiments, during signal segmentation there are two steps associated with extracting the face region segment which include 1) locating the direct path segment in raw recordings; and 2) locating the major echo thus face region segment which is located in a time-sampling representation along the x-axis, after the direct path segment.

The first step of locating the direct path implements a basic assumption that a constant gap exists between the emitting and recording phases, thus the direct path can be located after that constant gap. However, both emitting and recording must undergo through multiple layers of hardware and software processing in the operating system, many of which have unpredictable, varying delays. Thus, locating the direct path using a constant delay is extremely unreliable.

Instead, since the direct path signal usually has the highest amplitude, using cross-correlation to locate it is more reliable. Based on experiments, occasional offsets of direct path signal still occur after cross-correlation, which are due to ambiguities from comparable peak values in the cross-correlation result. Two techniques are disclosed herein below in order to enhance the stability: 1) template signal calibration; and 2) signal fine-tuning.

In certain aspects or embodiments Template Signal Calibration is used to enhance the stability of the direct path signal. Due to the hardware (for example, speaker/microphone) imperfections, the received sound signal is usually slightly different from the designed emitting signal that is generated. In order to achieve an accurate "template" signal for cross-correlation, the system performs emitting and recording in a quiet environment, so that the direct path signal can be reliably detected and saved as a calibrated template for future cross-correlation.

In certain aspects or embodiments, Signal Fine-tuning is used to enhance the stability of the direct path signal. In addition to the Hanning window, the system may implement manual tuning in order to tune the signal slightly to make the key peaks/valleys more prominent, which reduces cross-correlation ambiguity significantly. In the disclosed embodiment, only the central portion (15 samples) of the template signal is used in cross-correlation, further enhancing resilience to residual noises.

In accordance with an example embodiments or aspect, locating the Major Echo signal segment 219 is described. One method for locating the major echo is to find cross-correlation peak location corresponding to a typical phone holding distance (for example, 25-50 cm) after the direct path location. However, human face echoes 218 (and their respective echo signals) can be so weak that echoes from larger obstacles faraway can have comparable amplitudes. This makes the estimation unstable and leads to occasional location "jumping", thus outliers (for example, distance measurements differing from all other measurements) occur in distance measurements.

Figure 25F:
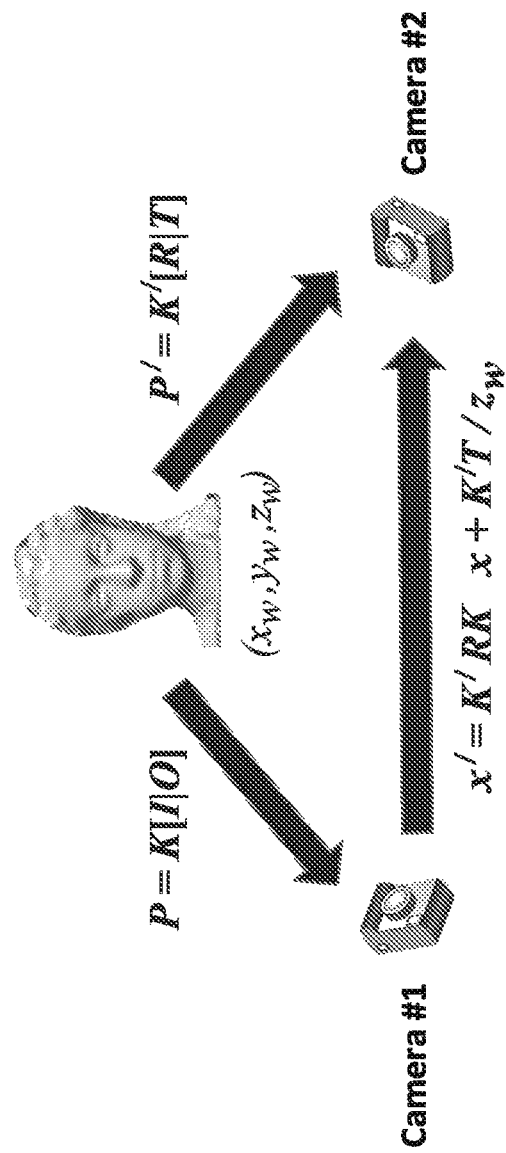
FIG. 25F provides an illustration of processing the detected facial landmarks and face tracking according to FIG. 25D, and determining respective landmark(s) transformation between camera positions from an original image to a shifted image, in accordance with an embodiment of the disclosed system and method. In addition, side-by-side illustrations of FIGS. 25D and 25F are provided for sake of further clarification of the illustrated subject matter.
Figure 25G:
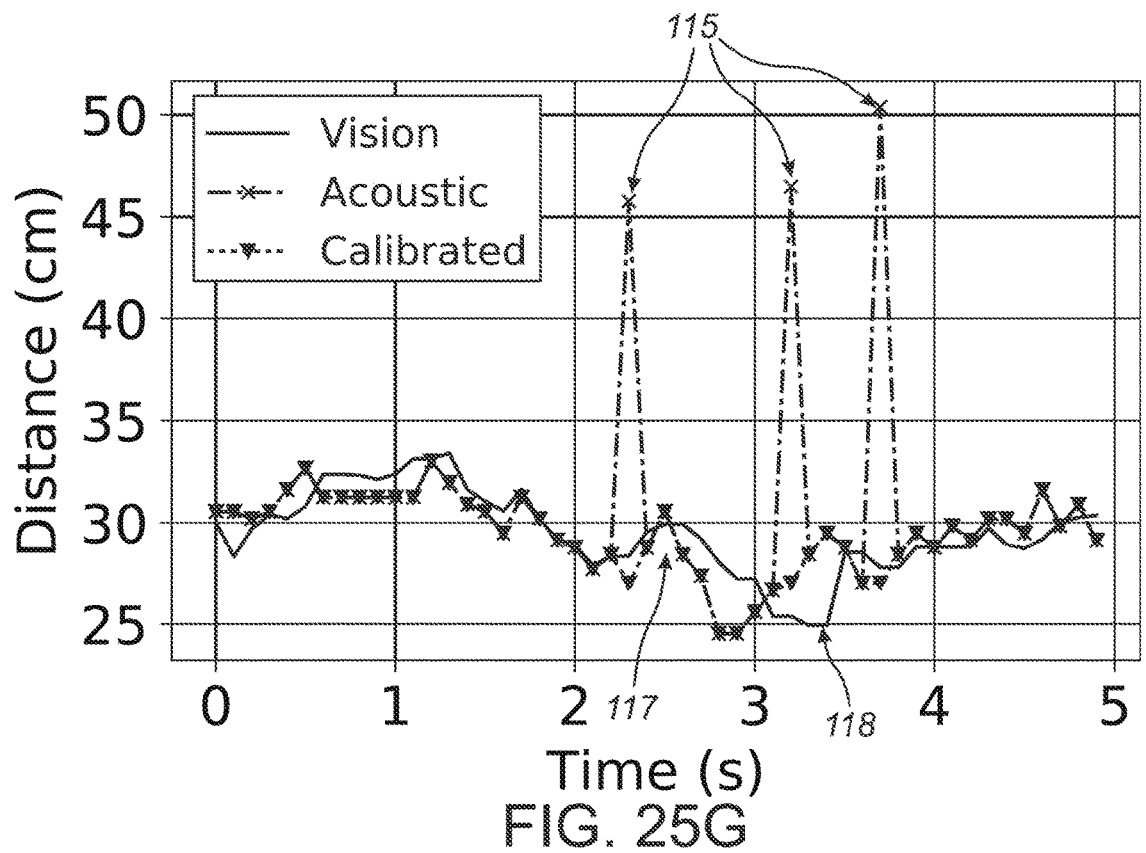
FIG. 25G illustrates a graphical representation of distance measurements from acoustics, vision and calibrated acoustics, in accordance with an embodiment of the disclosed system and method.

FIG. 25G is a graphical representation of distance measurements from acoustics, vision and calibrated acoustics. The dotted line in FIG. 25G shows the distance measurements from acoustics while the device 217 is being moved back and forth from the face 209. It can be observed that some outliers due to such "jumping" of the outliers 115 from the general grouping 117 of the acoustic signals. In order to solve this problem with "jumping", a vision-aided major echo locating technique can be implemented comprising of two steps in certain disclosed embodiments.

The first step comprises Vision Measurement Calibration. Applying the camera image projection principle, the closer the device 217 is positioned relative to the face 209, the larger the image and larger the distances between facial landmarks, and vice versa. The distance between the eyes or ears, for example, does get smaller or wider depending on the distance of the face to the camera 213. Thus, the distance from face 209 to device $d_v$, can be formulated as equation (3) provided herein below:

$$d_v = \tau \cdot \frac{1}{d_p} \qquad (3)$$

where in equation (3), $d_p$ is the distance between two facial landmarks and $\tau$ is an unknown scale factor specific to the user 203.

The system selects $d_p$ as the pixel distance between two eye landmarks since they are generally widely separated and can be detected reliably. In order to estimate the scale factor $\tau$, the system calculates $\tau_i$ for each pair-wise $d'_{v,i}$ from acoustic distance measurements and $d_{p,i}$ in pixels. In order to eliminate errors caused by acoustic distance measurement outliers, the system first determines the major cluster of $\{\tau_i\}$ using for example, density-based spatial clustering algorithm DBSCAN. It is noted that DBSCAN is generally a well-known clustering algorithm. The echo-signature system can be implemented by other clustering algorithms such as KNN or simple majority voting scheme. The system next implements leveraging linear regression to find the best $\tau$ that minimizes the offset between $d'_v$ and $$\tau \cdot \frac{1}{d_p}.$$

FIG. 25G illustrates outliers 115 that are extracted and removed in the vision calibrated acoustic distance measurements 118.

A second step in accomplishing the removal of the outliers' problem is implementation of vision-aided major echo locating technique. Although vision based distance measurement is generally considered more stable than acoustics, vision based measurements cannot capture the error caused by rotations of either the smartphone device 217 or user's face 209. Thus, the vision calibrated distance measurement is used in certain embodiments, in order to narrow down the major echo searching range and reduce any respective outliers. The system still implements cross-correlation to find the exact major peak location within this range. However, that the device user 203 face 219 cannot rotate to extreme angles, otherwise facial landmark detection may fail.

Since the depth of human face is limited, the system in certain embodiments extends for example, 10 sample points before and after the major echo segment to cover the entire face 209 region (allowing a depth range of ~7 cm). The sample points, which determine face region, can be later used by the system as inputs for machine models during authentication. It is noted that an average human face generally has seven (7) depths from which the acoustic signals echo, for example, the nose, face, cheeks, forehead, eyes, chin, mouth. The nose is considered closest to the camera 103, while the face is furthest from the camera. The cheeks are generally considered about mid-way distance. Hence, the face is considered a 3D object with generally seven (7) depths.

Figure 25H:
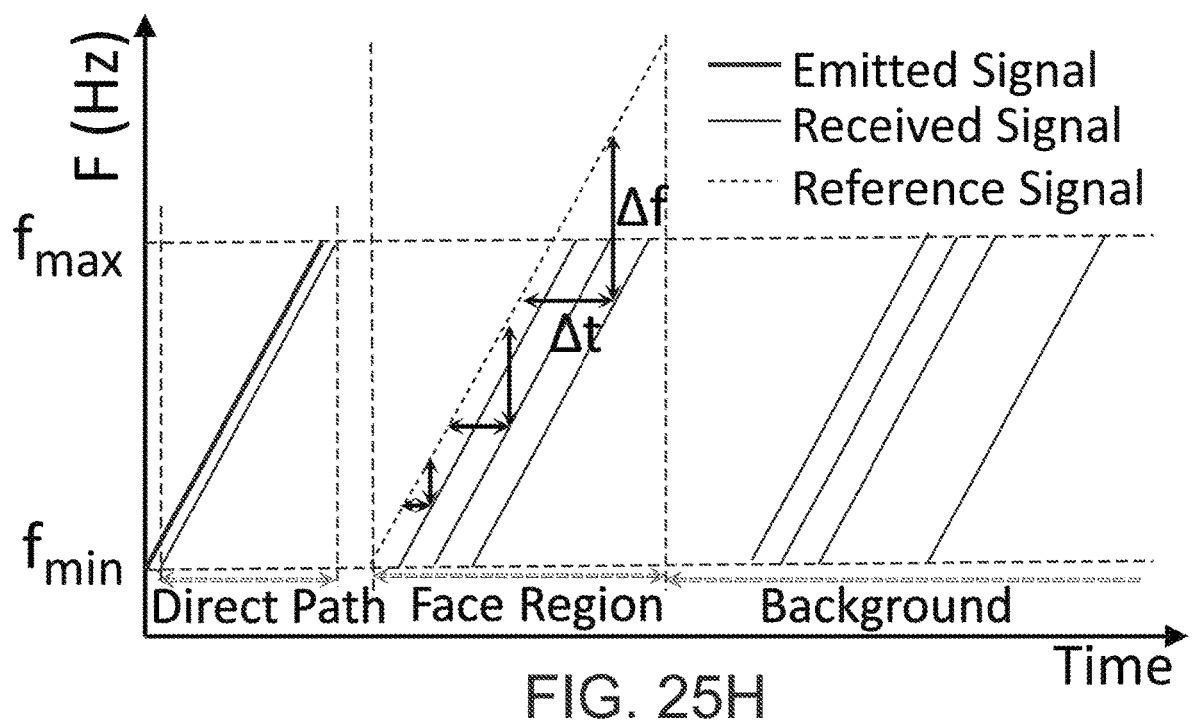
FIG. 25H illustrates a graphical representation of measuring the arrival time of each echo by using frequency-modulated continuous wave (FMCW) to determine the frequency shift $\Delta f$ and respective distance measurements, in capturing minute surface geometries on the face, by using segmented signal analysis, in accordance with an embodiment of the disclosed system and method.

FIG. 25H illustrates a graphical representation of measuring the arrival time of each echo by using frequency-modulated continuous wave (FMCW) to determine the frequency shift Δf and respective distance measurements, in capturing minute surface geometries on the face, by using segmented signal analysis, in accordance with an embodiment of the disclosed system and method.

Segmented Signal Analysis is implemented by the system, in order to isolate and identify individual echoes 204 in the time domain that eliminate any noise therefrom and can be used to estimate distances from an object, in accordance with an embodiment. The face region echoes 218 are a combination of individual echoes with different amplitudes and phases, thus isolating individual echoes in the time domain can be difficult due to noise. Hence, in accordance with an embodiment, the system measures the arrival time of each echo signal using a technique Frequency-Modulated Continuous Wave (FMCW) used in radars. In traditional FMCW, the speaker 101, 104 transmits continuous chirp signals with linear increasing frequency, from $f_{min}$ to $f_{max}$. In order to estimate the distance from an object, FMCW compares the frequency of the echo signal 4 to that of a reference signal using a technique called signal mixing, to determine the frequency shift Δf (for example as shown in FIG. 25H), which is proportional to the distance. Thus, determining Δf provides the distance (for example, use Δf multiplying a constant coefficient).

In order to capture any minute surface geometries on the face 209, the FMCW distance measurement resolution is critical. The resolution in Δf is equal to the size of one bin in the fast Fourier transform (FFT) (for example, an algorithm that samples a signal over a period of time (or space) and divides it into its frequency components). These components are single sinusoidal oscillations at distinct frequencies each with their own amplitude and phase, which depends on the bandwidth used. In certain embodiments, a wide frequency of 16-22 KHz is implemented by the system, though it may be lightly audible to some users 203. As shown in FIG. 6, the FFT is taken over a duration of the face region with length T and hence the size of one FFT bin is 1/T. Given a minimum measurable frequency shift $\Delta f_{min}=1/T$, the minimum measurable distance resolution can be computed using the slope of signals, which is the total swept bandwidth B divided by the sweep time T. Thus the distance resolution $d_r$ is defined in accordance with equation (4) hereinbelow:

$$d_r = C \frac{TOF_{min}}{2} = C \frac{\Delta f_{min}}{2 \times \text{slope}} = \frac{C}{2B} \qquad (4)$$

wherein C is the speed of sound. Assuming C=343 m/s at 20° Celsius, thus $d_r$ is $$\frac{343 \text{ m/s}}{2 \times 6000 \text{ s}^{-1}} = 2.88 \text{ cm}.$$

Note that this is the resolution at which the FMCW can separate mixed echoes 4. The resolution of a major echo location corresponds to one single acoustic sample, which is $$\frac{C}{2Fs} = 3.57 \text{ mm},$$

wherein $F_s$=48 KHz is the recording sampling frequency. The spectrogram of the segmented face region echoes 4 after FMCW signal mixing is generated and is then used as an input for CNN training during the authentication phase.

The face region segment 218 is the signal segment corresponding to the face area (whereby the face has a certain depth) as also shown and described in connection with FIG. 4. As depicted in FIG. 25C, the face region segment comprises the face region echoes 218 (i.e. Face Region Echoes segment). Basically, in accordance with an embodiment, the face region segment includes a mixed combination of echoes from different face sub-areas. Such face areas can include the major echo portion 219 including a mix of echoes from the major surfaces (for example, cheek and forehead of the face). Other surfaces of the face (for example, nose and chin) arrive at different distances relative to the phone, but also produce echoes that arrive earlier or later than the major echo portion (shown as the dotted area in FIG. 25C).

It is noted that the body portion in the above-embodiment is the facial area, but it is noted that the signal segmentation analysis (including without limitation any phases of user registration and/or user authentication phase) is applicable to the analysis of echo acoustic signals generated from the emissions of acoustic signals towards and reflected other unique body portions of the device user. These other unique body portions include but are not limited to for example, the hand, one or more fingers, neck or other generally visible body portion region comprising requisite depths for processing of echo-acoustic signals in a discrete epoch (for example discrete time period) therefrom (and further, without necessitating the requirement for the device user to remove any outerwear, or otherwise alter their current appearance, etc.).

The face echoes represented as face region echoes segment 218 in FIG. 25C, include all the respective echo signals and unique parameters (for example, amplitude, frequency values, time-axis values, density, etc.) that capture the full information associated with the face. Accurately segmenting the face region echoes is important to minimize disturbances from dynamic clutters surrounding and associated with the phone and reduce the data dimension for respective phases such as model training and performance.

Following this step of signal segmentation, during the process of acoustic representation learning, the system next uses the acoustic signal information including the face region echoes segment 219, and major echo segment 219 in order to train a CNN model as a feature extractor. It is further noted that in order to deal with any changes in phone holding poses, a Convolutional Neural Network (CNN) is trained to extract reliable acoustic features, and are further combined or fused with visual facial landmark locations or features, to feed a binary Support Vector Machine (SVM) classifier for final authentication during two-factor authentication.

This trained CNN model is transmitted to the pre-trained CNN model. The system next extracts acoustic features from acoustic signals associated with a single user in step during the two-factor authentication phase. The system next performs noise removal and signal segmentation is next performed in which the face region echoes are determined and correspond to the mix of echoes from the major surfaces of the face (for example, cheek and forehead) and may include other surfaces of the face (for example, nose and chin). This mix of echoes is used in the example embodiment, in generating a unique echo-signature print (for example similar to a user fingerprint) that is unique to the individual user 203 and reflects his unique identity to unlock the device 217 during the authentication phase. It is noted that in an example embodiment, the system can indeed augment the echo-signature print with additional projected pose(s) and/or looks of the user so that the user is not tied to just one pose/look in order to unlock the device 217.

The system in parallel will also detect the visual image of the user's 203 face 209 with the camera 213, which image is next used to detect facial landmarks and track facial position from the camera preview. The system next processes a face alignment module as will be described in greater detail in connection with FIGS. 25D and 25F. The detected facial landmarks are mainly used for face alignment, which is important for robust acoustic sensing. While such facial landmarks are not intended to greatly improve recognition accuracy, the echo signature system and process in certain embodiments is an acoustic based approach that can incorporate more sophisticated facial features, for example, features from a deep neural network trained on a huge face image dataset. Those trained features would have a higher impact on performance improvement and reliability during the authentication phase.

In accordance with an embodiment, two-factor one-pass authentication, the system implements a mode in which the user 203 must hold the phone properly to align his face within the valid area rectangle 151, 153, as shown on the screen 105 (referring to for example, further description hereinbelow in connection with FIGS. 25D & 25E). As described hereinabove, both visual facial landmarks from camera images (including landmark coordinates) 134 and acoustic features 133 extracted by the trained CNN are fed to the SVM Model for recognition. However, such processing can comprise heavier computation, energy costs, but providing the highest security level suitable for scenarios such as phone unlock and/or account log in.

Facial landmark detection is another phase of user profile registration, as previously described in connection with user profile registration and user authentication phases.

More particularly, in accordance with an embodiment, during facial landmark detection, the disclosed acoustic-based facial echo-signature system, extracts lightweight visual features of the face in order to complement the extracted acoustic features and process both features during authentication. The visual techniques serve two purposes: 1) detecting facial landmarks which are later used as basic visual features; and 2) tracking the user's face 209 on the smartphone screen device 217 so that the user 203 can hold the device within some "valid" zone relative to the distance as illustrated for example by rectangles 151, 153 shown in FIG. 25D. The valid zone 151, 153 comprises distance and/or orientation relative to the user face 209 and smart device 217 for respective data collection and processing in user profile registration and then user authentication.

FIG. 25D provides an illustration of determining facial landmarks and respective face tracking, in accordance with an embodiment of the disclosed system and method. FIG. 25F provides an illustration of processing the detected facial landmarks 155 and face tracking according to FIG. 25D, and determining respective landmark(s) transformation between camera positions, from an original image (camera #1) to a shifted image (camera #2) in accordance with an embodiment of the disclosed system and method.

In FIG. 25D, the system detects the 2D coordinates (for example (x, y) coordinate pairs) of respective facial landmarks 155 (e.g., corners/tips of eyes, center of eyes, nose, cheeks, and mouth, hairline, eyebrows) on the image as facial features. This detection can be accomplished for example, using the mobile vision API from Google® on an Android platform. The face is also tracked by at least one bounding rectangle that is formed about an area of the face 209. The respective landmarks 155 are associated with critical geometry features (eye, cheeks, nose, mouth, chin, forehead, eyebrows, hairline, etc.) of the face 209, and respective locations associated with the relative position and/or distance of the device 217 to the face 209. The system may implement the acoustic-based facial echo-signature system and method on multiple Android smartphones, including Samsung S7 Edge, Samsung S8, and HuaWei P9. FIG. 25E is an illustration of an example user interface 177 during implementation of authentication and/or registration selection in accordance with an embodiment. The prototype consists of three major modules: facial landmark detection, acoustic sensing, and machine learning pipeline for authentication. The "predict/train" switch 175 is used for authentication/registration selection.

During facial landmark detection shown in FIG. 25D, the system may implement such detection using, for example Google® mobile vision API for real-time facial landmark detection and face tracking. The frame rate in such example is set at 30 fps with a resolution of 1024×768.

More particularly, shown in FIGS. 25D and 25E, (including side-by-side versions as shown in the next drawing sheets of the Figures) include an image snapshot 150 of a middle (red) rectangle denoted as solid rectangle 152 that denotes the detected facial area 209 of the device user 203, and two (green) rectangles denoted as dotted line rectangles 153, 151 are considered the inner bounds 158 and outer bounds 157 of face valid areas 153, 151, which are fixed. In the example embodiment, the user face 209 is aligned within the two (green) dotted line rectangles 153, 151, during data collection and processing. Otherwise, if the face 209 fails to align within the boundaries of the two (green) dotted line rectangles 153, 151, the acoustic data are discarded. The landmark dots 155 as shown in FIG. 25D, and the lighter (yellow) dots 155 as shown in FIG. 25E, are the system detected facial landmarks, that are saved as pixel coordinates, for example, generally in 2D (x, y) pixel coordinate pairs or alternatively 3D (x, y, z) coordinates.

The 2D coordinates of facial landmarks 155 on the image 150 are concatenated with the corresponding 128-dimensional CNN features as the joint features representation 132 for final authentication. Both acoustic and vision data are collected simultaneously so that they are well synchronized, which ensures correspondence between facial landmarks 155 distribution on the screen 105 and the relative device position, hence, the echo signals.

Data Augmentation is the process used by the acoustic-based facial echo-signature system for determining the landmark transformation between two or more camera positions as shown in FIG. 25F and side-by side views of both FIGS. 25D and 25F. Applying projective geometry, the projection matrix P of a 3D point $(x_w, y_w, z_w)$ in the world coordinate system onto the image plane in the camera 103 is modeled as Equations (5) and (6) listed herein below:

$$\lambda \begin{bmatrix} u \\ v \\ 1 \end{bmatrix} = \begin{bmatrix} f_x & s & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x_w \\ y_w \\ z_w \\ 1 \end{bmatrix} \quad (5)$$

$$= K \cdot [R|T] \cdot \begin{bmatrix} x_w \\ y_w \\ z_w \\ 1 \end{bmatrix} = P \cdot \begin{bmatrix} x_w \\ y_w \\ z_w \\ 1 \end{bmatrix} \quad (6)$$

wherein $\lambda$ is the scale factor for homogeneous coordinates, (u, v) denotes its pixel coordinate on image, $$K = \begin{bmatrix} f_x & s & c_x \\ 0 & f_y & c_y \\ 0 & 0 & 1 \end{bmatrix}$$

is the intrinsic matrix of the camera, e.g., the focal length $f_x$ and $f_y$, skew s, and image center $(c_x, c_y)$ in pixels. [R|T] represents the extrinsic matrix of the camera, for example, the camera's pose in the world coordinate system, where R is a 3×3 matrix for its 3D orientation, and T is a 3×1 matrix for its 3D translation.

As shown in FIG. 25F, in the example embodiment, two cameras (camera 31 and camera #2) take images of the same object at different distances/angles (for example shown as camera #1 with respective transformed images, at camera #2), using equation (7) defined herein below as:

$$x=[u,v,1]^T \text{ and } x'=[u',v',1]^T \quad (7)$$

represents the object's pixel coordinates on two images. Without loss of generality, the first camera is defined as the world origin, thus the projection matrix of two cameras (camera #1 and camera #2 in FIG. 8B) are defined herein below by equation (8):

$$P=K[I|0], P'=K'[R|T] \quad (8)$$

wherein I is a 3×3 identity matrix.

Based on the above description of the projective geometry determination, the system transforms the landmark 155 pixel coordinates in one camera to those of any other or new camera pose(s) of the user 203, thus augmenting a particular training set for one or more users to cover multiple contemplated poses which is an automated formatting of a more robust training set associated with the user 203 echo-signature for that particular user 203 (rather than having the user 203 manually register with multiple poses) for later retrieval during authentication phase.

In accordance with an embodiment the system computes the landmark's world coordinates as shown in FIG. 25F. Given the projection matrix P and landmark pixel coordinates x of the first camera, the system can compute the landmark's world coordinates as $(x_w, y_w, z_w)^T = z_w K^{-1} x$, where $z_w$ is the distance of the landmark from camera center, which can be measured via acoustic sensing module.

The system next transforms the landmarks 155 onto new images. From the projection matrix of the new detected camera pose, the system can compute the corresponding pixel coordinates of the landmark by implementing the following equation defined as equation (7) herein below:

$$x'=K'RK^{-1}x+K'T/z_w \quad (9)$$

This transform equation (9) consists of two parts: the first term depends on the image position alone, i.e., x, but not the landmark's depth $z_w$; the second term depends on the depth and takes into account the camera translation. In the case of pure translation (R=I, K'=K), equation (9) reduces to equation (10) provided herein below $$x'=x+KT/z_w.\tag{10}$$

During the next step of authentication, Data augmentation, the echo-signature system and method, augments the created training set based on Equation (9) listed hereinabove. Prior to such data collection and related processing, the system first calibrates the camera with a benchmark paper printing of a chessboard with a known size. Hence, the system is able to identify and generate its intrinsic matrix K. When a new camera pose is detected, the system identifies a value for θ, wherein θ=(T,φ), where T represents its 3D coordinates and φ=(α, β, γ) for any of its rotation angles along three axes of the smartphone. The system next transforms φ to the 3×3 rotation matrix R based on for example, using Rodrigues's Formula.

In Rodrigues's Formula, if v is a vector in $\mathbb{R}^3$ and k is a unit vector describing an axis of rotation about which v rotates by an angle θ according to the right hand rule, the Rodrigues formula for the rotated vector is defined by equation (11) as follows:

$$v_{rot}=v\cos\theta+(k\times v)\sin\theta+k(k\cdot v)(1-\cos\theta).\tag{11}$$

An alternative statement is to express the axis vector as a cross product a x b of any two nonzero vectors a and b which define the plane of rotation, and the sense of the angle θ being measured away from a and towards b. Defining α to denote the angle between these vectors, the two angles θ and α are not necessarily equal, but they are measured in the same sense. Then the unit axis vector can be determined according to the equation (12) herein below.

$$k=\frac{a\times b}{|a\times b|}=\frac{a\times b}{|a||b|\sin\alpha}\tag{12}$$

The system next computes x' in Equation (10). Hence, as for a given new camera pose that is detected, the system identifies a value for θ, wherein θ=(T,φ), where T represents its 3D coordinates and φ=(α, β, γ) for any of its rotation angles along three axes of the smartphone. The system next transforms φ to the 3×3 rotation matrix R based on for example, the Rodrigues's Formula using at least equations (11) and (12) listed hereinabove.

Accordingly, following the sound propagation inverse-square law, the face region signal segment is shifted by the same distances, with the amplitude adjusted by the scale equal to the inverse of the square of distance. Due to the omni-directional property of a smartphone device 7 speaker(s) 101, 104 and microphone 8, a slight device 7 rotation from a fixed position causes negligible changes in the signal, thus only device position changes account for any such acoustic signal transform.

FIG. 25E provides an illustration of user authentication during an example implementation of an embodiment of the acoustic-based facial echo-signature system and method. An example implementation of the user screen or user interface 177 during user authentication as shown in FIG. 25E comprises implementation of three major modules: 1) facial landmark detection, 2) acoustic sensing, and 3) machine learning pipeline for authentication. For example, a "predict/train" 175 switch is used for authentication/registration selection as shown on the bottom of user interface screen 177 in FIG. 25E. An example P9/S8 selection switch 174 is used for selecting microphones (top vs. bottom microphones). User interface buttons P9 and S8 174 are just opposite, thus requiring manual selection in the shown example.

In order to implement Facial Landmark Detection, the system may use for example, Google® mobile vision API for real-time facial landmark detection and face tracking. The frame rate is set at 30 fps with a resolution of 1024×768. The bounding middle (red) darker shaded rectangle 171 (FIG. 25E) defines the detected face area 9 of the user 203 within the boundary lines of user interface 177. The two (green) lighter shaded rectangles 170 define the inner and outer bounds of face valid areas 170, which are fixed in the shown example embodiment. The user face 209 is aligned within the two (green) dotted rectangles 170 shown in FIG. 25E during user registration and/or user authentication and related data collection; otherwise, the acoustics data is discarded, as the system requires the user face 209 be aligned to perform authentication accurately. In this two-factor authentication mode, the user 203 must hold the phone 217 properly to align his face within the valid face area rectangle 170 as shown on the screen 177 of FIG. 25E. The lighter circled dots (white dots) 155 shown in FIG. 25E are the detected facial landmarks 155, which are identified and saved by the system processor as pixel coordinates.

During acoustic sensing in order to determine facial landmarks, the acoustic signal is pre-processed and displayed on the user-interface screen 177 in real-time, and the segmented signal from the face is highlighted in amplified signal segment section 173 (in darker shaded and amplified signal area). The system can be amplified by 3X for better visualization after the direct path signal. The authentication result 172 in the shown example of FIG. 25E, is denied and the user is denied access to the device 217.

Referring back to FIG. 25C, it is noted that locating the direct path signal 217 is based generally on the assumption that a constant gap exists between the emitting and recording signals. Hence, the direct path can be located after that constant gap. However, both emitting and recording signals are processed multiple layers of hardware and software processing in the operating system (OS) of the device, many of which have unpredictable, varying delays. Thus, locating the direct path using a constant delay is generally considered unreliable.

Instead, since the direct path signal usually has the highest amplitude, using cross-correlation to locate it is more reliable. Occasional offsets of direct path signal still occur after cross-correlation, due to ambiguities from comparable peak values in the cross-correlation result. However, in certain embodiments, the following techniques are employed to compensate for such ambiguities.

One such technique is Template Signal Calibration. Due to the hardware (speaker/microphone) imperfections, the received sound signal is usually slightly different from the designed emitting signal. In order to obtain an accurate "template" signal for cross-correlation, the system performs both emitting and recording in a quiet environment, so that the direct path signal can be reliably detected and saved as a calibrated template for future cross-correlation.

Another such technique is Signal Fine-tuning. In addition to the Hanning window, the system manually tunes the signal slightly to generate the key peaks/valleys more prominently, which reduces cross-correlation ambiguity significantly. Only the central portion (for example, 15 samples) of the template signal is used in cross-correlation, further enhancing resilience to residual noises.

Next, the system performs signal segmentation by locating the Major Echo segment portion 219 of the acoustic signal. In certain aspects or embodiments, the system is able to locate the major echo is by identifying the cross-correlation peak location corresponding to a typical phone holding distance (e.g., 25-50 cm) located in the example embodiment, after the direct path 217 location. However, human face echoes can be so weak that echoes from larger obstacles faraway can have comparable amplitudes. This makes the estimation unstable and leads to occasional location "jumping", thus outliers 115 as shown in FIG. 25G may arise in distance measurements. Certain distance anomalies in measurements can occur from the acoustic while the device is moving back and forth from the face. Some outliers 115 in the signal form due to such "jumping" outliers. In order to solve this issue, a vision-aided major echo locating technique comprising two steps, is implemented as described herein below.

In certain embodiments, the method of Vision Measurement Calibration is performed. Using the camera image projection principle, the closer the device 217 to the face 209, the larger the image and larger the distances between any respective facial landmarks 155, and vice versa. Thus, the distance from face 209 to device 217, dv can be formulated as $d_v = \tau \cdot 1/d_p$, where $d_p$ is the distance between two facial landmarks and $\tau$ is an unknown scale factor specific to the user. In certain embodiments, the system selects $d_p$ as the pixel distance between two eye landmarks as they are more widely separated and can be detected reliably. In order to estimate the scale factor $\tau$, the system processor calculates $\tau_i$ for each pair-wise $d'_{v,i}$ from acoustic distance measurement and $d_{p,i}$ in pixels. In order to eliminate errors caused by acoustic distance measurement outliers 115, the system determines the major cluster of $\{\tau_i\}$ using for example, a density-based spatial clustering algorithm as DBSCAN.

DBSCAN is designed to discover arbitrary-shaped clusters in any database D and at the same time can distinguish noise points. More specifically, DBSCAN accepts a radius value Eps(ε) based on a user defined distance measure and a value MinPts for the number of minimal points that should occur within Eps radius. Some concepts and terms to explain the DBSCAN algorithm can be defined as follows:

The problem of clustering can be defined as follows:

A database of n data objects D={o1, o2, . . . , on} is provided. The process of partitioning D into C={$C_1$, $C_2$, . . . , $C_k$} based on a certain similarity measure is called clustering, $C_i$'s are called clusters, wherein $C_i$ is defined by equation (13) provided below:

$$C_i \subseteq D, (i=1,2,\ldots,k), \cap_{i=1}^{k} C_i = \emptyset \text{ and } \cup_{i=1}^{k} C_i = D \quad \text{equation (13)}$$

Clustering algorithms can be categorized into five main definitions as further provided herein below as:

Definition 1 (Neighborhood). It is determined by a distance function (e.g., Manhattan Distance, Euclidean Distance) for two points p and q, denoted by dist(p, q).

Definition 2 (Eps-neighborhood). The Eps-neighborhood of a point p is defined by {q∈D| dist(p, q)≤Eps}.

Definition 3 (Core object). A core object refers to such point that its neighborhood of a given radius (Eps) has to contain at least a minimum number (MinPts) of other points.

Definition 4 (Directly density-reachable). An object p is directly density-reachable from the object q if p is within the Eps-neighborhood of q, and q is a core object.

Definition 5 (Density-reachable). An object p is density-reachable from the object q with respect to Eps and MinPts if there is a chain of objects $p_1, \ldots, p_n$, $p_1=q$ and $p_n=q$ such that $p_{i+1}$ is directly density-reachable from $p_i$ with respect to Eps and MinPts, for 1≤i≤n, $p_i \in D$.

Definition 6 (Density-connected). An object p is density-connected to object q with respect to Eps and MinPts if there is an object o∈D such that both p and q are density-reachable from o with respect to Eps and MinPts.

Definition 7 (Density-based cluster). A cluster C is a non-empty subset of D satisfying the following "maximality" and "connectivity" requirements:

(1) $\forall_{p, q}$: if q∈C and p is density-reachable from q with respect to Eps and MinPts, then p E C.

(2) $\forall_{p, q} \in C$: p is density-connected to q with respect to Eps and MinPts.

Definition 8 (Border object). An object p is a border object if it is not a core object but density-reachable from another core object. The algorithm starts with the first point p in database D, and retrieves all neighbors of point p within Eps distance. If the total number of these neighbors is greater than MinPts—if p is a core object—a new cluster is created. The point p and its neighbors, are assigned into this new cluster. Then, the system iteratively collects the neighbors within Eps distance from the core points. The process is repeated until all of the points have been processed.

In accordance with yet another embodiment, the system implements ST-DBSCAN algorithm for density-based spatial clustering process, which requires four parameters Eps1, Eps2, MinPts, and ΔE because of the extensions to avoid problems of identifying adjacent clusters. Eps1 is the distance parameter for spatial attributes (latitude and longitude). Eps2 is the distance parameter for non-spatial attributes. A distance metric such as Euclidean, Manhattan or Minkowski Distance Metric can be used for Eps1 and Eps2. MinPts is the minimum number of points within Eps1 and Eps2 distance of a point. If a region is dense, then it should contain more points than MinPts value. A simple heuristic is presented which is effective in many cases to determine the parameters Eps and MinPts. The heuristic suggests MinPts≈ln(n) where n is the size of the database and Eps must be picked depending on the value of MinPts. The first step of the heuristic method is to determine the distances to the k-nearest neighbors for each object, where k is equal to MinPts. Then these k-distance values should be sorted in descending order. Then we should determine the threshold point which is the first "valley" of the sorted graph. Eps is selected to be a value less than the distance defined by the first valley. The last parameter ΔE is used to prevent the discovering of combined clusters because of the little differences in non-spatial values of the neighboring locations. The algorithm starts with the first point p in database D and retrieves all points density-reachable from p with respect to Eps1 and Eps2. If p is a core object (see for example, Definition 3 as defined hereinabove), a cluster is formed. If p is a border object (see for example Definition 8 as defined hereinabove, no points are density-reachable from p and the algorithm visits the next point of the database. The process is repeated until all of the points have been processed.

The algorithm begins with the first point in database D(i). After processing this point, it selects the next point in D. If the selected object does not belong to any cluster, Retrieve_Neighbors function is called. A call of Retrieve_Neighbors (object, Eps1, Eps2) returns the objects that have a distance less than Eps1 and Eps2 parameters to the selected object. In other words, Retrieve_Neighbors function retrieves all objects density-reachable (for example, definition 5) from the selected object with respect to Eps1, Eps2, and MinPts. The result set forms the Eps-Neighborhood (see for example definition 2) of the selected object. Retrieve_Neighbours (object, Eps1, Eps2) equals to the intersection of Retrieve_Neighbours(object, Eps1) and Retrieve_Neighbours(object, Eps2).

If the total number of returned points in Eps-Neighborhood is smaller than MinPts input, the object is assigned as noise. This means that the selected point has not enough neighbors to be clustered. The points which have been marked to be noise may be changed later, if they are not directly density-reachable (see for example definition 4) but they are density-reachable (see for example definition 6) from some other point of the database. This occurs for border points of a cluster. If the selected point has enough neighbors within Eps1 and Eps2 distances—if it is a core object—then a new cluster is constructed. Then all directly density-reachable neighbors of this core object are also marked as new cluster label. Then the algorithm iteratively collects density-reachable objects from this core object by using a stack. The stack is necessary to find density-reachable objects from directly density-reachable objects. If the object is not marked as noise or it is not in a cluster, and the difference between the average value of the cluster and the new coming value is smaller than AE, it is placed into the current cluster. After processing the selected point, the algorithm selects the next point in D and algorithm continues iteratively until all of the points have been processed.

When the algorithm searches the neighbors of any object by using Retrieve_Neighbors function, it takes into consideration both spatial and temporal neighborhoods. The non-spatial value of an object such as a temperature value is compared with the non-spatial values of spatial neighbors and also with the values of temporal neighbors (previous day in the same year, next day in the same year, and the same day in other years). By this way, non-spatial, spatial and temporal characteristics of data are used in clustering when the algorithm is applied on the table, which contains temporal values, beside spatial and non-spatial values. If two clusters C1 and C2 are very close to each other, a point p may belong to both, C1 and C2. In this case, the point p must be a border point in both C1 and C2. The algorithm assigns point p to the cluster discovered first.

Following the implementation of the density-based spatial clustering algorithm, (for example DBSCAN described hereinabove) the system next leverages linear regression to find the best τ that minimizes the offset between: d'$_v$ and $$\tau \cdot \frac{1}{d_p}.$$

As previously mentioned, any outliers 115 are removed in vision calibrated acoustic distance measurements by implementation one of the above-described density-based spatial clustering algorithms in order to eliminate any errors.

During the signal segmentation portion of acoustic signal pre-processing the system in certain embodiments, begins the process of signal segmentation by performing template signal calibration. This process is generally performed once initially. Due to imperfections in hardware of the device 217 (for example, speaker/microphone(s)), the received sound signal is generally slightly different from the designed emitting signal. In order to achieve an accurate "template" signal for cross-correlation, emitting and recording is performed in a quiet environment, so that the direct path signal 217 in FIG. 25C can be reliably detected and saved as a calibrated template for future cross-correlation.

The process next proceeds to fine-tune the received signal. As in template signal calibration, generally this process occurs initially once during acoustic signal pre-processing, particularly during signal segmentation. The system may apply Hanning window to the received signal, or perform "hanning of the signal" by applying the Hann window to it.

The Hann function is typically used as a window function in digital signal processing and used to select a subset of a series of samples in order to perform a Fourier transform or other type of calculations. The Hann window is a linear combination of modulated rectangular windows defined generally by $w_r = 1_{[0, N-1]}$. The advantage of the Hann window is very low aliasing, and the tradeoff slightly is a decreased resolution (widening of the main lobe).

Alternatively, the system may implement manual tuning of the signal slightly to make the key peaks/valleys more prominent, which reduces cross-correlation ambiguity significantly. Generally, only the central portion (for example, 15 samples) of the template signal is used in cross-correlation, further enhancing resilience to residual noises.

In certain embodiments or aspects, the process of signal segmentation, implements generally, two major steps (among other calibration and fine tuning steps, for examples) in order to extract the face region segment, specifically 1) locating the direct path segment 217 in raw recordings; and then locating the major echo 219 in order to identify the face region segment 218.

In such embodiment, in order to find the major echo 219 in a continuous recorded echo signal(s) 204, the system has to identify and use a "reference location" in the received echo signal 204. The direct path signal 217 is detected and used as the "reference location". The direct path signal 217 generally refers to the acoustic signal 4 that travels from speaker (for example 211, 214) to the microphone 210 directly, which is considered the initial first "copy" of the echo signal recorded after an emission. After the direct path signal 217 is identified, its respective location refers to the time delay between direct path signal 217 and the major echo 219 along the x axis, which is a time element variable (referring to FIG. 25C).

More particularly, the system next identifies the location of the major echo 219 on the time axis (as shown in FIG. 25C). The system next determines the time delay between direct path signal 217 and the major echo 219. Given the time delay, the system can estimate the sound traveling distance, which is the time x speed of sound divided by 2 (as sound travels back and forth).

In particular, when the system is determining the location of the Direct Path signal 217, a simple assumption that can be made, is that a constant gap exists between the emitting and recording signals, thus the direct path signal 217 can be generally located after that constant gap. However, both emitting and recording must go through multiple layers of hardware and software processing in the operating systems of a device 217, many of which exhibit unpredictable, varying delays. Thus locating the direct path 217 using a constant delay alone may prove to be unreliable.

Instead, since the direct path signal 217 usually is the signal that exhibits the highest amplitude, hence, using cross-correlation to locate the direct path signal 217, is more reliable. As described hereinabove, occasional offsets of the direct path signal 217 still happen after cross-correlation, due to ambiguities from comparable peak values in the cross-correlation result. Therefore, in order to enhance the stability of the direct path signal 217 after cross-correlation, the system implements the following steps: 1) template signal calibration; and 2) signal fine tuning, as described hereinabove. Generally since the received sound signal is usually slightly different from the designed emitting signal, in order to obtain an accurate "template" signal for cross-correlation, the system initially performs emitting and recording in a quiet environment (or other method to block out environmental noise or perform noise removal functions while emitting and recording the acoustic signals), so that the direct path signal 217 can be more reliably detected and saved as a calibrated template for future cross-correlation.

Hence, the system next uses template signal calibration and signal-fine tuning techniques in order to cross-correlate the signal after noise removal and find peak(s) of the correlated signal so the system can more easily and accurately detect the direct path signal 217 in. So, as an example, the first copy of the recorded signal after an emission from the microphone to the facial area 209 of the user 203 is identified as a direct path signal 217, as shown in FIG. 25C.

It is noted that the system performs vision measurement calibration 6, by detecting facial landmarks 155 of the user 203, for example, two eye locations or corners of the mouth of the user 203. In the example embodiment, such vision measurement calibration is used for the respective estimation of various facial geometries of the face 209 of user 203, in particular specific facial geometry of the user's 203 facial features and respective contours 210 of such facial features. The closer or further the user's face 209 is from the camera, the system is able to estimate the distance of the user from the phone and determine which segment of sound or acoustic signal is emitted from the face 209 (rather than emitted from another object). Hence, a linear relationship is implemented to determine the scale value between pixel distances and real distances of the face 209 to the device 217, as described further herein below. This estimate can provide an estimation of the echo signal location, which helps in reducing outliers when cross-correlation is implemented.

Other contemplated geometries can be detected, for example, using the geometry of the hand of the user 203 may be another contemplated implementation instead of the user's 203 face 209.

As described in the foregoing, the step of vision measurement calibration in the example embodiment, applies the camera image projection principle. The closer the device 217 is to the face 209 of the user 203, the larger the image and larger the distances between facial landmarks 155, and vice versa. Thus, the distance from face to device $d_v$ is formulated as:

$$d_v = \tau \cdot \frac{1}{d_p},$$

where $d_p$ is the distance between two facial landmarks and $\tau$ is an unknown scale factor specific to the user.

The system selects $d_p$ as the pixel distance between two landmarks, for example, two eye landmarks 155 as they are generally more widely separated and can be detected reliably. The system may detect the medial relationship and also use distance of the face 209 to camera 203 between the two landmark eye points, landmarks 155. In order to estimate the scale factor $\tau$, the system calculates $\tau_i$ for each pair-wise $d'_{v,i}$ from the acoustic distance measurement and $d_{p,i}$ in pixels. In order to eliminate errors caused by acoustic distance measurement outliers as previously described, the system first locates and identifies the major cluster of $\{\tau_i\}$ using a density-based spatial clustering algorithm, for example, DBSCAN, as described hereinabove. The system next leverages linear regression to find the best $\tau$ that minimizes the offset between $d'_v$ and $$\tau \cdot \frac{1}{d_p}.$$

Outliers 115 or "jumping signals" are removed in the signals associated with vision calibrated acoustic distance measurements as shown in FIG. 25G.

Next the system performs the step of locating the major echo using cross-correlation and vision measurement. In locating the major echo 187, the system determines the major echo 219 emanating from the face 209 by extracting the most information regarding the 3D geometry of the face and its respective landmarks 155. In the example embodiment, a straightforward way for locating the major echo 219 among all face region echoes 218, is to identify the cross-correlation peak location corresponding to typical phone holding distance (e.g., 25-50 cm) after the location of the direct path signal 217. However, human face echoes can be so weak that echoes from larger obstacles located further away can have comparable amplitudes. This can render the estimation unstable and may lead to occasional location "jumping", thus outliers 118 can arise in such distance measurements. The dotted line in FIG. 25G shows the distance measurements from acoustic signals while the device is moving back and forth from the face. As described hereinabove, some outliers 115 due to such "jumping" outliers are shown in FIG. 25G. Hence, a vision-aided major echo locating technique may be implemented in order to reduce such outliers 115.

A vision-aided major echo locating technique can be used for estimation of 3D geometry of a user's face 209. However, vision based distance measurement while generally stable, cannot capture the error caused by rotations of smartphone or user's face 209. Thus, the vision calibrated distance measurement is used to narrow down the major echo searching range and reduce outliers 115 that are detected from the major echo signal 219. In the example embodiment, the system implements cross-correlation to find the exact major peak location within the relevant range of detected acoustic signals. Note that if the user's face 209 rotates to extreme angles, facial landmark 155 detection may not work properly.

In particular, during face region echoes detection, it is noted that the human face has a 3D surface and therefore a certain depth with respect to its various features, for example, eyes, nose, cheekbones, mouth, etc. The tip of the nose is generally the closest to the device 217, while the ears are generally the farthest, for a user 203 with an average human face 209. It is noted that an average human face generally has seven (7) depths from which the acoustic signals echo, for example, the nose, face, cheeks, forehead, eyes, chin, mouth. The nose is considered closest to the camera 103, while the face is furthest from the camera. The cheeks are generally considered about mid-way distance. Hence, the face is considered a 3D object with generally seven (7) depths. It is noted that these seven (7) depths and how the acoustic signals echo from each of the facial contours are all processed by the system to generate a unique echo-signature associated with an individual user 203 that has registered with the system via the user profile registration process.

In theory, when detecting the major echo signal 219, the system assumes the face 209 is a flat surface. Hence, in order to cover the depth of the face, and detect all acoustic signals associated with the landmarks 155 (for training the CNN or SVM model dataset, and later implement respective acoustic and/or visual feature extraction for later user authentication), the system extends the major face signal to, for example, its two endpoints (for example, the line delineated by the two ears of a user 203). The system can extend 10 sample points before and after the major echo segment 219 in order to determine the echoes for the entire face region 218, thus allowing a depth range of approximately ~7 cm.

Hence during the detection and identification of face region echoes 218 (which is used in generating the echo-signature associated with the user 203), since the depth of human face is limited, the system in the example embodiment, extends some time sample points, for example 10 sample points (as shown located on the time x-axis of FIG. 25C), both before and after the major echo segment 219, in order to cover the entire face region (for example, allowing a depth range of ~7 cm).

More particularly, the acoustic signal is generally sampled at 48 KHz, which means 48,000 sampling points for each second. As shown in FIG. 4, the major echo 219 and face region echoes 218 comprise time sampling points (along the x-axis). The major echo 219 is a portion of and part of the larger face region echoes segment 218. The ten sampling points correspond to the difference between major echo and face region echoes. There are 10 sampling points before the major echo 219, and another 10 sampling points extended after the major echo 219, in the disclosed embodiment. These face region echoes 218 associated with their respective x-axis time sampling points, can be later used as input(s) for any implemented machine models (for example, CNN) used during user authentication.

The system next determines the face region echoes 218 (as shown in FIG. 25C) which acoustic signals are associated with generating a unique echo-signature print or representation or pattern associated with identifying and authenticating a particular user 203 (analogous to a fingerprint of the particular user 203). The system first located the direct path signal 217 by identifying maximum peak amplitude. Next the system identifies the location of the major echo segment 219 by using cross-correlation and vision measurements. Next, the system can now determine the face region echoes by essentially extending the major echo 219 sampling points as described hereinabove. The direct path signal 217 needs to be identified generally first, so that the system can determine and identify the major echo 219, which generally follows the direct path signal 217 as shown, along the x-axis of FIG. 25C.

The segmented face region echoes 218 are associated with time series data comprising numerous sampling points per second, as shown on the x-axis of FIG. 25C. Because the face region echoes comprise a combination of individual echoes with different amplitudes and phases, isolating such individual echoes in the time domain can be onerous due to noise. The echoes from the face reflect the unique ridges and sub-ridges from a unique face 209. The echoes from the face is a compilation associated with many small surface areas and their respective geometries. The face region echoes segment is a quantified reconstructed value of complex and continuous acoustic signals as emitted from unique surface geometries of the user's face 209.

In the disclosed embodiment, the system measures the arrival time of each echo by a technique Frequency-Modulated Continuous Wave (FMCW) technique used in radars.

In traditional FMCW, the speaker transmits continuous chirp signals with linear increasing frequency, from $f_{min}$ to $f_{max}$. In order to estimate the distance from an object, FMCW compares the frequency of the echo signal to that of a reference signal using a technique called signal mixing, to find the frequency shift $\Delta f$, which is proportional to the distance. Thus finding $\Delta f$ provides the distance (i.e., $\Delta f$ multiplying a constant coefficient).

In order to capture minute surface geometries on the face 209, the FMCW distance measurement resolution is critical. The resolution in $\Delta f$ is equal to the size of one bin in the fast Fourier transform (FFT), which depends on the bandwidth used. The fast Fourier transform (FFT) is an example algorithm implemented by the embodiment, which samples a signal over a period of time (or space) and divides the signal into its frequency components.

Hence, the system implements a wide frequency for example, of 16-22 KHz, though it may be lightly audible to some users. As shown in FIG. 6, the FFT is taken over a duration of the face region with length T, and hence the size of one FFT bin is 1/T. Given a minimum measurable frequency shift $\Delta f_{min}=1/T$, the minimum measurable distance resolution can be computed using the slope of signals (shown in FIG. 25H), which is the total swept bandwidth B divided by the sweep time T. Thus the distance resolution is defined by equation (14):

$$d_r = C\frac{TOF_{min}}{2} = C\frac{\Delta f_{min}}{2 \times \text{slope}} = \frac{C}{2B} \tag{14}$$

wherein C is the speed of sound. Assuming C=343 m/s at 20. Celsius, thus $d_r$ is $$\frac{343 \text{ m/s}}{2 \times 6000 \text{ s}^{-1}} = 2.88 \text{ cm}.$$

Note that this is the resolution at which FMCW can separate mixed echoes. The resolution of the major echo location corresponds to one single acoustic sample, which is $$\frac{C}{2Fs} = 3.7 \text{ mm},$$

where $F_s$=48 KHz is the recording sampling frequency.

The short-time Fourier transform (STFT), is a Fourier-related transform used in the example embodiment, to determine the sinusoidal frequency and phase content of local sections of the signal as it changes over time. In practice, the procedure for computing STFTs is to divide a longer time signal into shorter segments of equal length and then compute the Fourier transform separately on each shorter segment. This reveals the Fourier spectrum on each shorter segment. One then usually plots the changing spectra as a function of time. Hence, a spectrogram is represented as an image or visual representation of the spectrum of the frequencies of the acoustic face region echoes signal as it varies over time. Spectrograms are sometimes referred to as sonographs, voiceprints, or voice-grams. When the data is represented in a 3D plot, they may also be referred to as waterfall representations.

The spectrogram of the segmented face region echoes is thus generated using STFT, after performing FMCW signal mixing. The spectrogram is then used as input for CNN training during authentication, as described hereinabove. Essentially the spectrogram of the segmented face region echoes signal is a conversion of time-series data to a spectrogram. The 2D values, including frequency and temporal data associated with respective amplitude values, are generated as an image representation. The spectrogram image of the segmented face region echoes is next transmitted to a CNN classifier to extract features associated with the acoustic face region and in particular, surface geometries are captured by the segmented face region echoes, during such segmented signal analysis. The CNN is classified in particular to train a model.

A vision-aided major echo locating technique can be used for estimation of 3D geometry of a user's face 209. However, vision based distance measurement while generally stable, it cannot capture the error caused by rotations of smartphone or user's face 209. Thus, the vision calibrated distance measurement is used to narrow down the major echo searching range and reduce outliers 115 that are detected from the major echo signal 219. In the example embodiment, the system implements cross-correlation to find the exact major peak location within the relevant range of detected acoustic signals. Note that if the user's face 209 rotates to extreme angles, facial landmark 155 detection may not work properly.

In particular, during face region echoes detection, it is noted that the human face has a 3D surface and therefore a certain depth with respect to its various features, for example, eyes, nose, cheekbones, mouth, etc. The tip of the nose is generally the closest to the device 217, while the ears are generally the farthest, for a user 203 with an average human face 209. In theory, when detecting the major echo signal 219, the system assumes the face is a flat surface. Hence, in order to cover the depth of the face, the system extends the major face signal to cover its two ends (for example, line delineated by the two ears of a user 203). The system can extend 10 sample points before and after the major echo segment 219 in order to determine the echoes for the entire face region 218, thus allowing a depth range of approximately ~7 cm for processing such images. Hence, during the detection and identification of face region echoes segment 218, since the depth of human face is limited, the system in the example embodiment, extends some time sample points, for example 10 sample points (as shown located on the time x-axis of FIG. 25C), both before and after the major echo segment 219, in order to cover the entire face region (including the face's seven (7) depths for example, nose, face, cheeks, forehead, mouth, eyes, ears) (for example, allowing a depth range of ~7 cm).

As described hereinabove, the face regions echoes 218 are then used in generating a unique echo-signature print, representation or pattern associated with identifying and authenticating a particular user 203 (analogous to a fingerprint of the particular user 203).

Once the system has determined the face region echo 218 (and hence, the unique echo-signature print, representation or pattern associated with identifying and authenticating a particular user 203 using example signal segmentation process, the system next adjusts the amplitude of the face region echo segment 218 by application of the sound propagation law in step 205. Next, the system essentially zooms the view (referring to FIG. 25C) of the echo signals, so that face region echoes 218 can be deciphered and identified relative to the x-axis.

The direct path segment 217 is the emitting signal traveling from speaker to the microphone directly, which ideally should be a copy of the emitting signal and has the highest amplitude. The major echo 219 corresponds to the mix of echoes from the major surfaces (for example, cheeks and forehead) of the face. Other surfaces of the face (for example, nose and chin) at different distances to the phone 217 also produce echoes, arriving earlier/later than the major echo. The face region echoes 218 include all these echoes, capturing the full information of the face. Hence, accurate segmenting of the face region echoes during signal segmentation is important to minimize the disturbances from dynamic clutters around the phone 217, and reduce the data dimension for model training and performance.

In an embodiment during signal segmentation, generally there are two steps implemented in extracting the face region segment: locating the direct path segment in raw recordings, then locating the major echo 219 and face region segment 218 which is generally located on a time-sampling axis (referring to FIG. 25C) after the direct path segment 217.

Accordingly, following the sound propagation inverse-square law, the face region signal segment 218 is shifted by the same distances, with the amplitude adjusted by the scale equal to the inverse of the square of distance. Due to the omni-directional property of smartphone speaker 211, 214 and microphone 210, 212, a slight device 217 rotation at a fixed position, causes negligible changes in the echoes acoustic signal, thus only device position changes account for any acoustic signal transform. The sound propagation law assumes equi-distances, and thus generates data assuming that any different distances from the direct path signal is determined by adjusting amplitudes of the signal.

Next, the system shifts the adjusted face region echo 218 along time axis in order to meet any distance changes associated any of the synthesized images that assume different viewing angles and distances of the camera 213 to the user 203 face 209. It is noted that because face 209 may be situated further from the device 217, the echoes that reflect from the user face 209 are generally weaker and delayed. If you shift the user to the right or to the left, the amplitude may be higher if the echoes are stronger signals (depending on which direction would render the user closer to the phone). If the echoes are weakening, the echoes reflected from the user face 209 are generally more delayed and weaker—such echo signals are received with a greater delay relative to stronger echo signals. If the echoes are stronger as the user 203 is closer to the device 217, the echo signals are received sooner and are stronger. The respective amplitudes of such echo signals are higher and the echoes would be stronger.

Finally, the system synthesizes the acoustics data and outputs for system input of a unique echo-signature print, representation or pattern associated with identifying and authenticating a particular user 203 (analogous to a fingerprint of the particular user 203). Such unique echo-signature print is input into a pre-trained CNN model and/or SVM model used in SVM prediction and/or two-factor authentication.

The joint acoustic and visual features representation which is associated with a unique echo-signature print, representation or pattern associated with identifying and authenticating a particular user 203 (analogous to a fingerprint of the particular user 203), is used for two-factor authentication. It is noted that for classification in certain embodiments, a one-class SVM is an unsupervised algorithm that learns a decision function for novelty detection by classifying new data as similar or different to the training set. SVM detects the soft boundary of the training set so as to classify new samples as belonging to that set or not. In certain embodiments, one-class SVM is implemented with radial basis function (RBF) kernel function for final classification. This implementation allows the system to train an SVM classifying model for a new user (or the same user wearing new hats or glasses) on mobile devices easily, without requiring large amounts of training data as in CNN. This trained classifying model which is based on such data augmentation process is used in generating a unique echo-signature print, representation or pattern associated with identifying and authenticating a particular user 203 (analogous to a fingerprint of the particular user 203).

During the data augmentation process, the system accounts for synthesized images of a user 203 moving the device at various relative positions to the face so as to collect sufficient training data during user registration (rather than have the user manually input different poses during user registration). In practice, this imposes more efforts on the user, and it is hard to tell when sufficient data has been collected. Insufficient training data will cause higher false negatives (for example, more instances of denial of the legitimate user 203). Thus, the system implements the data augmentation technique, which populates the training data by generating "synthesized" training samples based on facial landmark transformation and acoustic signal prediction (as described in greater particularity hereinabove). During this process, the system transforms measured facial landmarks and acoustic signals into synthesized ones which are output, by assuming different poses relative to the device 217 during the augmentation process. Such synthesized facial landmarks and acoustic signals are used in generating a unique echo-signature print, representation or pattern associated with identifying and authenticating a particular user 203 (analogous to a fingerprint of the particular user 203).

During an exemplary method of facial alignment implemented during user authentication, also shown in FIGS. 25D and 25E, in accordance with an embodiment of the disclosed system and method. Beginning with the first step, the user 203 moves the device 217 or his/her face during the facial alignment process. The system next performs tracking of the face by tracking boundary lines (described herein below are bounding rectangles as shown in FIGS. 25D and 25E. The system next detects whether the rectangle is within a valid zone (see for example FIG. 25E, rectangles 170, face valid areas). The bounding rectangle 171 defines a detected face area as shown in FIG. 25E. If the system detects that the rectangle is indeed within a valid zone in step 242, the system determines that the face is indeed aligned in step 243. Such face alignment process can be used for authentication as shown in FIG. 25E, for example.

More particularly, some example implementations of the facial alignment process, includes an example two-factor one-pass authentication process, in which the system implements a mode in which the user 203 must hold the phone properly to align his face within the valid area rectangle 151, 153, as shown on the screen 105 (referring to for example, further description herein below in connection with FIGS. 25D and 25E). As described hereinabove, both visual facial landmarks from camera images (including landmark coordinates) and acoustic features extracted by the trained CNN are fed to the SVM for recognition.

More particularly, in accordance with another embodiment, during facial landmark detection, the disclosed acoustic-based facial echo-signature system, extracts lightweight visual features of the face in order to complement the extracted acoustic features and process both features during authentication. The visual techniques serve two purposes: 1) detecting facial landmarks which are later used as basic visual features; and 2) tracking the user's face 219 on the smartphone screen device 217 so that the user 203 can hold the device within some "valid" zone relative to the distance as illustrated for example by rectangles 151, 153 shown in FIG. 25D. The valid zone 151, 153 comprises distance and/or orientation relative to the user face 209 and smart device 217 for respective data collection and processing in user profile registration and then user authentication.

Yet another example implementation of facial alignment process is shown in FIGS. 25D and 25E, (including side-by-side poses in following drawing sheets) is an image snapshot 150 including a middle (red) rectangle denoted as solid rectangle 152 that denotes the detected facial area 209 of the device user 203, and two (green) rectangles denoted as dotted line rectangles 153, 151 are considered the inner bounds 158 and outer bounds 157 of face valid areas 153, 151, which are fixed. In an example embodiment, the user face 209 is aligned within the two (green) dotted line rectangles 153, 151, during data collection and processing. Otherwise, if the face 209 fails to align within the boundaries of the two (green) dotted line rectangles 153, 151, the acoustic data are discarded and the process begins again. The landmark dots 155 as shown in FIG. 25D, and the lighter (white) dots 155 as shown in FIG. 25E, are the system detected facial landmarks, that are saved as pixel coordinates, for example, generally in 2D (x, y) pixel coordinate pairs or alternatively 3D (x, y, z) coordinates.

In order to implement Facial Landmark Detection, the system may use for example, Google® mobile vision API for real-time facial landmark detection and face tracking. The frame rate is set at 30 fps with a resolution of 1024×768. The bounding middle (red) darker shaded rectangle 171 (as shown in example FIG. 25E) defines the detected face area 209 of the user 203 within the boundary lines of user interface 177. The two (green) lighter shaded rectangles 170 define the inner and outer bounds of face valid areas 170, which are fixed in the shown example embodiment. The user face 209 is aligned within the two (green) dotted rectangles 170 shown in FIG. 25E during user registration and/or user authentication and related data collection; otherwise, the acoustics data is discarded, as the system requires the user face 209 be aligned, in order to perform authentication accurately. In this two-factor authentication mode, the user 203 must hold the phone 217 properly to align his face within the valid area rectangle 170 as shown on the screen 177 of FIG. 25E. The lighter circled dots (white dots) 155 shown in FIG. 25E are the detected facial landmarks 155, that are identified and saved by the system processor as pixel coordinates.

Another described example is during two-factor one-pass authentication power mode, in which the user 203 must hold the phone 217 properly to align his face within the valid area rectangles 170 shown as dotted rectangles on the user interface screen 177 of FIG. 25E. Both visual facial landmarks from camera images and acoustic features extracted by the trained CNN are transmitted to the SVM for facial and/or user recognition. This mode may require more computation, energy costs, but providing the highest security level suitable for scenarios such as phone unlock, account log in, other security-based features, etc. During such example mode, both acoustic and visual features are used. The extracted facial and acoustic features are compared against pre-trained CNN features that occurs during two-factor authentication during real-time prediction using the SVM model 130.

The echo-signature acoustics based system, which leverages acoustics and vision on commodity smartphones for two-factor authentication combats the requirement for manual phone pose changes. It is able to extract reliable acoustic features that best distinguishes different users, with a convolutional neural network being trained on a large acoustic data set. The CNN is then used as general acoustic feature extractor to feed an SVM based classifier for authentication. Experiments show that the echo-signature system achieves 93.75% balanced accuracy and 93.50% F-score, while the average precision is 98.05%. Such authentication system may be used with the smart laser pointer system to implement an added security layer to use of the user device while using the object mapping, navigational and/or smart laser pointer systems, as disclosed herein, in order to expediently determine the location of one or more objects of interest using a smart laser pointer and related anchor node system.

Figure 26:
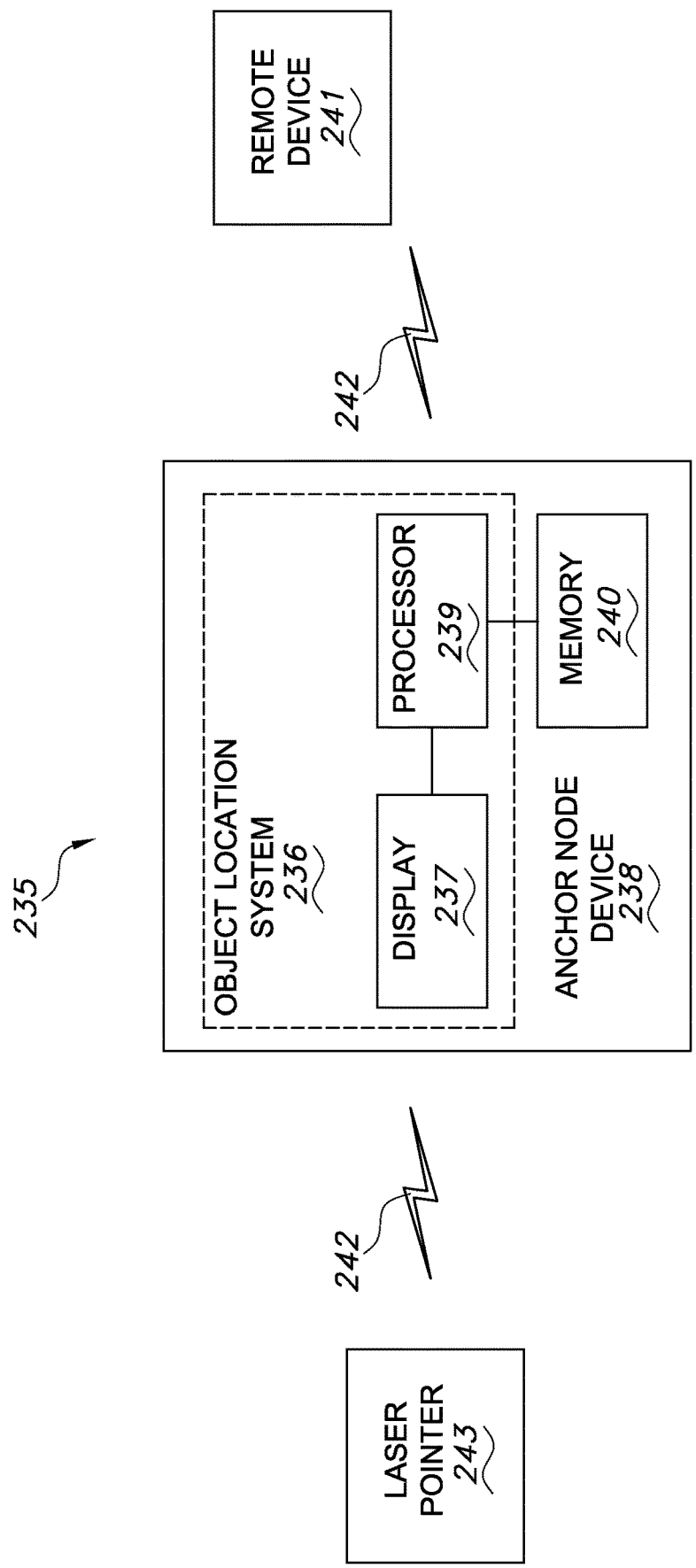
FIG. 26 illustrates a system block diagram including an example computer network infrastructure in accordance with an embodiment of the virtual mapping smart laser pointer system.

FIG. 26 is a simplified block diagram illustrating an example computer network infrastructure, according to an exemplary embodiment. In system 235, an anchor node device 238 communicates using a communication link 242 (e.g., a wired or wireless connection) to a remote device 241. The device 238 may be any type of device that can receive data and function to process information corresponding to or associated with the rotational data. The anchor node device 238 may comprise a microcontroller or processor, connected to at least two laser points and/or motor servers that can effect data commands to rotate the laser pointer and further effect signals to rotate a remotely located laser pointer 243 via a communication link 242 (e.g., a wired or wireless connection). For example, the device 238 may be a smart device or mobile computing device and include additional components such as laser pointer, motor servers and/or laser pointer devices.

Thus, the device 238 may include an object location system 236, including one or more of object mapping, navigation and/or a smart laser pointer system(s) comprising a processor 239 and/or a display 237. The display 237 may be, for example, an optical see-through display, an optical see-around display, or a video see-through display or other standard display. The processor 239 may receive data from the remote device 241, and configure the data for display on the display 237 or otherwise, on a display included with the remote device 241. The processor 239 may be any type of processor, such as a micro-processor or a digital signal processor, for example.

The device 238 may further include on-board data storage, such as memory 240 coupled to the processor 239. The memory 240 may store software that can be accessed and executed by the processor 239, for example.

The remote device 241 may be any type of computing system or transmitter including a laptop computer, a mobile telephone, or tablet computing system, etc., that is configured to transmit data to the device 238. The remote device 241 and the anchor node device 238 may contain hardware to enable the communication link(s) 242, such as processors, transmitters, receivers, antennas, etc.

In FIG. 26, the communication link 242 is illustrated as a wireless connection; however, wired connections may also be used. For example, the communication link 242 may be a wired serial bus such as a universal serial bus or a parallel bus, among other connections. The communication link 242 may also be a wireless connection using, e.g., Bluetooth®, radio technology, communication protocols described in IEEE 802.11 (including any IEEE 802.11 revisions), Cellular technology (such as GSM, CDMA, UMTS, EV-DO, WiMAX, or LTE), and/or Zigbee, Wi-Fi, Bluetooth or Ethernet, among other possibilities. Either of such a wired and/or wireless connection may be a proprietary connection or based on other evolving technology as well. The remote device 241 may be accessible via the Internet and may include a computing cluster associated with a particular web service (e.g., social-networking, photo sharing, address book, etc.).

Figure 27:
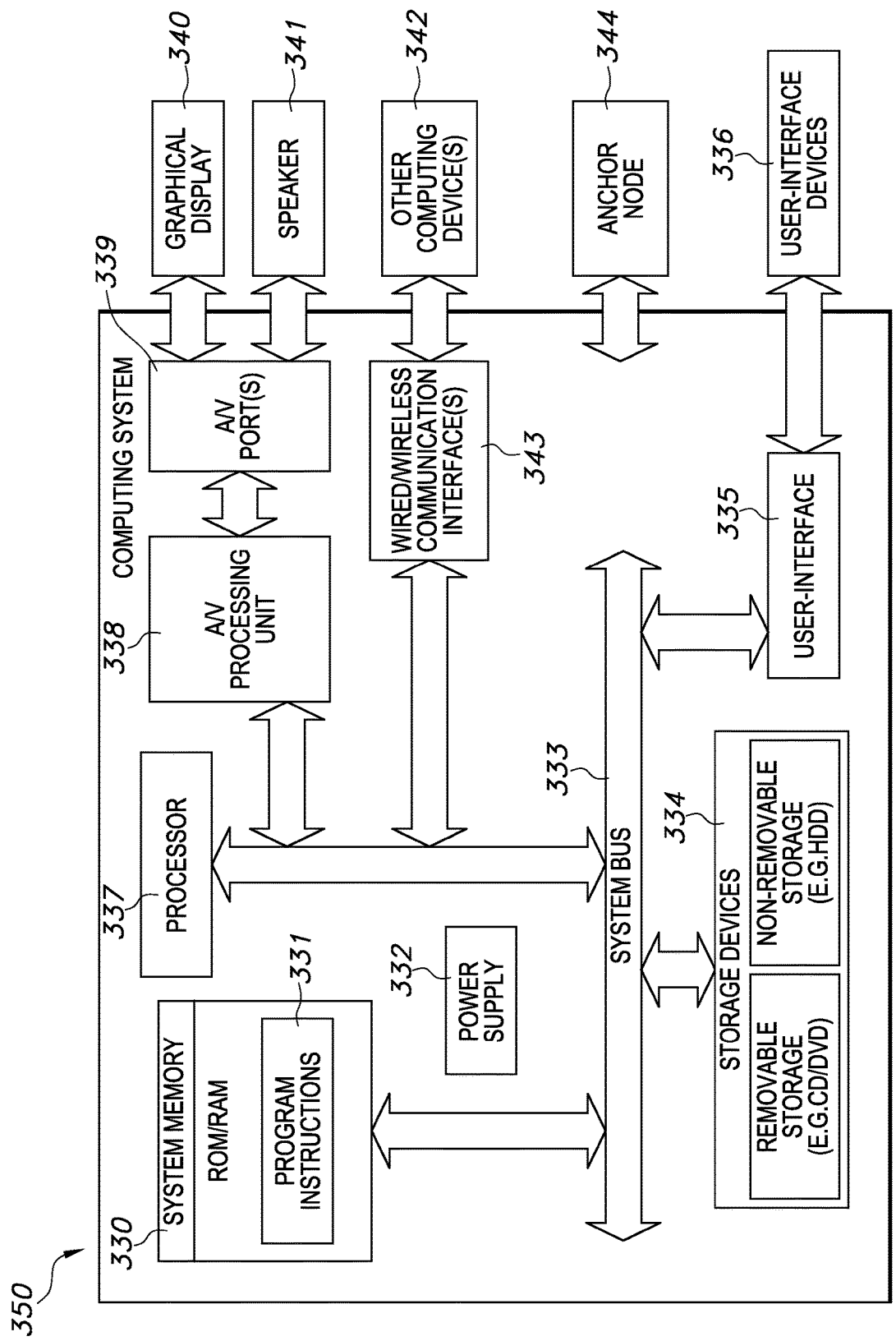
FIG. 27 illustrates a system block diagram in accordance with an embodiment of the virtual mapping smart laser pointer system, including an example computing system.

FIG. 27 is a simplified block diagram illustrating example components of an example computing system, according to an exemplary embodiment. One or both of the device 238 and the remote device 241 of FIG. 26, may take the form of computing system 350 shown in FIG. 27.

Computing system 350 may include at least one processor 337 and system memory 330. In an example embodiment, computing system 350 may include a system bus 333 that communicatively connects processor 337 and system memory 330, as well as other components of computing system 350. Depending on the desired configuration, processor 337 can be any type of processor including, but not limited to, a microprocessor (µR), a microcontroller (µC), a digital signal processor (DSP), or any combination thereof. Furthermore, system memory 330 can be of any type of memory now known or later developed including but not limited to volatile memory (such as RAM), non-volatile memory (such as ROM, flash memory, etc.) or any combination thereof.

An example computing system 350 may include various other components as well. For example, computing system 350 includes an A/V processing unit 338 for controlling graphical display 340 and speaker 341 (via A/V port 339), one or more communication interfaces 343 for connecting to other computing systems 342, and a power supply 332. Graphical display 340 may be arranged to provide a visual depiction of various input regions provided by user-interface module 335. For example, user-interface module 335 may be configured to provide a user-interface and graphical display 340 may be configured to provide a visual depiction of the user-interface. Further included is one or more anchor node devices 344 that each comprises one or more of laser pointer device, servo-motor controllers and microcontroller(s) to process command signals to and from the anchor node 344 whether via voice command or other command signal transmitted thereto.

Figure 28:
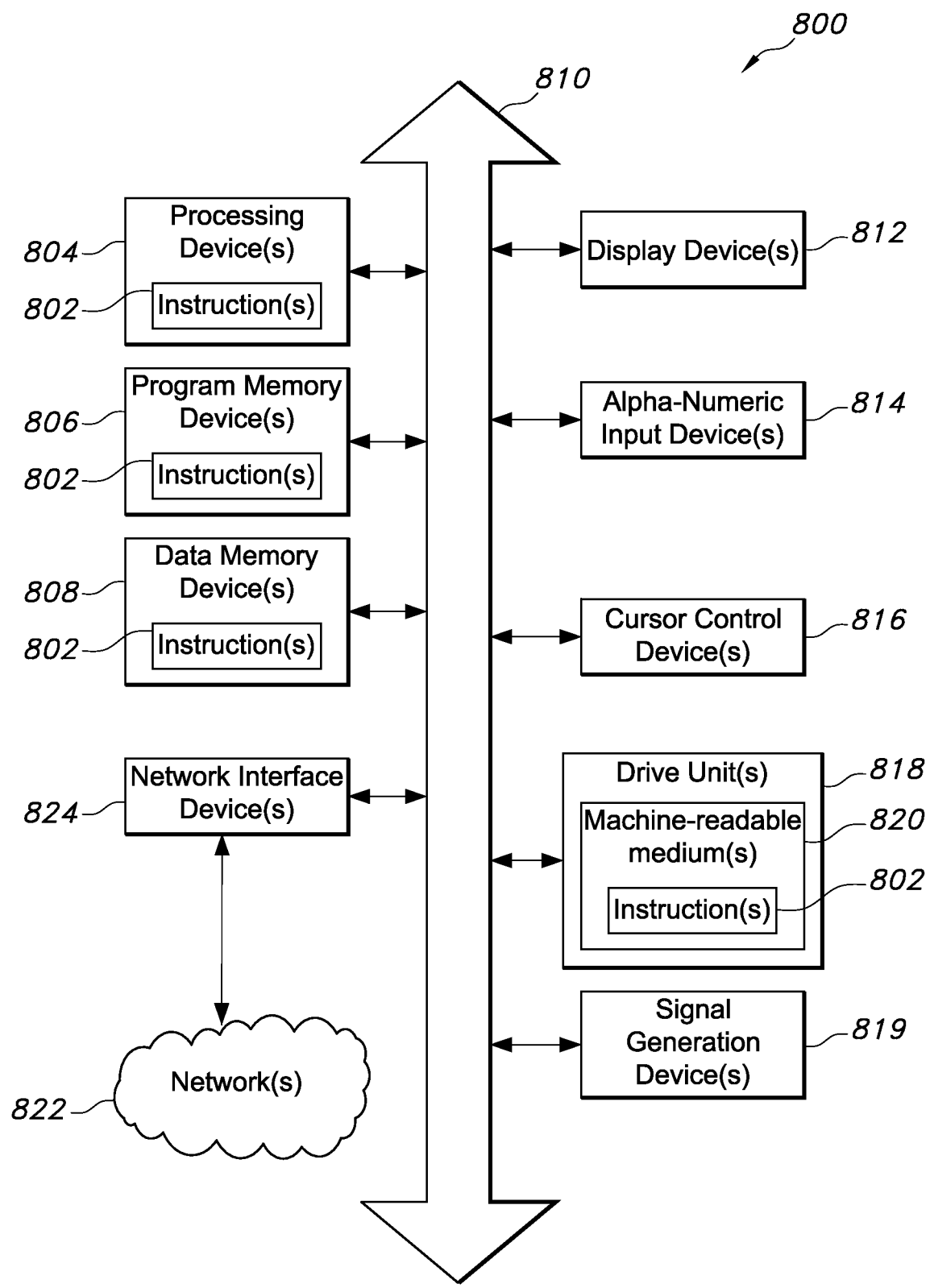
FIG. 28 illustrates a system block diagram in accordance with an embodiment of the virtual mapping smart laser pointer system, including an example computing system.

FIG. 28 is a block diagram of an embodiment of a machine in the form of a computing system 800, within which a set of instructions 802 is stored, that when executed, causes the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 800 may include a processing device(s) 804 (such as a central processing unit (CPU), a graphics processing unit (GPU), or both), program memory device(s) 806, and data memory device(s) 808, which communicate with each other via a bus 810. The computing system 800 may further include display device(s) 812 (e.g., liquid crystals display (LCD), a flat panel, a solid state display, or a cathode ray tube (CRT)). The computing system 800 may include input device(s) 814 (e.g., a keyboard), cursor control device(s) 816 (e.g., a mouse), disk drive unit(s) 818, signal generation device(s) 819 (e.g., a speaker or remote control), and network interface device(s) 824.

The disk drive unit(s) 818 may include machine-readable medium(s) 820, on which is stored one or more sets of instructions 802 (e.g., software) embodying any one or more of the methodologies or functions disclosed herein, including those methods illustrated herein. The instructions 802 may also reside, completely or at least partially, within the program memory device(s) 806, the data memory device(s) 808, and/or within the processing device(s) 804 during execution thereof by the computing system 800. The program memory device(s) 806 and the processing device(s) 804 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium 820 containing instructions 802, or that which receives and executes instructions 802 from a propagated signal so that a device connected to a network environment 822 can send or receive voice, video or data, and to communicate over the network 822 using the instructions 802. The instructions 802 may further be transmitted or received over a network 822 via the network interface device(s) 824. The machine-readable medium may also contain a data structure for storing data useful in providing a functional relationship between the data and a machine or computer in an illustrative embodiment of the disclosed systems and methods.

While the machine-readable medium 820 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include any one or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The above-described methods for the disclosed smart laser pointer system and authentication method may be implemented on a computer, using well-known computer processors, memory units, storage devices, computer software, and other components.

Figure 29:
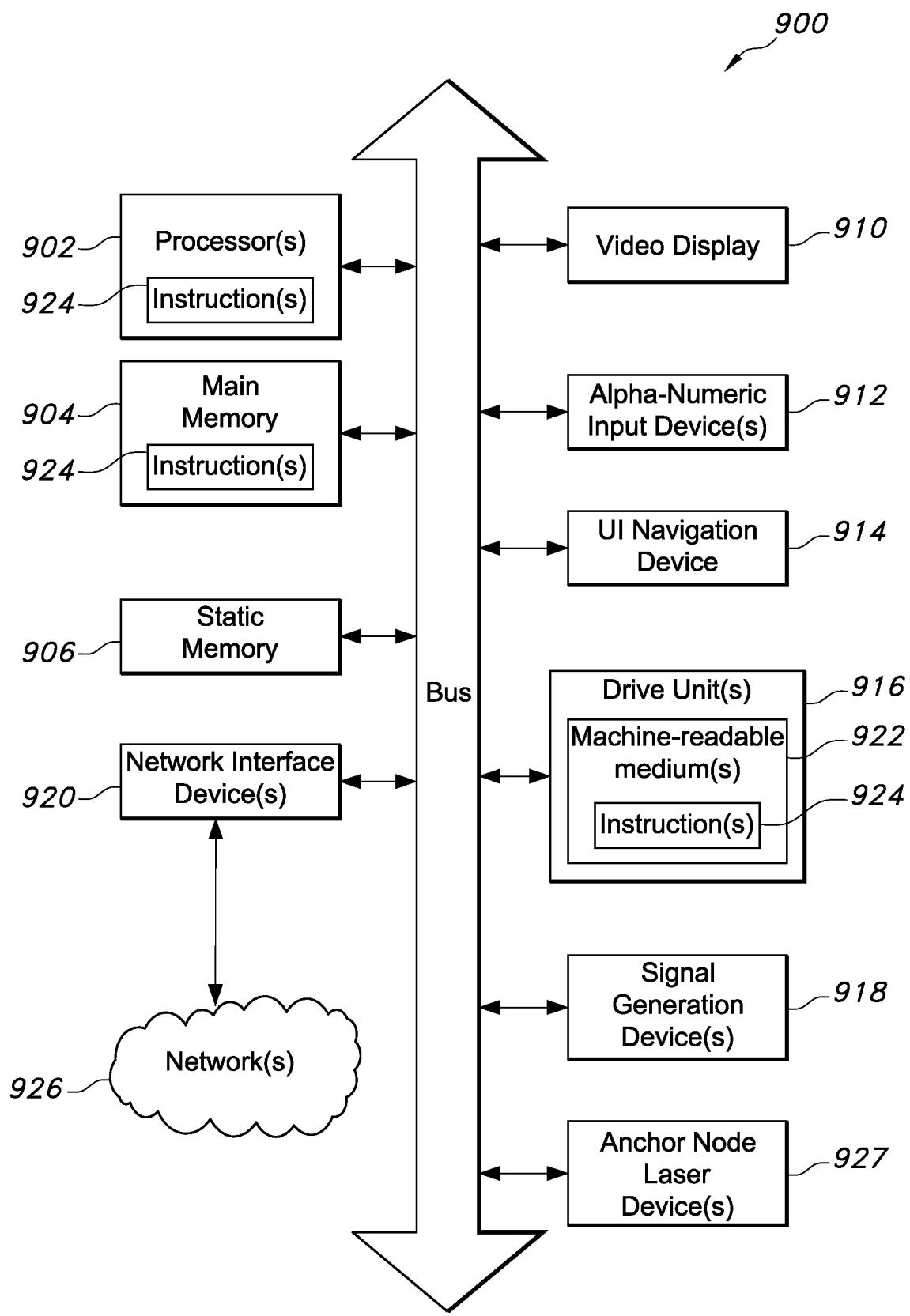
FIG. 29 is a block diagram showing a portion of an exemplary machine in the form of a computing system that performs methods according to one or more embodiments.

FIG. 29 is a block diagram illustrating an example machine upon which any one or more of the techniques (e.g., methodologies) discussed herein may be performed, according to an example embodiment. Specifically, FIG. 29 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), an anchor node laser device 927 (eg. laser pointer(s), servo motors and/or microcontroller or microprocessor), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902, also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media.

Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G. and 4G LTE/LTE-A or WiMAX networks). Other communications mediums include, IEEE 802.11 (including any IEEE 802.11 revisions), Cellular technology (such as GSM, CDMA, UMTS, EV-DO, WiMAX, or LTE), and/or Zigbee, Wi-Fi, Bluetooth or Ethernet, among other possibilities. The term "transmission medium" shall be taken to include any intangible medium that is capable of storing, encoding, or carrying instructions for execution by the machine, and includes digital or analog communications signals or other intangible medium to facilitate communication of such software.

Figure 30:
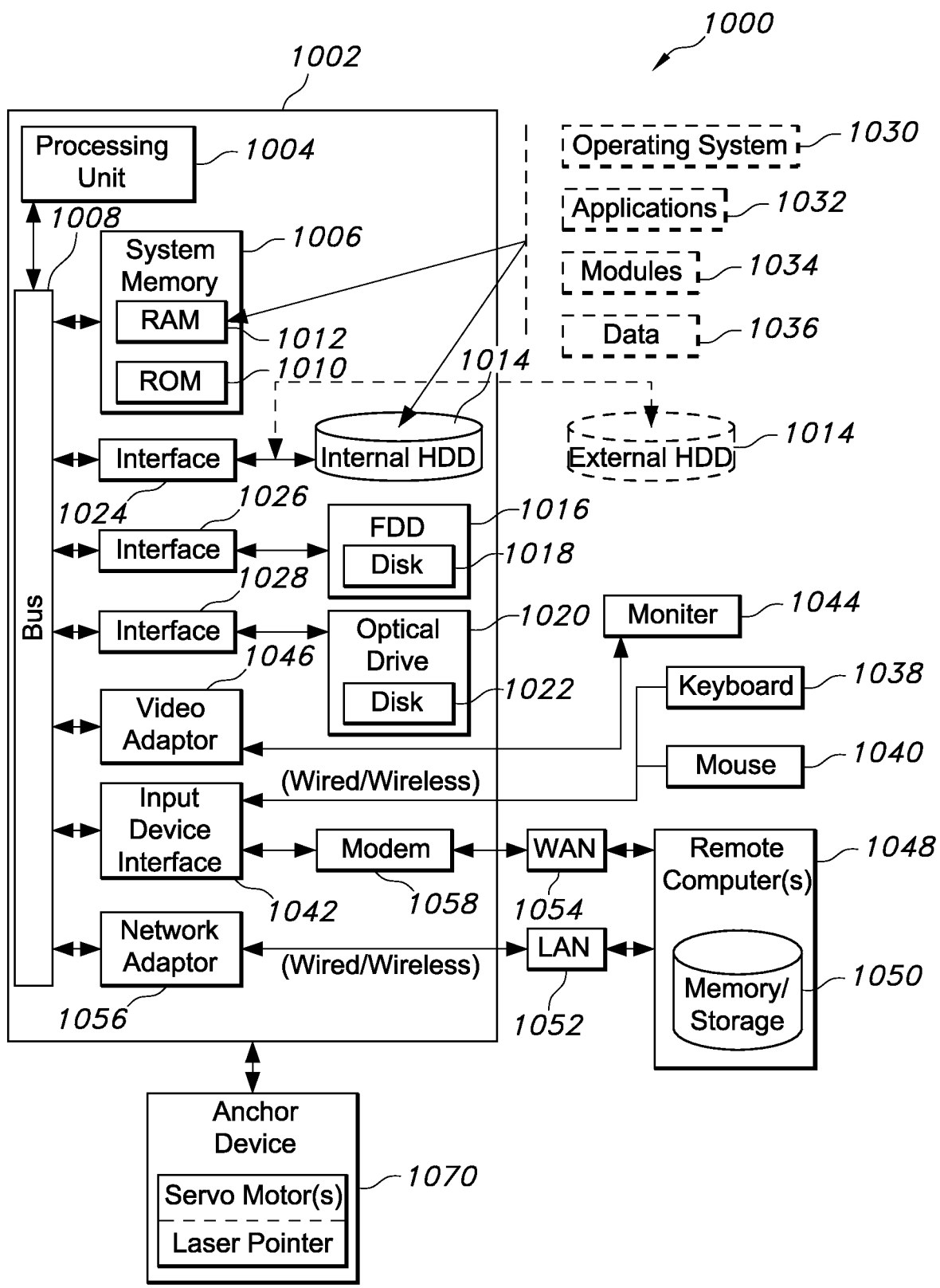
FIG. 30 illustrates a block diagram of a computer operable to execute the disclosed architecture.

Referring now to FIG. 30, there is illustrated a block diagram of a computer operable to execute the disclosed architecture. In order to provide additional context for various aspects of the subject invention, FIG. 30 and the following discussion are intended to provide a brief, general description of a suitable computing environment 1000 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices. The illustrated aspects of the invention may also be practiced in distributed computing environments where certain tasks are performed by remote processing devices that are linked through a communications network. In a distributed computing environment, program modules can be located in both local and remote memory storage devices. A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 30, the exemplary environment 1000 for implementing various aspects of the invention includes a computer or computing device 1002, the computer or computing device 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004. The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, USB drive or other contemplate drive, (e.g., to read from or write to a removable disk medium 1018) and an optical disk drive 1020, (e.g., reading a CD-ROM disk 1022 or, to read from or write to other high capacity optical media such as the DVD rewritable disk). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1324 for external drive implementations includes at least one or both of USB and IEEE 1394 interface technologies and any other more advanced interface communication protocols. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems. A user can enter commands, voice commands and information into the computer 1002 through one or more wired/wireless input devices, e.g., a keyboard 1038 and a pointing device, such as a mouse 1040. Other input devices (not shown) may include a microphone, camera, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc. A monitor 1044 or other type of display device is also connected to the system bus 1008 via an interface, such as a video adapter 1006. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, mobile computing device and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet and any other contemplated communications protocols. Other communication protocols effecting connectivity, include, IEEE 802.11 (including any IEEE 802.11 revisions), Cellular technology (such as GSM, CDMA, UMTS, EV-DO, WiMAX, or LTE), and/or Zigbee, Wi-Fi, Bluetooth or Ethernet, among other possibilities.

When used for example, in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056. When used in a WAN networking environment, the computer 1002 can include a modem 1058, or is connected to a communications server on the WAN 1054, or has other means for establishing communications over for example, the WAN 1054, such as by Internet protocol or other communication protocol. The modem 1058, which can be internal or external and a wired or wireless device, is connected to the system bus 1008 via the serial port interface 1042. Other kinds of modems, such a broadband modems are often referred to as high-speed modems. Cellular modems are a type of digital modem that establishes internet connectivity between a mobile device and a cell phone network. The word modem was generally the technical term for the conversion between digital and analog signals. However, a broadband modem such as those used for DSL or cable internet access, uses advanced signaling techniques to achieve dramatically higher network speeds than earlier-generation dial-up modems. External broadband modems plug into a home broadband router or other home gateway device on one end and the external internet interface such as a cable line on the other. The router or gateway directs the signal to all the devices in the business or home as needed. Some broadband routers include an integrated modem as a single hardware unit.

In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. These communication links (whether via wired or wireless connectivity medium) includes at least Wi-Fi, Bluetooth®, Zigbee or Ethernet, or other wireless technologies such as IEEE 802.11 (including any IEEE 802.11 revisions), Cellular technology (such as GSM, CDMA, UMTS, EV-DO, WiMAX, or LTE), and/or whether in combination or otherwise, alternated with Zigbee, Wi-Fi, Bluetooth® or Ethernet, among other possibilities. Thus, the communication can be a predefined structure as with a conventional network or simply another communication exchange or protocol between at least two devices. Further included is a wired or wireless communication link between the computer or computing device 1002 and an anchor device 1070 comprising one or more servo motors or similar device that effects rotational movement of a laser pointer device. Also included is anchor device 1070 comprising one or more laser pointer(s), server motors and/or other microcontroller, that receives commands from the system computing device 1002 in order to effect object mapping, navigation and subsequence rotational movement of the one or more laser pointer(s), such that one or more point of interest(s) or object of interest(s) can be targeted by an emitting laser beam from the one or more laser pointer(s), in accordance with an exemplary embodiment of the disclosed smart laser pointer system and method.

Figure 31:
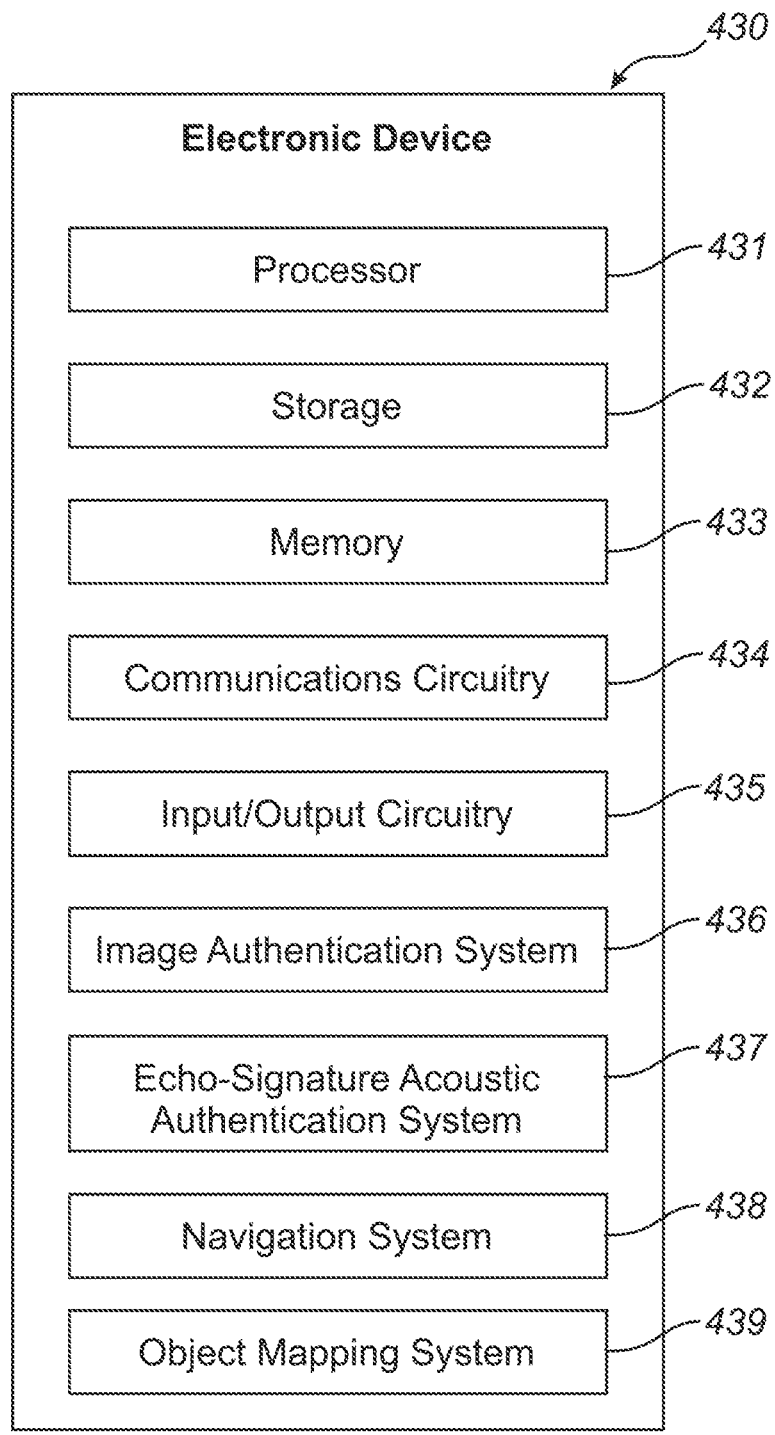
FIG. 31 illustrates a system block diagram including constituent components of an example electronics device associated with an authentication system, in accordance with an embodiment of the acoustic-based echo-signature system.

FIG. 31 is a schematic view of an illustrative electronic device for use with an authentication system in accordance with one embodiment of the invention. Electronic device 430 may include processor 431, storage 432, memory 433, communications circuitry 434, input/output circuitry 435, image authentication system 436, echo-signature acoustic authentication system 437 and power supply. In some embodiments, one or more of electronic device components 430 may be combined or omitted (e.g., combine storage 432 and memory 433). In some embodiments, electronic device 430 may include other components not combined or included in those shown in FIG. 31 (e.g., a display, bus, or input mechanism), or several instances of the components shown in FIG. 31. For the sake of simplicity, only one of each of the components is shown in FIG. 31.

Processor 431 may include any processing circuitry operative to control the operations and performance of electronic device 430. For example, processor 431 may be used to run operating system applications, firmware applications, media playback applications, media editing applications, or any other application. In some embodiments, a processor may drive a display and process inputs received from a user interface.

Storage 432 may include, for example, one or more storage mediums including a hard-drive, solid state drive, flash memory, permanent memory such as ROM, any other suitable type of storage component, or any combination thereof. Storage 432 may store, for example, media data (e.g., music and video files), application data (e.g., for implementing functions on device 430), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that may enable electronic device 430 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 433 can include cache memory, semi-permanent memory such as RAM, and/or one or more different types of memory used for temporarily storing data. In some embodiments, memory 433 can also be used for storing data used to operate electronic device applications, or any other type of data that may be stored in storage 432. In some embodiments, memory 433 and storage 432 may be combined as a single storage medium.

Communications circuitry 434 can permit device 430 to communicate with one or more servers or other devices using any suitable communications protocol. Electronic device 430 may include one more instances of communications circuitry 334 for simultaneously performing several communications operations using different communications networks, although only one is shown in FIG. 31 to avoid overcomplicating the drawing. For example, communications circuitry 434 may support Wi-Fi (e.g., an 802.11 protocol), Ethernet, Bluetooth® (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof.

Input/output circuitry 435 may be operative to convert (and encode/decode, if necessary) analog signals and other signals into digital data. In some embodiments, input/output circuitry can also convert digital data into any other type of signal, and vice-versa. For example, input/output circuitry 435 may receive and convert physical contact inputs (e.g., from a multi-touch screen), physical movements (e.g., from a mouse or sensor), analog audio signals (e.g., from a microphone), or any other input. The digital data can be provided to and received from processor 431, storage 432, memory 433, or any other component of electronic device 430. Although input/output circuitry 435 is illustrated in FIG. 31 as a single component of electronic device 430, several instances of input/output circuitry can be included in electronic device 430.

Electronic device 430 may include any suitable mechanism or component for allowing a user to provide inputs to input/output circuitry 435. For example, electronic device 430 may include any suitable input mechanism, such as for example, a button, keypad, dial, a click wheel, or a touch screen. In some embodiments, electronic device 430 may include a capacitive sensing mechanism, or a multi-touch capacitive sensing mechanism.

In some embodiments, electronic device 430 can include specialized output circuitry associated with output devices such as, for example, one or more audio outputs. The audio output may include one or more speakers (e.g., mono or stereo speakers) built into electronic device 430, or an audio component that is remotely coupled to electronic device 430 (e.g., a headset, headphones or earbuds that may be coupled to communications device with a wire or wirelessly).

In some embodiments, I/O circuitry 435 may include display circuitry (e.g., a screen or projection system) for providing a display visible to the user. For example, the display circuitry may include a screen (e.g., an LCD screen) that is incorporated in electronics device 430. As another example, the display circuitry may include a movable display or a projecting system for providing a display of content on a surface remote from electronic device 430 (e.g., a video projector). In some embodiments, the display circuitry can include a coder/decoder (Codec) to convert digital media data into analog signals. For example, the display circuitry (or other appropriate circuitry within electronic device 430) may include video Codecs, audio Codecs, or any other suitable type of Codec.

The display circuitry also can include display driver circuitry, circuitry for driving display drivers, or both. The display circuitry may be operative to display content (e.g., media playback information, application screens for applications implemented on the electronic device, information regarding ongoing communications operations, information regarding incoming communications requests, or device operation screens) under the direction of processor 431.

Image authentication system 436 and/or echo-signature acoustic authentication system or engine 437 (which may be integrated as one discrete component, or alternatively as shown, as discrete segregated components of the electric device 430) may include any suitable system or sensor operative to receive or detect an input identifying the user of device 430. For example, image authentication system 436 may include a skin-pattern sensing mechanism, an optical system for identifying users based on their facial patterns, eye features (e.g., retinas), or vein patterns, or any other sensor for detecting any other unique biometric feature or attribute of a user. As another example, authentication system 436 may be operative to receive secret or confidential entries identifying the user (e.g., gestures on the device, or touching a particular pattern of objects or colors on a display). As still another example, authentication system 436 may be operative to detect particular movements or vibrations of the device caused by the user. Authentication system 436 may be combined or embedded in any other element of electronic device 430 (e.g., a display or a camera), or use events detected by various sensors of the electronic device (e.g., an accelerometer or proximity sensor). In some embodiments, several types of authentication systems may be combined or implemented in the electronic device.

Echo-signature acoustic authentication system 437 may be configured to detect and receive acoustic echo signals as emitted or reflected from the user 203 unique facial contours or other contours of for example, hand, in response to emission of audible or nearly inaudible acoustic signals as generated from input/output circuitry 435 such as an earpiece speaker of the electronic device 430. Such acoustic echo signals are operative in identifying the user (for example, based on a determined face regions echo 218 segment) as processed by the authentication system 437. In some embodiments, one or more types of authentication systems may be combined or implemented with the echo-signature acoustic authentication system 437 in the electronic device 430.

Object mapping system 439, including in certain embodiments, related smart laser pointer system (that may further comprise one or more anchor nodes, laser pointer(s) and/or microcontroller), may be configured to map objects as a user navigates an indoor physical environment with predefined boundaries. The object mapping system 439 may be implemented with the navigation system 438 in order for a user to expediently determine the location of one or more objects of interest of points of interest in a bounded environment by determination of a path or route 35 that leads or guides the user from the current location to a destination object of interest. The object mapping system 439 sends command signals to the anchor nodes to effect rotational movement of one or more laser pointers to aim and target at a destination object of interest with precision one the user has reached a destination using the navigation system 438. The object mapping system 439 is used in determining and transmitting to the anchor nodes comprising one or more laser pointers, the rotational angles alpha $\alpha$ and beta $\beta$ (representing azimuth (horizontal) and elevation (vertical) rotations of the laser pointer) that is required to target the object of interest with the laser beam light, in accordance with an embodiment of the disclosed system and method.

In some embodiments, electronic device 430 may include a bus operative to provide a data transfer path for transferring data to, from, or between control processor 431, storage 432, memory 433, communications circuitry 434, input/output circuitry 435 authentication system 436, echo-signature acoustic authentication system 437, object mapping system 439, and any other component included in the electronic device 430.

In order to prevent unauthorized access to data or information stored in memory or storage, the electronic device may direct an authentication system to identify the user and authorize access to requested resources. The electronic device may require authorization prior to providing access to any electronic device resource. In some embodiments, the electronic device may require different levels of authorization before providing access to different applications or different data or files associated with different applications. For example, the electronic device may require a user to satisfy several authentication systems prior to providing access to an application or data (e.g., a secondary authentication, for example using biometrics, in addition to a first or initial authentication, for example a pass code used to unlock the device, acoustic echo-signature be matched, image based authentication, and other contemplated iterations of authentication).

Figure 32:
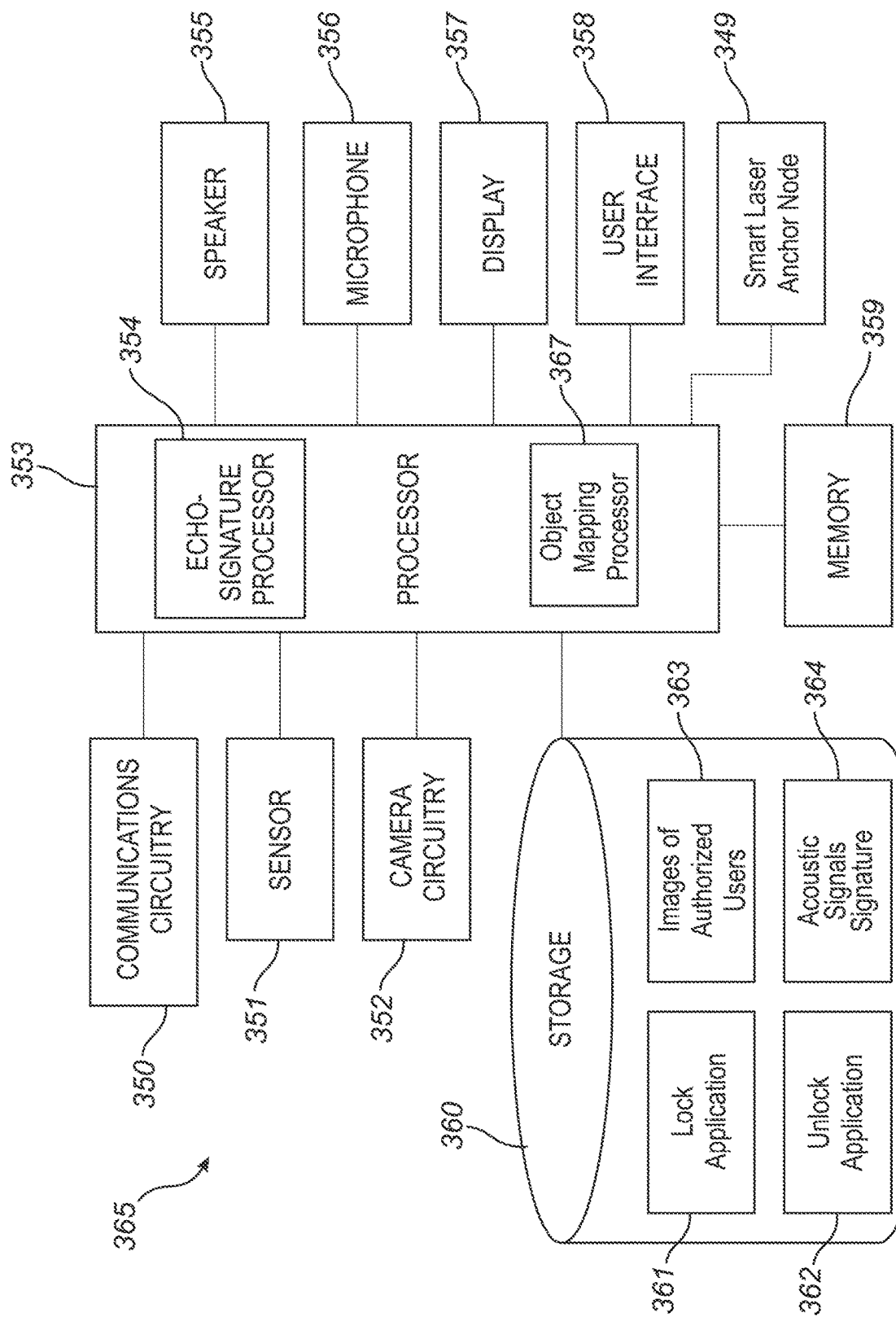
FIG. 32 illustrates a system block diagram including constituent components of an example mobile device, in accordance with an embodiment of the acoustic-based echo-signature system, including an example computing system.

FIG. 32 illustrates a system block diagram including constituent components of an example mobile device, in accordance with an embodiment of the acoustic-based echo-signature system, including an example computing system.

The device 365 in FIG. 32 includes a main processor 353 that interacts with a motion sensor 351, camera circuitry 352, storage 360, memory 359, display 357, and user interface 358. The device 365 may also interact with communications circuitry 350, a speaker 355, and a microphone 356. The various components of the device 365 may be digitally interconnected and used or managed by a software stack being executed by the main processor 353. Many of the components shown or described here may be implemented as one or more dedicated hardware units and/or a programmed processor (software being executed by a processor, e.g., the main processor 353).

The main processor 353 controls the overall operation of the device 365 by performing some or all of the operations of one or more applications implemented on the device 365, by executing instructions for it (software code and data) that may be found in the storage 360. The processor may, for example, drive the display 357 and receive user inputs through the user interface 358 (which may be integrated with the display 357 as part of a single, touch sensitive display panel, e.g., display panel of FIG. 25B, on the front face of the mobile device 217). The main processor 353 may also control the locking and unlocking functions of the device 365.

Storage 360 provides a relatively large amount of "permanent" data storage, using nonvolatile solid state memory (e.g., flash storage) and/or a kinetic nonvolatile storage device (e.g., rotating magnetic disk drive). Storage 360 may include both local storage and storage space on a remote server. Storage 360 may store data, such as image data of authorized users 363 and data of movement patterns and/or acoustics signal data associated with an echo-signature of the user 364, and software components that control and manage, at a higher level, the different functions of the device 365. For instance, there may be a locking application

361 and an unlocking application 362 that configure the camera circuitry 352 to capture images for detection of a user's face.

In addition to storage 360, there may be memory 359, also referred to as main memory or program memory, which provides relatively fast access to stored code and data that is being executed by the main processor 353 and/or echo-signature processor or echo-signature engine 354 and/or object mapping processor or engine 367. Memory 359 may include solid state random access memory (RAM), e.g., static RAM or dynamic RAM. There may be one or more processors, e.g., main processor 353 and/or echo-signature processor 354, that run or execute various software programs, modules, or sets of instructions (e.g., applications) that, while stored permanently in the storage 360, have been transferred to the memory 359 for execution, to perform the various functions described above. It should be noted that these modules or instructions need not be implemented as separate programs, but rather may be combined or otherwise rearranged in various combinations. In addition, the enablement of certain functions could be distributed amongst two or more modules, and perhaps in combination with certain hardware.

The device 365 may include communications circuitry 350. Communications circuitry 350 may include components used for wired or wireless communications, such as two-way conversations and data transfers. For example, communications circuitry 350 may include RF communications circuitry that is coupled to an antenna, so that the user of the device 365 can place or receive a call through a wireless communications network. The RF communications circuitry may include a RF transceiver and a cellular baseband processor to enable the call through a cellular network. In another embodiment, communications circuitry 350 may include Wi-Fi communications circuitry so that the user of the device 365 may place or initiate a call using voice over Internet Protocol (VOIP) connection, through a wireless local area network.

The device 365 may include a motion sensor 351, also referred to as an inertial sensor, that may be used to detect movement of the device 365. The motion sensor 351 may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RP detector, an RF or acoustic doppler detector, a compass, a magnetometer, or other like sensor. For example, the motion sensor 351 may be a light sensor that detects movement or absence of movement of the device 365, by detecting the intensity of ambient light or a sudden change in the intensity of ambient light. The motion sensor 351 generates a signal based on at least one of a position, orientation, and movement of the device 365. The signal may include the character of the motion, such as acceleration, velocity, direction, directional change, duration, amplitude, frequency, or any other characterization of movement. The processor 353 receives the sensor signal and controls one or more operations, e.g., the unlocking function described below, of the device 365 based in part on the sensor signal.

In one embodiment, the device 365 may include movement patterns and/or acoustic signals associated with a user echo-signature pattern 364 that are stored in storage 360. A movement pattern may be associated with a function, e.g., the unlocking function, of the device 365. For example, the processor 353 may compare the sensor signal with the stored movement patterns 364 to determine whether the user moved the device 365 to a use position, i.e., a position that indicates that the user is likely to want to use the device. The comparing function may include employing a pattern recognition algorithm or technique or a statistical model. In another embodiment, the processor 353 may use the sensor signal to infer or calculate tilt or inclination of the device 365 relative to a static, linear acceleration (i.e., gravity) by correlating tilt angles with detected linear acceleration. In this way, the processor 353 may calculate or infer when the device 365 is subjected to dynamic accelerations by, for example, the hand of the user. In yet another embodiment, the motion sensor 351 may include other signal processing circuits such as a low pass filter, a threshold detector, an amplitude detector, or a frequency detector to remove signals representing unintended movement of the device 365. For example, a low pass filter may be used to remove or block noise or spurious signals representing brief, unintended movement of the device or other movement of the device that may occur during, for example, walking, jogging, or bouncing in a moving vehicle.

In another embodiment, the motion sensor 351 may be used in combination with a grip detector or a proximity sensor (not shown) in the unlocking function of the device 365. The grip detector may be used to recognize when the user is holding the device 365, touching the display screen 105, or pressing a button. The grip detector may include one or more switches and/or buttons to detect the presence of at least one finger. The proximity sensor may sense when the device 365 is in the user's hand so that the device 365 can ignore changes in position, orientation, or movement that are not based on the user's hand movements and/or positioning. By requiring the user to explicitly interact with a portion of the device 365 while moving the device 365, the possibility of inadvertently initiating the unlocking function is minimized or eliminated.

The device 365 also includes camera circuitry 352 that implements the digital camera functionality of the device 365. One or more solid-state image sensors are built into the device 365, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 360. The camera circuitry 352 may be used to capture the images that are analyzed by the processor 353 and/or echo-signature processor 354 in the locking or unlocking functionality of the device 365. For example, the camera circuitry 352 may capture an image of a facial profile of an authorized user of the device 365, and this image may be stored with the images of authorized users 363 in the storage 360. When the camera circuitry 352 subsequently captures an image of a user who wants to unlock the device 365, the processor 353 and/or echo-signature processor 354 may compare the facial profile (or stored acoustics and vision features representation that trains the SVM model 364) in the subsequently captured image with the facial profiles in each image of the images of authorized users 363 (or stored acoustics and vision features representation that trains the SVM model 364) to determine whether the user is an authorized user. This may be accomplished using suitable facial recognition software that matches faces that look like the same person. This also may be accomplished in addition to facial recognition or alternatively by implementing the acoustics-based echo-signature authentication as processed by echo-signature processor 354, which determines the echo-signature profile of a user during user registration and stores the echo-signature profile in the acoustic signal echo-signature profile 364 of the storage 360. The echo-signature profile and/or including acoustic signals signature 364 may also include visual features representation combined with acoustic features representation (i.e. joints features representation) with the respective trained SVM model that is implemented during SVM prediction 131 process.

Additionally included in the device or system 365 is a smart laser anchor node 349 that may comprise one or more of a smart laser pointer(s) (or similar device that emits laser signal that is in the wavelength range of visible light, and is visible to a human eye or user), servo motor controllers, and/or a microcontroller or microprocessor, that receives commands to rotate the smart laser point(s) at a certain $\alpha$ and $\beta$ rotational angle in the (x, y, z) axis to permit the laser to radiate a beam on an object or point of interest as determined by the object mapping processor 367 and related navigation system and/or navigation processor.

Figure 33:
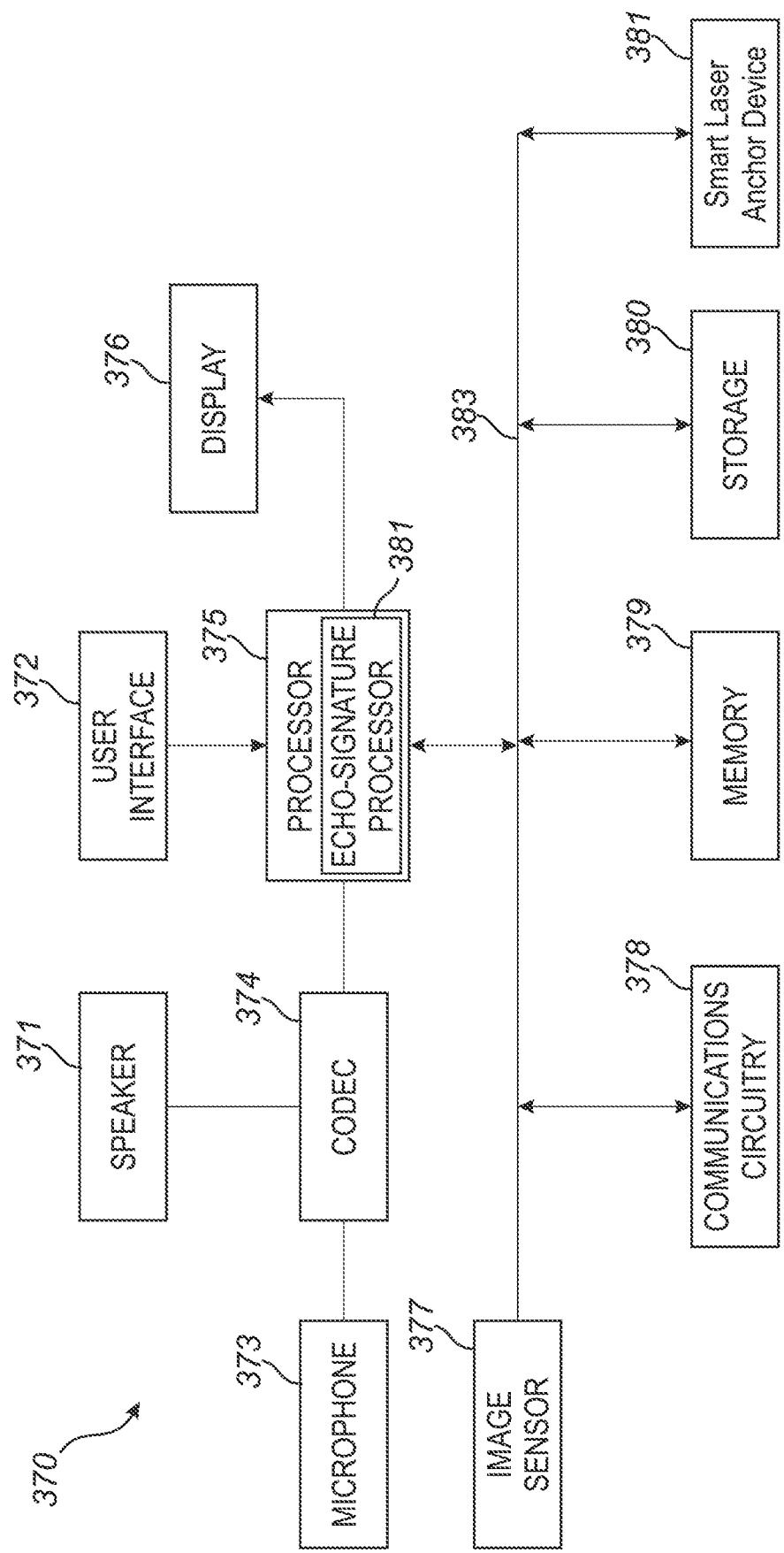
FIG. 33 illustrates a system block diagram including constituent components of an example mobile device, in accordance with an embodiment of the acoustic-based echo-signature system, including an example computing system.

FIG. 33 illustrates a system block diagram including constituent components of an example mobile device, in accordance with an embodiment of the acoustic-based echo-signature system, including an example computing system.

More particularly, shown in FIG. 33 is a personal computing device 370 according to an illustrative embodiment of the invention. The block diagram provides a generalized block diagram of a computer system such as may be employed, without limitation, by the personal computing device 370. The personal computing device 370 may include a processor 375 and/or echo-signature processor 381 and/or an object mapping processor that may be integrated with processor 375 and/or as a segregated discrete component or module 381, storage device 380, user interface 372, display 376, CODEC 374, bus 383, memory 379, communications circuitry 378, a speaker or transducer 371, a microphone 373, and an image sensor 377. Processor 375 and/or echo-signature processor 381 may control the operation of many functions and other circuitry included in personal computing device 370. Processor 375, 381 may drive display 376 and may receive user inputs from the user interface 372.

Storage device 380 may store media (e.g., music and video files), software (e.g., for implanting functions on device 370), preference information (e.g., media playback preferences), lifestyle information (e.g., food preferences), personal information (e.g., information obtained by exercise monitoring equipment, transaction information (e.g., information such as credit card information), word processing information, personal productivity information, wireless connection information (e.g., information that may enable a media device to establish wireless communication with another device), subscription information (e.g., information that keeps track of podcasts or television shows or other media a user subscribes to), and any other suitable data. Storage device 380 may include one more storage mediums, including, for example, a hard-drive, permanent memory such as ROM, semi-permanent memory such as RAM, or cache.

Memory 379 may include one or more different types of memory, which may be used for performing device functions. For example, memory 379 may include cache, ROM, and/or RAM. Bus 383 may provide a data transfer path for transferring data to, from, or between at least storage device 380, memory 379, and processor 375, 381. Coder/decoder (CODEC) 374 may be included to convert digital audio signals into analog signals for driving the speaker 371 to produce sound including voice, music, and other like audio. The CODEC 374 may also convert audio inputs from the microphone 373 into digital audio signals. The CODEC 374 may include a video CODEC for processing digital and/or analog video signals.

User interface 372 may allow a user to interact with the personal computing device 370. For example, the user input device 372 can take a variety of forms, such as a button, keypad, dial, a click wheel, or a touch screen. Communications circuitry 378 may include circuitry for wireless communication (e.g., short-range and/or long-range communication). For example, the wireless communication circuitry may be wi-fi enabling circuitry that permits wireless communication according to one of the 802.11 standards. Other wireless network protocol standards could also be used, either in alternative to the identified protocols or in addition to the identified protocols. Other network standards may include Bluetooth, the Global System for Mobile Communications (GSM), and code division multiple access (CDMA) based wireless protocols. Communications circuitry 378 may also include circuitry that enables device 300 to be electrically coupled to another device (e.g., a computer or an accessory device) and communicate with that other device.

In one embodiment, the personal computing device 370 may be a portable computing device dedicated to processing media such as audio and video. For example, the personal computing device 370 may be a media device such as media player (e.g., MP3 player), a game player, a remote controller, a portable communication device, a remote ordering interface, an audio tour player, or other suitable personal device. The personal computing device 370 may be battery-operated and highly portable so as to allow a user to listen to music, play games or video, record video or take pictures, communicate with others, and/or control other devices. In addition, the personal computing device 370 may be sized such that it fits relatively easily into a pocket or hand of the user. By being handheld, the personal computing device 370 (or electronic device 330 shown in FIG. 31) is relatively small and easily handled and utilized by its user and thus may be taken practically anywhere the user travels.

As discussed previously, the relatively small form factor of certain types of personal computing devices 370, e.g., personal media devices, enables a user to easily manipulate the device's position, orientation, and movement. Accordingly, the personal computing device 370 may provide for improved techniques of sensing such changes in position, orientation, and movement to enable a user to interface with or control the device 370 by affecting such changes. Further, the device 370 may include a vibration source, under the control of processor 375, 381, for example, to facilitate sending acoustic signals, motion, vibration, and/or movement information to a user related to an operation of the device 370 including for user authentication and/or for navigation. The personal computing device 370 may also include an image sensor 377 that enables the device 370 to capture an image or series of images (e.g., video) continuously, periodically, at select times, and/or under select conditions.

Face detection and recognition are different processes. Face detection includes the process of detection and/or locating a face or faces within an image. Face recognition includes the process of recognizing that a detected face is associated with a particular person or user. Face recognition, however, is typically performed along with and/or after face detection.

Face detection and recognition are known in technology fields such as robotics and computer vision. However, there are numerous advantageous applications of this technology that enable more efficient control and interaction between a user and a personal computing system. In certain embodiments, a personal computing device such as devices 330 and 370, include an image sensor, e.g., a camera, that is orientated such that it is capable of sensing the presence of a user's face while the user is interfacing, either passively or actively, with the personal computing device. For example, the image sensor may be embedded within a display 105 of the device 7. Alternatively, the image sensor may be connected with and/or mounted on a display of device 217. Thus, the image sensor, in certain embodiments, operating with the personal computing device's processor, acts as a user presence sensor and/or user authenticator depending on the requirements of an application running on the personal computing device.

In particular, for acoustic echo-signature based user authentication, the device 370, facilitates the emitting of nearly inaudible sound signals from the earpiece speaker 371 to illuminate the user's face so that acoustic echo signals can be reflected from unique facial contours 210 of the user's face 209, hence used in the creation of a unique echo-signature profile that is based on the acoustic echo signals of the user during user registration. The echo-signature profile may be stored in storage 380 and retrieved during user authentication when a user seeks to unlock a device 370.

In addition, to accomplish object mapping, the system may further include smart laser anchor device that comprises a smart laser anchor device, node or engine 381 that may comprise smart laser pointer(s), servo motor controller(s), and/or one or more microcontroller(s) and/or microprocessor(s), that receive(s) commands in order to facilitate rotation of the smart laser pointer(s) at a certain $\alpha$ and $\beta$ rotational angle in the (x, y, z) axis. This in turn would facilitate and effect the laser pointer or similar laser device, to radiate a beam on an object or point of interest at a particular alpha and beta angle in 3D space, and to target the object(s) of interest and/or POIs with greater precision, as determined by the object mapping processor 367 and/or related navigation system and/or navigation processor.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computing systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computing system processing can be constructed to implement one or more of the methods or functionality as described herein.

It is also contemplated that a computer-readable medium includes instructions 802 or receives and executes instructions 802 responsive to a propagated signal, so that a device connected to a network 822 can communicate voice, video or data over the network 822. Further, the instructions 802 may be transmitted or received over the network 822 via the network interface device 824.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing or encoding a set of instructions for execution by a processor or that cause a computing system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture and store carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

The present disclosure relates to a system and method associated with expedient determination of the location of one or more objects in a 3D space using a smart laser pointer and related system. Even more particularly, the present invention relates to a novel system and method that implements indoor mapping, navigation and the determination of objects in a defined 3D space, including on a fine-granularity scale. The present system and method can further operate on user voice command which in certain embodiments, incorporates authentication of voice command and/or user including acoustic features and visual landmark features of the user relative to an epoch of time during use of the smart laser pointer, object mapping and navigation system and other related systems.

In certain embodiments or aspects, contemplated is an novel indoor mapping, navigation and determination of location of one or more objects on a fine-scale level, even in a cluttered or complex indoor or defined environment in 3D space, is disclosed.

In certain embodiments or aspects, further contemplated is a fine-level of granularity in implementation of one or more laser devices and/or related anchor nodes that can point to user-requested objects, even among cluttered and/or complex environments, with the ability to re-localize the device in the particular defined environment once the user system is re-located to and/or implemented at a different location.

In other embodiments or aspects, further contemplated is implementation of an acoustics-based echo-signature print associated with an original user of a device that is implemented during use of the disclosed smart laser system and method. Even more particularly, the present invention relates to a novel system and method that trains and augments a classification model in order to predict and implement the respective authentication of a joint features representation including acoustic features and visual landmark features associated with the user during an initial authentication of a user of the device and subsequent use of the smart laser pointer system and other related systems.

Further disclosed is a system and method associated with generating an acoustics-based echo-signature profile related to an original user of a device that is implemented during prediction for authentication of the current user of a device. Even more particularly, the present invention relates to a novel system and method that trains and augments a classification model in order to predict the respective authentication of a joint features representation including acoustic features and visual landmark features of the user during authentication of a user of the device. Even more particularly, a system and method for implementing a novel system and method that trains an SVM classification model that is associated with generating a unique echo-signature profile associated with an original owner/user of the device and later implemented during SVM prediction process to determine whether the user profile based on extracted acoustics and vision features representation, matches the echo-signature profile associated with the actual owner of the device during user authentication, has been described.

Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" or "embodiment" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Each of the non-limiting aspects or examples described herein may stand on its own, or may be combined in various permutations or combinations with one or more of the other examples. The above detailed description includes references to the accompanying drawings, which form a part of the detailed description. The drawings show, by way of illustration, specific embodiments in which the invention may be practiced. These embodiments are also referred to herein as "aspects" or "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third." etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like. The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Those skilled in the relevant art will appreciate that aspects of the invention can be practiced with other computer system configurations, including Internet appliances, handheld devices, cellular or mobile phones, multi-processor systems, microprocessor-based or programmable consumer electronics, network PCs, client-server environments including thin clients, mini-computers, mainframe computers and the like. Aspects of the invention can be embodied in a special purpose computer or data processor that is specifically programmed, configured or constructed to perform one or more of the computer-executable instructions or modules explained in detail below. Indeed, the term "computer" as used herein refers to any data processing platform or device.

Aspects of the invention can also be practiced in distributed computing environments, where tasks or modules are performed by remote processing devices, which are linked through a communications network. In a distributed computing environment, program modules or sub-routines may be located in both local and remote memory storage devices, such as with respect to a wearable and/or mobile computer and/or a fixed-location computer. Aspects of the invention described below may be stored and distributed on computer-readable media, including magnetic and optically readable and removable computer disks, as well as distributed electronically over the Internet or over other networks (including wireless networks). Those skilled in the relevant art will recognize that portions of the invention may reside on a server computer or server platform, while corresponding portions reside on a client computer. For example, such a client server architecture may be employed within a single mobile computing device, among several computers of several users, and between a mobile computer and a fixed-location computer. Data structures and transmission of data particular to aspects of the invention are also encompassed within the scope of the invention.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. An object mapping system associated with expedient determination of a location of a coordinate point of interest (POI) in a bounded 3-dimensional (3D) environment, the system comprising:
    a laser pointer device configured to emit a laser beam, the laser pointer device positioned at an initial position;
    a plurality of servomotors configured to rotate the laser pointer device at horizontal and vertical angles in relation to the initial position;
    an anchor node device comprising a processor that performs operations comprising:
        creating an initial map comprising unique characteristics associated with a bounded physical environment in response to a request by a user via a computing device;
        performing object recognition analysis to determine labels associated with objects using image recognition processing based at least on a user command to locate one or more objects of interest and the unique characteristics associated with the bounded physical environment;
        generating a world map representation with editable object tags associated with the one or more objects of interest and the unique characteristics associated with the bounded physical environment;
        providing navigation instructions to guide the user via the computing device to an object of interest selected from the one or more objects of interest based on a distance analysis of a current location of the computing device to a destination location of the computing device;
        determining horizontal and vertical rotational angles from the initial position of the laser pointer device to a position of the object of interest;
        generating control signals to the anchor node device to rotate the plurality of servomotors based on the horizontal and vertical rotational angles;
        processing the control signals to rotate the plurality of servomotors according to the control signals such that the laser pointer device is rotated from the initial position in one or more of (x, y, z) coordinate-based directional angles to the object of interest; and
        generating the laser beam via the laser pointer device that targets the object of interest for expedient determination of the coordinate point of interest (POI) associated with the object of interest that is associated with the destination location of the computing device.

2. The system as recited in claim 1, wherein the user command is transmitted using one or more of selection of the object of interest via a user interface selection menu and a voice command.

3. The system as recited in claim 2, wherein the system implements interpretation of the voice command in order to transmit a control signal to the anchor node device.

4. The system as recited in claim 1, wherein determination of at least one of the horizontal and vertical rotational angles is further based on an absolute location of the object of interest in the world map representation using a first (x, y, z) coordinate value and an absolute location of the anchor node device using a second (x, y, z) coordinate value.

5. The system as recited in claim 4, wherein the unique characteristics associated with the bounded physical environment comprise one or more of 2-dimensional user trajectories, wall boundaries, and 3D points of interest.

6. The system as recited in claim 5, wherein the unique characteristics associated with the bounded physical environment further comprise underlying point cloud information that comprises 3D coordinates of feature points in the bounded physical environment and a world map based on visual features, used for re-localization when a change in system status occurs.

7. The system as recited in claim 1, wherein the world map representation is further based on augmented reality in displaying labels on real world images associated with the bounded physical environment.

8. The system as recited in claim 1, wherein generating the world map representation further comprises registering a series of 3D coordinates associated with the one or more objects of interest or points of interest associated with the computing device.

9. The system as recited in claim 1, wherein generating the world map representation further comprises mapping boundaries associated with a complex bounded physical environment by using acoustic echo signals, in order to refine respective boundaries drawn for the complex bounded physical environment in the world map representation.

10. An object mapping method associated with expedient determination of a location of a coordinate point of interest (POI) in a bounded 3-dimensional (3D) environment, the method comprising:
   an anchor node device that includes a processor that performs the operations comprising:
   creating an initial map comprising unique characteristics associated with a bounded physical environment in response to a request by a user via a computing device;
   performing object recognition analysis to determine labels associated with objects using image recognition processing based at least on a user command to locate one or more objects of interest and the unique characteristics associated with the bounded physical environment;
   generating a world map representation with editable object tags associated with the one or more objects of interest and the unique characteristics associated with the bounded physical environment;
   providing navigation instructions to guide the user via the computing device to an object of interest selected from the one or more objects of interest based on a distance analysis of a current location of the computing device to a destination location of the computing device;
   determining horizontal and vertical rotational angles from an initial position of a laser pointer device to a position of the object of interest, the laser pointer device positioned at the initial position and configured to emit a laser beam;
   generating control signals to the anchor node device to rotate a plurality of servomotors based on the horizontal and vertical rotational angles in relation to the initial position;
   processing the control signals to rotate the plurality of servomotors according to the control signals such that the laser pointer device is rotated from the initial position in one or more of (x, y, z) coordinate-based directional angles to the object of interest; and
   generating the laser beam via the laser pointer device that targets the object of interest for expedient determination of the coordinate point of interest (POI) associated with the object of interest that is associated with the destination location of the computing device.

11. The method as recited in claim 10, wherein the user command is transmitted using one or more of selection of the object of interest via a user interface selection menu and a voice command.

12. The method as recited in claim 11, wherein the method implements interpretation of the voice command in order to transmit a control signal to the anchor node device.

13. The method as recited in claim 10, wherein determination of at least one of the horizontal and vertical rotational angles is further based on an absolute location of the object of interest in the world map representation using a first (x, y, z) coordinate value and an absolute location of the anchor node device using a second (x, y, z) coordinate value.

14. The method as recited in claim 13, wherein the unique characteristics associated with the bounded physical environment comprise one or more of 2-dimensional (2D) user trajectories, wall boundaries and 3D points of interest.

15. The method as recited in claim 14, wherein the unique characteristics associated with the bounded physical environment further comprise underlying point cloud information that comprises 3D coordinates of feature points in the bounded physical environment and a world map based on visual features, used for re-localization when a change in system status occurs.

16. The method as recited in claim 10, wherein the world map representation is further based on augmented reality in displaying labels on real world images associated with the bounded physical environment.

17. The method as recited in claim 10, wherein generating the world map representation further comprises registering a series of 3D coordinates associated with the one or more objects of interest or points of interest associated with the computing device.

18. The method as recited in claim 10, wherein generating the world map representation further comprises mapping boundaries associated with a complex bounded physical environment by using acoustic echo signals, in order to refine respective boundaries drawn for the complex bounded physical environment in the world map representation.

19. A non-transitory computer-readable medium storing instructions that, when executed by a processing device, causes the processing device to perform operations associated with expedient determination of a location of a coordinate point of interest (POI) in a bounded 3-dimensional (3D) environment, the operations comprising:
   creating an initial map comprising unique characteristics associated with a bounded physical environment in response to a request by a user via a computing device;
   performing object recognition analysis to determine labels associated with objects using image recognition processing based at least on a user command to locate one or more objects of interest and the unique characteristics associated with the bounded physical environment;
   generating a world map representation with editable object tags associated with the one or more objects of interest and the unique characteristics associated with the bounded physical environment;
   providing navigation instructions to guide the user via the computing device to an object of interest selected from the one or more objects of interest based on a distance analysis of a current location of the computing device to a destination location of the computing device;
   determining horizontal and vertical rotational angles from an initial position of a laser pointer device to a position of the object of interest, the laser pointer device positioned at the initial position and configured to emit a laser beam;
   generating control signals to the anchor node device to rotate a plurality of servomotors based on the horizontal and vertical rotational angles in relation to the initial position;
   processing the control signals to rotate the plurality of servomotors according to the control signals such that the laser pointer device is rotated from the initial position in one or more of (x, y, z) coordinate-based directional angles to the object of interest; and
   generating the laser beam via the laser pointer device that targets the object of interest for expedient determination of the coordinate point of interest (POI) associated with the object of interest that is associated with the destination location of the computing device.

20. The non-transitory computer-readable medium as recited in claim 19, wherein the user command is transmitted using one or more of selection of the object of interest via a user interface selection menu and a voice command.

21. The non-transitory computer-readable medium as recited in claim 19, wherein the method implements interpretation of the voice command in order to transmit a control signal to the anchor node device.

22. The non-transitory computer-readable medium as recited in claim 19, wherein determination of at least one of the horizontal and vertical rotational angles is further based on an absolute location of the object of interest in the world map representation using a first (x, y, z) coordinate value and an absolute location of the anchor node device using a second (x, y, z) coordinate value.

23. The non-transitory computer-readable medium as recited in claim 22, wherein the unique characteristics associated with the bounded physical environment comprise one or more of 2-dimensional (2D) user trajectories, wall boundaries and 3D points of interest.

24. The non-transitory computer-readable medium as recited in claim 23, wherein the unique characteristics associated with the bounded physical environment further comprise underlying point cloud information that comprises 3D coordinates of feature points in the bounded physical environment and a visual features based world map based on visual features, used for re-localization when a change in system status occurs.

25. The non-transitory computer-readable medium as recited in claim 19, wherein the world map representation is further based on augmented reality in displaying labels on real world images associated with the bounded physical environment.

26. The non-transitory computer-readable medium as recited in claim 19, wherein generating the world map representation further comprises registering a series of 3D coordinates associated with the one or more objects of interest or points of interest associated with the computing device.

27. The non-transitory computer-readable medium as recited in claim 19, wherein generating the world map representation further comprises mapping boundaries associated with a complex bounded physical environment by using acoustic echo signals, in order to refine respective boundaries drawn for the complex bounded physical environment in the world map representation.

* * * * *